(12) United States Patent
Washisu

(10) Patent No.: US 7,295,232 B2
(45) Date of Patent: Nov. 13, 2007

(54) CAMERA AND PROGRAM

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/756,034

(22) Filed: Jan. 13, 2004

(65) Prior Publication Data
US 2004/0145673 A1    Jul. 29, 2004

(30) Foreign Application Priority Data
Jan. 15, 2003    (JP) .............................. 2003-007608
Jan. 15, 2003    (JP) .............................. 2003-007609

(51) Int. Cl.
*H04N 5/262* (2006.01)
(52) U.S. Cl. ............ 348/239; 348/208.15; 348/333.04; 348/362
(58) Field of Classification Search ............................... 348/208.99–208.16
See application file for complete search history.

(56) References Cited

U.S. PATENT DOCUMENTS 5,973,733 A * 10/1999 Gove ..................... 348/208.13
6,466,253 B1 * 10/2002 Honjoh ........................ 348/36
6,784,927 B1 * 8/2004 Itokawa .................. 348/208.1
7,057,645 B1 * 6/2006 Hara et al. .............. 348/208.6
2001/0033331 A1 * 10/2001 Eto et al. .................... 348/208
2002/0027599 A1 * 3/2002 Yamazaki .................. 348/208
2002/0036692 A1 * 3/2002 Okada ........................ 348/208
2004/0239779 A1 * 12/2004 Washisu ..................... 348/239

FOREIGN PATENT DOCUMENTS

JP    3110797    9/2000

* cited by examiner

*Primary Examiner*—Tuan Ho
*Assistant Examiner*—David Holt
(74) *Attorney, Agent, or Firm*—Cowan, Liebowitz & Latman , P.C.

(57) ABSTRACT

A camera which can obtain an image without image blur is disclosed. The camera which obtains a synthesized image whose exposure has been corrected by synthesizing a plurality of images obtained through successive image-taking, comprising: a detection unit which detects, with respect to a reference image, amounts of displacement on other images; a coordinate conversion unit which applies coordinate conversion to the other images based on the results of detection of the detection unit; and a synthesis unit which synthesizes the other images subjected to coordinate conversion and the reference image.

1 Claim, 24 Drawing Sheets

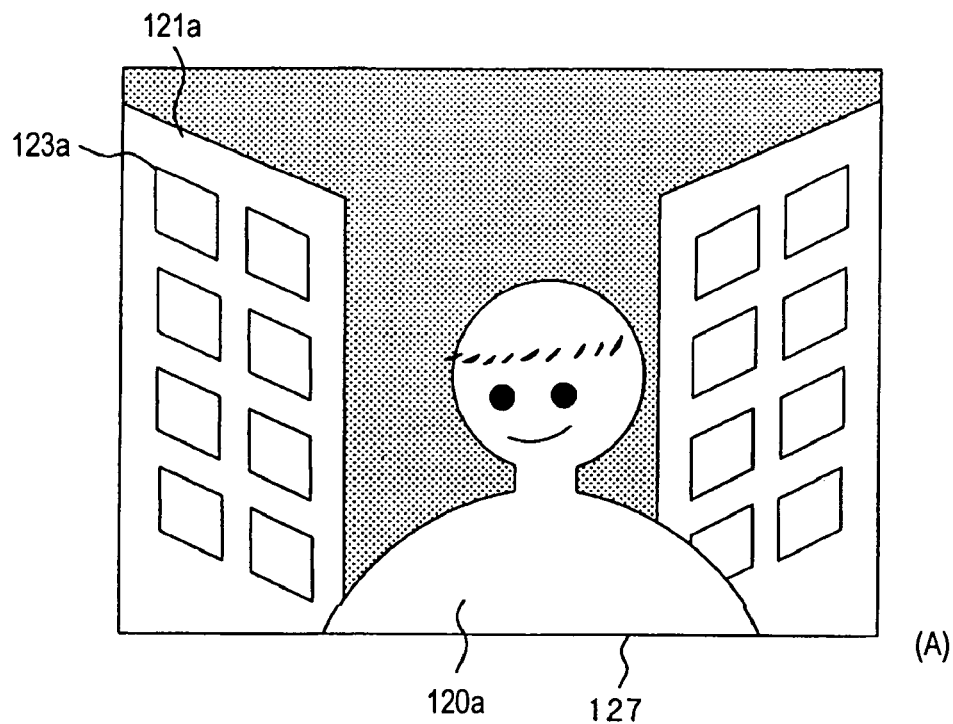
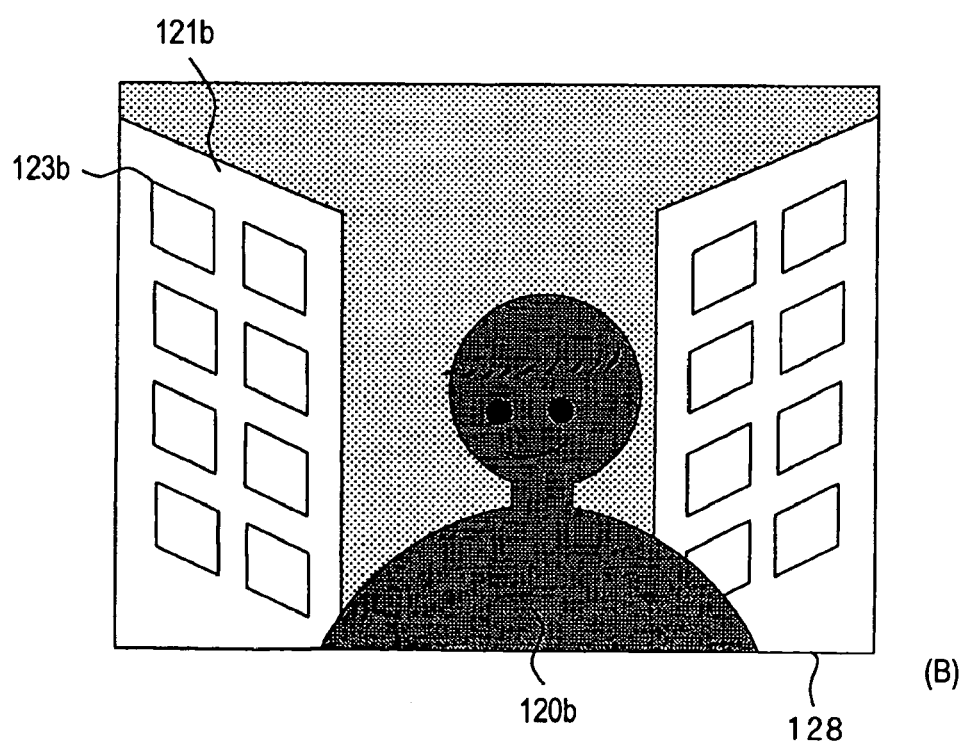
FIG. 17

CAMERA AND PROGRAM

BACKGROUND OF THE INVENTION

1. Field of the Invention

The present invention relates to a camera and a program which improve accuracy of taken images by correcting image blur due to vibration.

2. Description of Related Art

Operations important for image-taking such as exposure determination and focusing, etc., of cameras that are currently used, have been completely automated, and even a person who is unskilled in camera operations is unlikely to cause an image-taking failure.

Furthermore, recently, a system that prevents vibration applied to the camera has also been studied, and factors that cause a photographer to fail in image taking have been reduced to almost zero.

Herein, a vibration isolation system that prevents vibration is briefly described.

For camera shake when image-taking appears as vibration with a frequency of, normally, 1 Hz through 10 Hz, and an essential consideration for enabling the camera to take a picture without image blur even when such vibration occurs at a point of exposure, it is required that camera shake due to vibration is detected and a correcting lens is displaced within an optical axis orthogonal plane according to the results of this detection (optical vibration isolation system).

Namely, in order to take a picture without image blur even when camera shake occurs, it becomes necessary that, first, camera vibration is accurately detected, and second, an optical axis change due to vibration is corrected.

Correction of image blur can be carried out by, in principle, mounting on a camera a vibration detecting part that detects acceleration, angular acceleration, angular velocity, and angular displacement by means of a laser gyro, etc., and carries out appropriate calculation for the results of this detection. Then, by driving a vibration correcting optical device (including a correcting lens) that makes an image-taking optical axis eccentric on the basis of the detection information on camera shake supplied from the vibration detecting part, image blur correction is carried out.

On the other hand, Japanese Patent No. 3110797 discloses a method in which image-taking is repeated a plurality of times in an exposure period with a length that does not cause vibration, and a plurality of images obtained through this image-taking are synthesized while correcting image divergence among the images to obtain a taken image (synthesized image) of a long exposure period.

Recent digital cameras have become smaller in size than silver-salt compact cameras, and in particular, a camera that has an image pickup device of a VGA class has been downsized so that it is built-in a portable electronics device (such as a portable phone).

Under these circumstances, in order to mount the above-mentioned optical vibration isolation system on a camera, it is necessary that the vibration correcting optical device is made smaller or the vibration detecting part is made smaller.

However, in the vibration correcting optical device, since a correcting lens must be supported and highly accurately driven, there is a limit to downsizing. In addition, most of the vibration detecting parts that are currently used utilize inertia, so that if the vibration detecting parts are downsized, detection sensitivity lowers and accurate vibration correction becomes impossible.

Furthermore, vibration to be applied to cameras includes angular vibration around a predetermined axis and shifting vibration that shakes a camera parallel, and although the angular vibration is correctable by the optical vibration isolation system, the shifting vibration cannot be corrected by the optical vibration isolation system using inertia. Particularly, this shifting vibration tends to become greater as the camera becomes smaller.

On the other hand, as a different vibration isolation system, for being employed for taking a moving image, a method in which a motion vector of an image plane is detected based on an output of an image pickup device and an image readout position is changed according to the detected motion vector to obtain a moving image can also be employed.

Such a method has an advantage in that the entirety of the product can be downsized since the exclusive vibration detecting part and the correcting lens as in the abovementioned optical vibration isolation system become unnecessary.

However, this vibration isolation system for video cameras cannot be easily applied to digital cameras. The reason for this is described below.

Motion vector extraction in a video camera is carried out for each image reading, for example, when images of 15 frames are extracted per second, a motion vector is detected by comparing these extracted images.

However, in a case where a still image is taken by a digital camera, exposure is carried out only once for an object to be taken, so that detection of a motion vector through comparison of images as in a video camera is not possible.

Therefore, the vibration isolation system for video cameras cannot be simply applied to digital cameras.

On the other hand, in the vibration isolation method disclosed in Japanese Patent No. 3110797, since image-taking is repeated a plurality of times, an image-taking period becomes long. Therefore, if this method is recklessly used, it is feared that the number of failed pictures such as object vibration increase alternately.

In addition, a user must always note the use conditions of this vibration isolation method, and it becomes difficult to handle the system in comparison with a normal image-taking method in which image-taking is completed by one time of exposure. Hereinafter, this is described in detail.

Different from a silver-salt camera, in a digital camera, the sensitivity (imaging sensitivity) of the image pickup device can be freely changed. Therefore, even in a case of a dark object, by increasing the imaging sensitivity, vibration can be prevented to some extent.

Setting of the imaging sensitivity may be left to the camera (auto-setting) or may be set by a user himself/herself.

As mentioned above, in a digital camera, parameters that determine the necessity of use of vibration isolation are greater than in a silver-salt camera, so that it has become difficult for a user to judge whether or not a measure for vibration isolation is really necessary, and the system becomes difficult for users to handle.

Furthermore, in the abovementioned vibration isolation method, it is feared that a user experiences a sense of discomfort since exposure is carried out a plurality of times for one time of image taking.

Therefore, an object of the invention is to provide a small-sized vibration isolation system for still-image-taking of digital cameras different from the vibration isolation system for video cameras and the optical vibration isolation system for silver-salt cameras.

In addition, another object of the invention is to provide a camera in which, even when a method in which image-taking is repeated a plurality of times in an exposure period with a length that does not cause vibration and images obtained through the plurality of times of image-taking are synthesized while correcting divergence to obtain a taken image (synthesized image) of a long exposure period is mounted in this digital camera, the camera automatically sets this operation and prevents image-taking failures, and prevents a user from experiencing a sense of discomfort in handling this operation.

SUMMARY OF THE INVENTION

According to one aspect of a camera of the invention, the camera that obtains a synthesized image whose exposure has been corrected by synthesizing a plurality of images obtained through successive image-taking, comprising: a detection unit which detects, with respect to a reference image, amounts of displacement on other images, a coordinate conversion unit which applies coordinate conversion to the other images based on the results of the detection of the detection unit, and a synthesis unit which synthesizes the other images coordinate-converged by the coordinate conversion unit and the reference image. Here, the detection unit divides the reference image into at least two regions and detects the amounts of displacement based on a specific point included in one of the regions.

Furthermore, according to other aspect of the camera of the invention, a camera which can carry out image-taking in a first image-taking mode in which a synthesized image whose exposure has been corrected is obtained by synthesizing a plurality of images obtained through successive image-taking, and in a second image-taking mode in which an image correspond to the synthesized image is obtained through one time of image-taking, comprising: an image pickup device which photoelectrically converts an object image into an electric signal, a control unit which can be set into either image-taking mode of the first image-taking mode or the second image-taking mode according to image-taking conditions.

Furthermore, according to the other aspect of a camera of the invention, a camera which obtains a synthesized image whose exposure has been corrected by synthesizing a plurality of images obtained through successive image-taking, comprising: a detection unit which detects, with respect to a reference image, amounts of displacement on other images; an image selection unit which selects images suitable for synthesis among the other images based on the results of detection of the detection unit; and a synthesis unit which synthesizes the images selected by the image selection unit and the reference image.

Furthermore, according the other aspect of a camera of the invention, a camera which obtains a synthesized image whose exposure has been corrected by synthesizing a plurality of images obtained through successive image-taking, comprising: a first detection unit which detects, with respect to a reference image, amounts of displacement on other images; a coordinate conversion unit which applies coordinate conversion to the other images based on the results of detection of the first detection unit; a synthesis unit which synthesizes the other images subjected to coordinate conversion and the reference image; a second detection unit which detects vibration applied to the main body; and a control unit which controls the camera operation, wherein the control unit temporarily ends image-taking and restarts it according to the results of detection of the second detection unit and image-taking conditions.

According to one aspect of a program of the invention, a program for obtaining a synthesized image whose exposure has been corrected by synthesizing a plurality of images obtained through successive image-taking, comprising: a detection step in which, with respect to a reference image, amounts of displacement on other images are detected; a coordinate conversion step in which coordinate conversion is carried out for the other images based on the results of detection of the detection step; and a synthesis step in which the other images subjected to coordinate conversion in the coordinate conversion step and the reference image are synthesized. Here, in the detection step, the reference image is divided into at least two regions, and based on a specific point included in one of the regions, the amounts of displacement are detected.

According to another aspect of the program of the invention, a program which enables image-taking in a first image-taking mode in which a synthesized image whose exposure has been corrected is obtained by synthesizing a plurality of images obtained through successive image-taking, and in a second image-taking mode in which an image correspond to the synthesized image is obtained through one time of image-taking, comprising: a control step in which either image-taking mode of the first image-taking mode or the second image-taking mode can be set according to image-taking conditions.

The characteristics of the camera and the program of the invention will be clarified by the following detailed description of embodiments with reference to the accompanying drawings.

BRIEF DESCRIPTION OF THE DRAWINGS

FIG. 17 are explanatory views (A and B) of characteristic point extraction regions in Embodiment 7.

DETAILED DESCRIPTION OF THE PREFERRED EMBODIMENTS

Hereinafter, embodiments of the invention are described with reference to the drawings.

Embodiment 1

Figure 1:
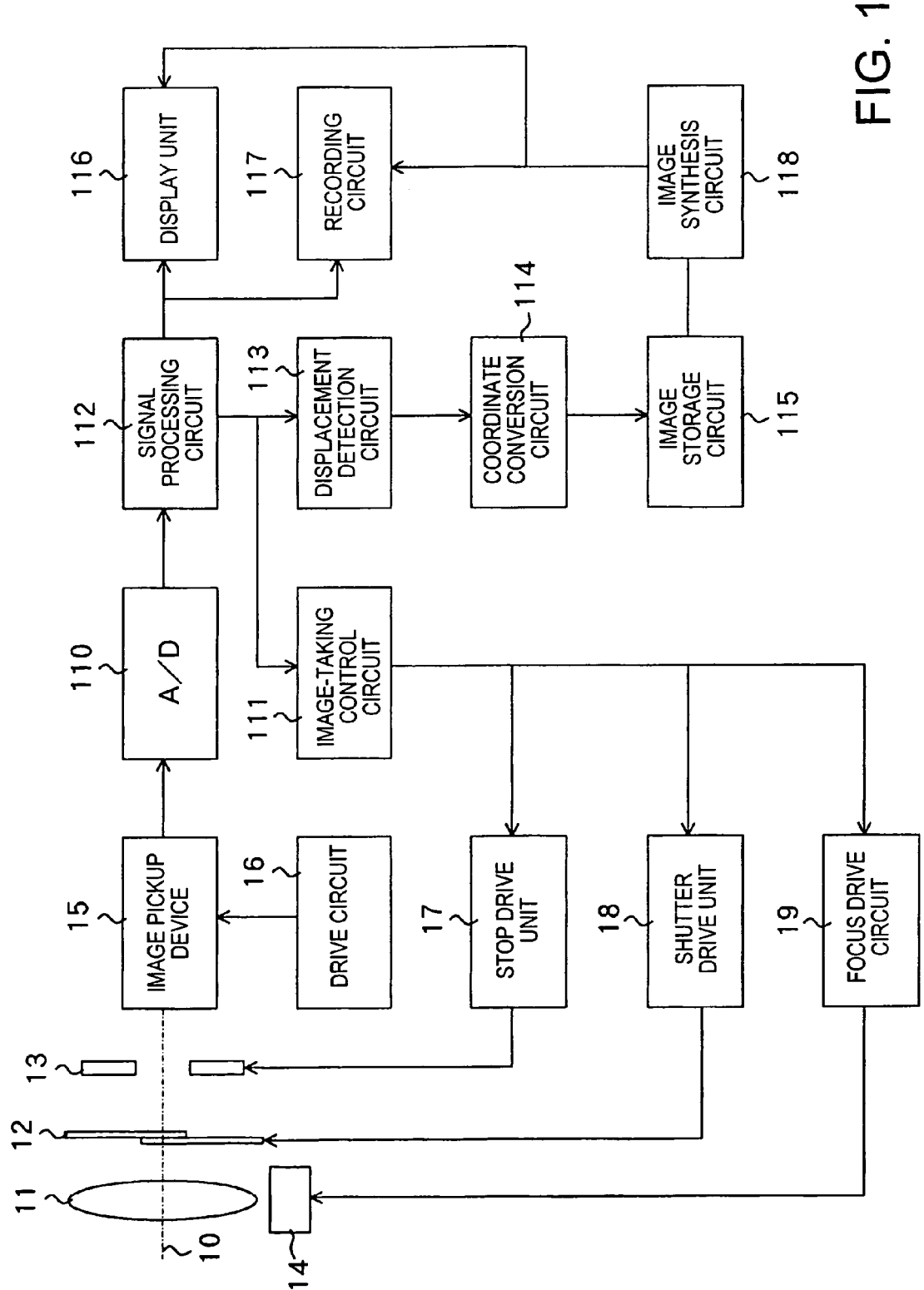
FIG. 1 is a block diagram of a camera of Embodiment 1 of the present invention.

FIG. 1 shows the structure of a camera of Embodiment 1 of the present invention. A light flux (image-taking light) that has entered from an image-taking lens 11 passes through a shutter 12 and is restricted in light amount by a stop 13, and then the image thereof is formed on an image pickup device 15. The image pickup device 15 comprises a semiconductor image pickup device such as an MOS or CCD.

The image-taking lens 11 moves on an optical axis 10 by receiving a driving force from an AF drive motor 14, and carries out focusing by stopping at a predetermined focal position. The AF drive motor 14 drives in response to a drive signal from a focus drive circuit 19.

The stop 13 has a plurality of stop blades (not shown), and these stop blades change an aperture area (stop aperture diameter) when receiving a driving force from a stop drive unit 17. The shutter 12 has a plurality of shutter blades, and these shutter blades open and close an aperture through which light passes when they receive a driving force from a shutter drive unit 18. Thereby, the light flux to enter the image pickup device 15 is controlled.

Driving of the focus drive circuit 19, the stop drive unit 17, and the shutter drive unit 18 is controlled by an image-taking control circuit 111.

The image-taking control circuit 111 detects an object luminance (photometry) based on an image signal taken into a signal processing circuit 112 that will be described later, and determines a stop aperture diameter of the stop 13 and an open period of the shutter 12. Furthermore, the image-taking control circuit 111 determines a focal position based on an output from the signal processing circuit 112 while driving the focus drive circuit 19.

An image signal (analog signal) outputted from the image pickup device 15 is converted into a digital signal by an A/D converter 110 and inputted into the signal processing circuit 112. The signal processing circuit 112 generates a color video signal by signal processing which forms a luminance signal and color signal with respect to the inputted signal.

Then, the image signal subjected to signal processing by the signal processing circuit 112 is displayed as a taken image by being outputted to the display unit 116, outputted to a recording circuit 117 and recorded.

The operation described above is a case where an image of a bright object that does not need vibration correction is taken. On the other hand, in a case where an object is dark and it is feared that vibration occurs due to lengthened exposure seconds, a photographer operates an operation member (vibration isolation operation switch, not shown) that is provided on the camera whereby the vibration isolation system is turned on and switched into the following operation.

First, when a photographer depresses halfway a release button provided on the camera, an image-taking preparation operation (focusing operation and photometric operation, etc.) is started. The open period of the shutter 12 (exposure period) and the stop aperture diameter of the stop 13 are determined based on a photometric value obtained through the photometric operation, however, generally, an object is dark under image-taking conditions where a vibration isolation system is used, so that the stop is set to full-open and the exposure period is set to a long period of exposure.

Therefore, this exposure period is divided into a plurality of short exposure periods, and image-taking is continuously repeated the number of times corresponding to the number of divisions. Due to this division into short exposure periods, each image obtained through the exposure becomes underexposed, however, these images are less influenced by vibration.

Then, the plurality of images are synthesized into one after finishing image-taking, whereby exposure is improved.

However, even if there is no influence of vibration on each image obtained through a plurality of times of image-taking, the image composition (object image) may be displaced among the images due to vibration during continuous image-taking. Herein, if these images are synthesized as they are, the synthesized image may blur according to the composition displacement among the images.

In this embodiment, a plurality of image signals outputted from the image pickup device 15 according to continuous image-taking for each image-taking are subjected to signal processing by the signal processing circuit 112 after being converted into digital signals by the A/D converter circuit 110. An output of the signal processing circuit 112 is inputted into a displacement detection circuit 113 as well as the image-taking control circuit 111.

The displacement detection circuit 113 extracts a characteristic point (specific point) in the taken image, and determines a position coordinate of the characteristic point within the image-taking plane.

Figure 2:
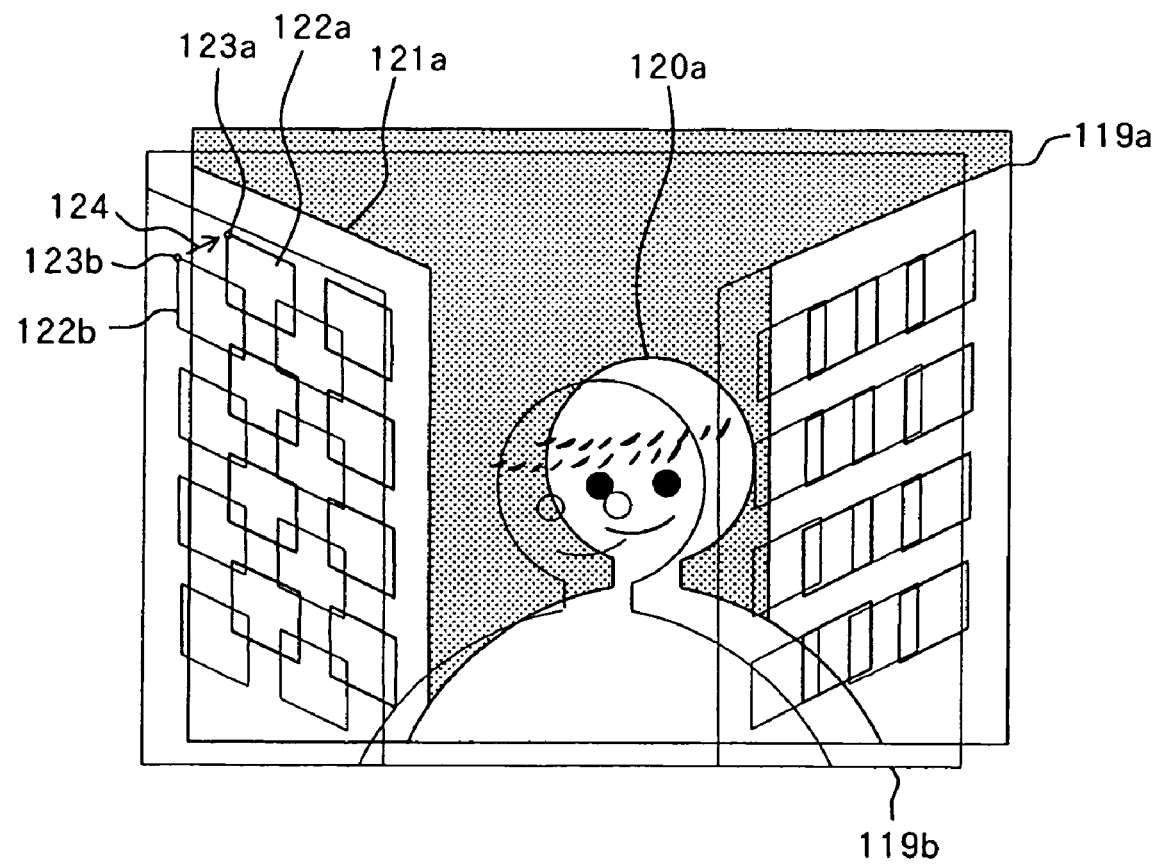
FIG. 2 is an explanatory view of coordinate conversion in Embodiment 1.

For example, as shown in FIG. 2, it is considered that a picture of a person 120a standing against a background of a building 121a in a frame 119a is taken. In this case, when a plurality of images are taken, images with composition displacement with respect to the frame 119a due to vibration as shown in the frame 119b may be taken.

The displacement detection circuit 113 extracts an edge 123a of a window 122a which is the high-luminance point in the building 121a positioned at the periphery (vicinity of outer frame) of the frame 119a as a characteristic point through edge detection, compares this characteristic point 123a with a characteristic point 123b extracted from the frame 119b, and corrects the difference between them (coordinate conversion).

In FIG. 2, coordinate conversion of the frame 119b is carried out by superposing the characteristic point 123b of the frame 119b on the characteristic point 123a of the frame 119a as shown by the arrow 124.

Herein, a reason for selecting the peripheral region in the image-taking plane (frame) as a characteristic point extraction region is described as follows.

In many cases of image taking, a main object is positioned in the vicinity of the center of the frame, and the main object is a person. In such a case, if the main object is selected as a characteristic point, object vibration causes a problem.

Namely, during image-taking of a plurality of images, not only hand vibration of a photographer but also object vibration overlap, so that image coordinate conversion is carried out based on the object vibration.

In this case, it seems that a preferable image can be created since coordinate conversion is carried out so that the composition of the main object becomes proper, however, generally, movement of a person is complicated, and therefore, displacement detection accuracy greatly depends on a location to be selected as a characteristic point.

For example, if an eye of a main object (person) is selected as a characteristic point, blinking influences, and if the tip of a hand is selected as a characteristic point, a hand easily moves and its vibration is different from the actual vibration of the entire object.

As mentioned above, if image coordinate conversion is carried out by selecting a point of a person as a characteristic point, since coordinates of all points of the person are not always properly converted, in the case where a plurality of images are coordinate-converted and synthesized, the coordinate position disperses among the images, so that a preferable image cannot be obtained.

Therefore, as in this embodiment, a more preferable image (with less image blur) can be obtained through image coordinate conversion by selecting a still object such as a background having a high possibility of being located at the periphery (vicinity of outer frame) of the image-taking plane as a characteristic point. In this case, the abovementioned object vibration influences, however, this influence is slight for the entire object, so that this does not result in great image deterioration.

Figure 3:
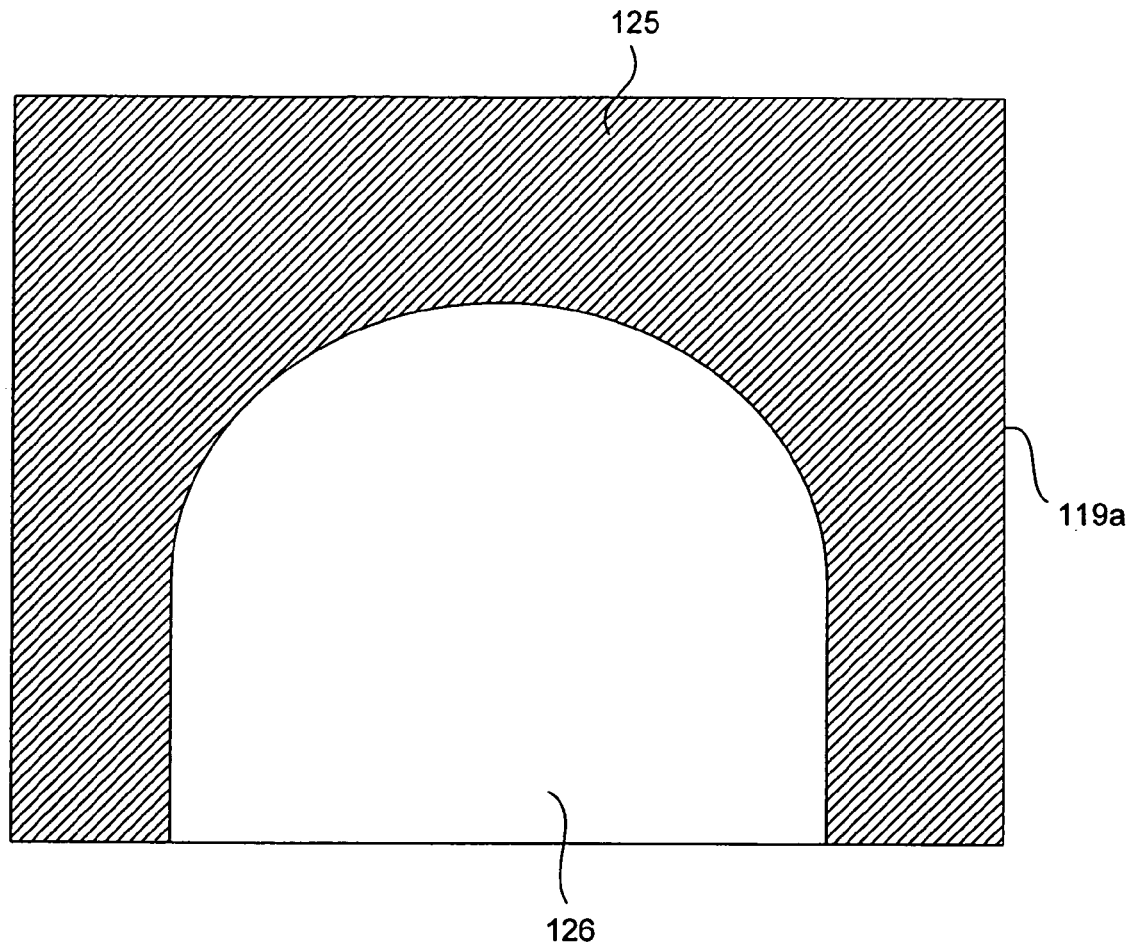
FIG. 3 is an explanatory view of a characteristic point extraction region in Embodiment 1.

FIG. 3 is a view showing an extraction region in which a characteristic point is extracted from one frame by the displacement detection circuit 113.

In the frame 119a, a peripheral region 125 (shaded region in FIG. 3) excluding a region 126 having a high possibility of including a main object is the characteristic point extraction region. This extraction region 125 can be set as appropriate. The displacement detection circuit 113 selects an image (point) with a high luminance and high contrast in the extraction region 125 as a characteristic point (edge detection).

For the second image and images taken after the second image, from the periphery of the position coordinate of the characteristic point of the image taken immediately before (range of composition vibration due to vibration (hand shaking) determined depending on the focal length of the image taking optical system), the same image as the characteristic point of the image taken immediately before is searched for and regarded as a characteristic point.

Herein, for the sake of explanation, the characteristic point coordinate is determined for each image, however, in actuality, correlative calculation of the first image and the second image is carried out, and corresponding pixel changes are regarded as motion vectors and characteristic point changes. For the third image, a characteristic point change is determined through correlative calculation with the second image, and characteristic point changes in subsequent images are determined in the same manner.

Furthermore, as for the characteristic point, in place of selecting only one point from the extraction region 125, it is also possible that a plurality of points are selected and an average motion vector or the minimum scalar of these points is regarded as a characteristic point change.

Herein, the reason why the abovementioned minimum value is used as a characteristic point change is for selecting the most moveless characteristic point since a characteristic point selected in a peripheral region of the image plane also has a possibility of moving by itself.

In FIG. 1, a coordinate conversion circuit 114 carries out image conversion of the respective images according to characteristic point changes determined by the displacement detection circuit 113. An image storage circuit 115 stores data of the respective images after being coordinate-converted.

The data of the respective images stored in the image storage circuit 115 is outputted to an image synthesis circuit 118, and the images are synthesized into one image by the image synthesis circuit 118.

In a case of a digital image, exposure correction is possible by raising the gain even in a case of one underexposed picture, however, an increase in gain also increases noise, resulting in an undesirable image.

However, as in this embodiment, in a case where the gain of the entire image is increased by synthesizing a plurality of images, noise of the images is averaged, so that an image with a high S/N ratio can be obtained, and as a result, noise is suppressed and exposure is made proper.

In another consideration, for example, a plurality of images are taken by raising the sensitivity of the image pickup device 15 by allowing noise, and subjected to arithmetic mean with respect to these images, whereby random noise included in the images is reduced.

Figure 4:
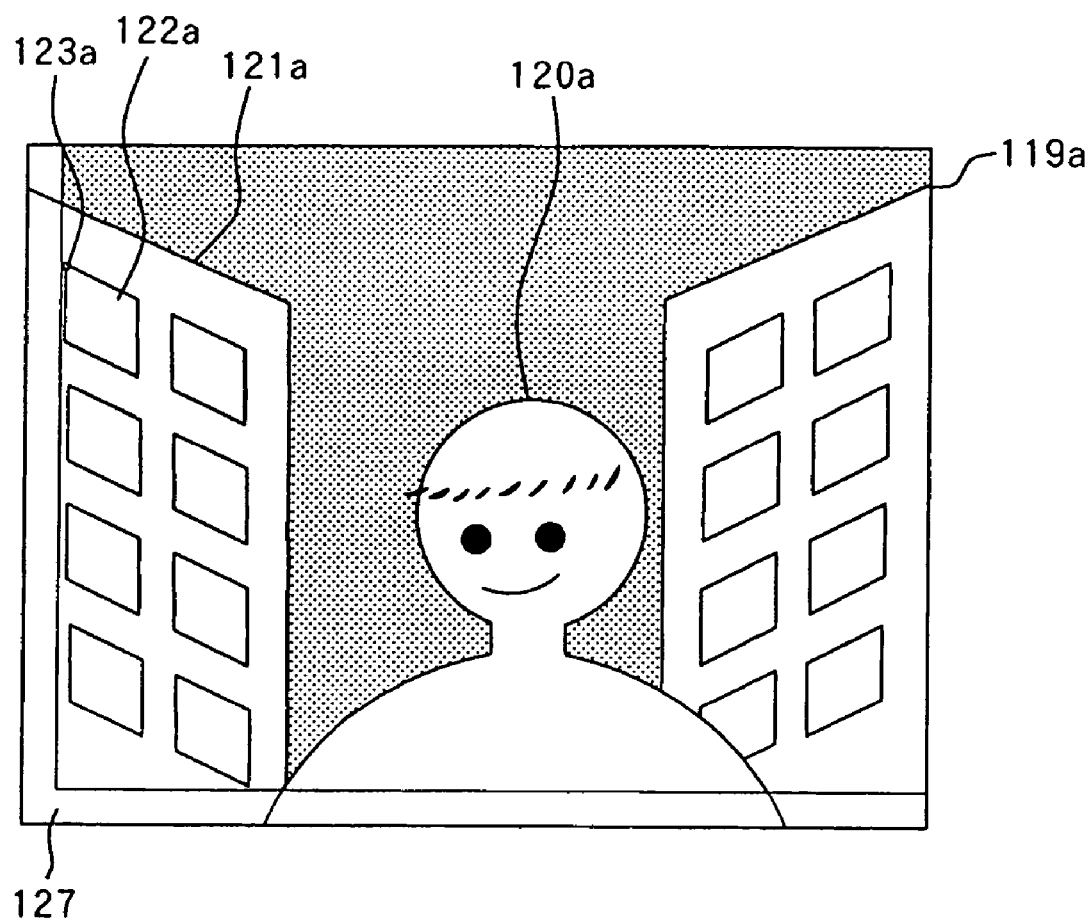
FIG. 4 is an explanatory view of image synthesis in Embodiment 1.

Herein, when two images with composition displacement as shown in FIG. 2 are synthesized, a region 127 in which the two images do not overlap appears as shown in FIG. 4. Therefore, the image synthesis circuit 118 cuts the region 127 and applies expanding complement processing to only the region in which the two images overlap each other to obtain an image with the original frame size.

The synthesized image data is displayed on the display unit 116 as a taken image (still image) and recorded onto a recording circuit 117.

Figure 5:
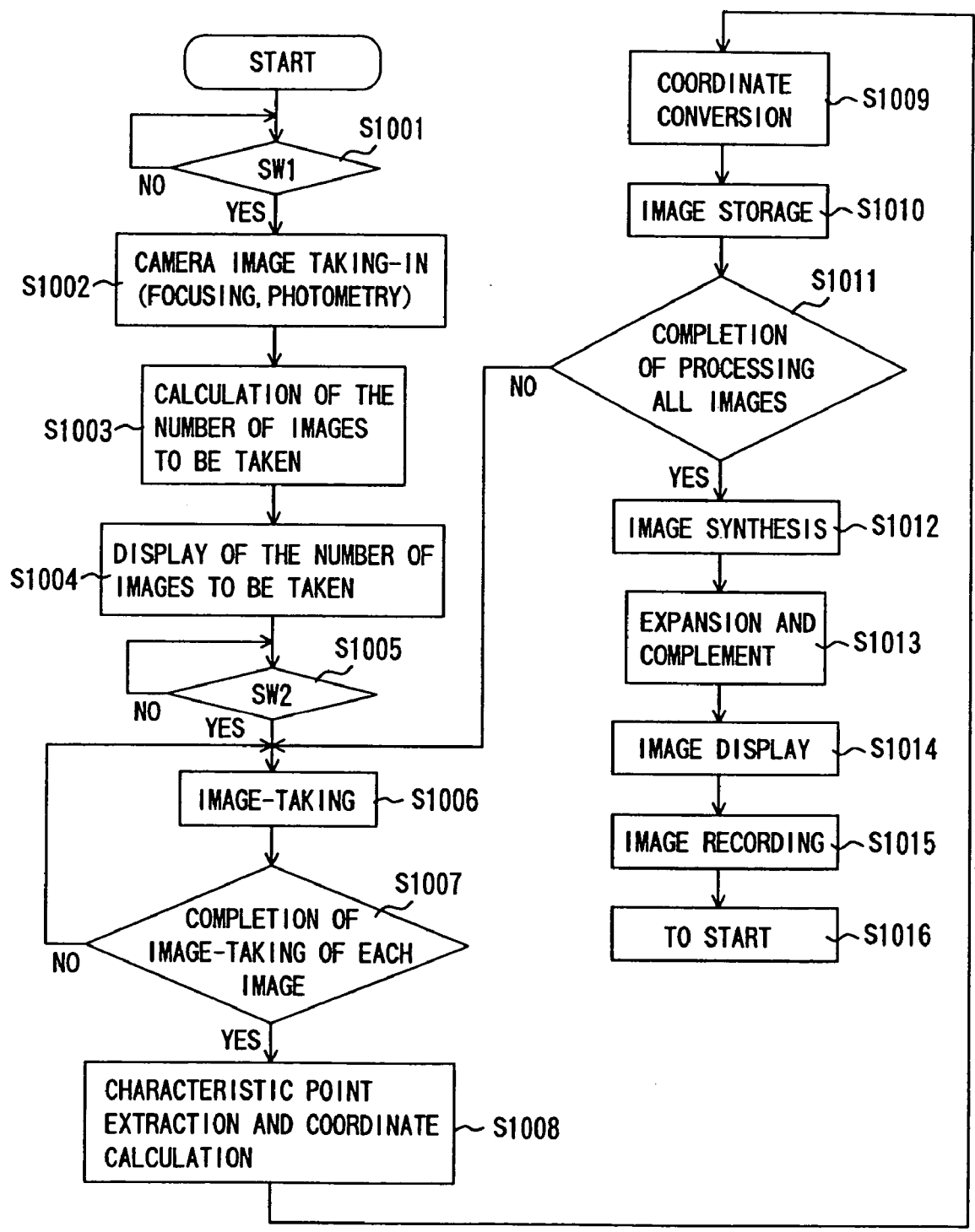
FIG. 5 is a flowchart showing image-taking operation in Embodiment 1.

FIG. 5 is a flowchart summarizing the abovementioned operation, and this flow starts when the vibration isolation switch is operated (turned on).

In Step S1001, the process waits until the switch sw1 is turned on by half-depression of the release button by a photographer, and when the sw1 is turned on, the process advances to Step S1002.

In Step S1002, an object is imaged by the image pickup device 15. The image-taking control circuit 111 drives the AF drive motor 14 to move the image-taking lens 11 in the optical axis direction while detecting the contrast of the object image (image to be taken) based on an output from the signal processing circuit 112.

Then, at a point at which the contrast becomes highest, driving of the image-taking lens 11 is stopped to obtain a focused condition of the image-taking optical system (that is, AF by a hill-climbing method). Furthermore, focusing can be carried out by phase difference detection method.

Furthermore, the image-taking control circuit 111 determines the brightness of the object based on an output of the image pickup device 15.

In Step S1003, based on the brightness of the object determined in Step S1002, the number of images to be taken is determined. For example, the brightness of the object is measured (photometered), and it is assumed that, for proper exposure based on the results of this photometry, it is necessary that the stop 13 is set to full-open (for example, f2.8) and the open period of the shutter 12, that is, the exposure period is set to ⅛ seconds.

Herein, when the focal length of the image-taking optical system is 30 mm as regards 35 mm film, it is feared that image blur occurs due to vibration in image-taking of an exposure period of ⅛ seconds, so that image-taking is carried out four times by setting the exposure period to 1/32 seconds so as to repress image blur.

On the other hand, when the focal length of the image-taking optical system is 300 mm, the exposure period is set to 1/320 seconds so that image-taking is carried out forty times to repress image blur. In this case, since image blur is often subject to occur as compared to the case where the focal length is 30 mm, exposure period is set shorter.

In Step S1004, the number of images to be taken (times of image-taking) is displayed on the display unit provided within the finder of the camera or a liquid crystal display unit provided on the outer package of the camera and the photographer is informed of it.

In Step S1005, the process waits until the switch sw2 is turned on by full depression of the release button. Furthermore, when the half depression of the release button is released during this waiting step, that is, when the sw1 is turned off, the process returns to the start.

In Step S1006, image-taking of the first image is started.

In Step S1007, until image-taking of the first image is completed, the process waits while circulating Step S1006 and Step S1007. Then, when image-taking of the first image is completed, the process advances to Step S1008.

In Step S1008, a characteristic image (characteristic point) is extracted from the extraction region 125 within a frame by the displacement detection circuit 113 and the coordinate of this image is determined.

In Step S1009, coordinate conversion is carried out by the coordinate conversion circuit 114, however, in the case where only the first image is taken, coordinate conversion is not carried out and the process directly progresses to Step S1010.

In Step S1010, in the case of first image data or image data of the second and subsequent images, image data subjected to coordinate conversion is stored in the image storage circuit 115.

In Step S1011, it is judged whether or not image-taking of the number of images to be taken, determined in Step S1003, has been finished, and until image taking of all the number of images to be taken is finished, the process returns to Step S1006 and repeats image-taking, characteristic point extraction, coordinate conversion, and image storage (Steps S1006 through S1010).

In this flow, it appears that the second image is taken after the first image is taken and storage of the first image is finished, however, in actuality, during characteristic point extraction and image storage for the first image data is carried out, image-taking of the second image (reading-out from the image pickup device 15) is carried out. Images after the second image are taken in the same manner as described above.

By repeating the flow from Step S1006 to Step S1011, as for the images taken after the second image, coordinate conversion is carried out so that characteristic point coordinates of the images after the second image overlap the coordinate of the characteristic point of the first image after the characteristic point coordinates are determined in Step S1008, whereby all the compositions of the images after the second image agree with the composition of the first image.

When it is judged in Step S1011 that image-taking of all images has been finished, the process advances to Step S1012.

In Step S1012, a plurality of images stored in the image storage circuit 115 are synthesized. Herein, image synthesis is carried out by arithmetic mean of coordinate signals corresponding to the respective images, and random noise in the images is reduced through arithmetic mean. Then, the gain of the image with reduced noise is increased to make exposure proper.

In Step S1013, in the synthesized image, as the region 127 of FIG. 4, a region in which the images do not overlap each other due to composition displacement is cut, and the image is expanded and complemented to the original frame size.

In Step S1014, image data obtained in Step S1013 is displayed as a still image on a liquid display unit provided on the back surface, etc., of the camera. Thereby, a photographer can observe the taken image.

In Step S1015, the image data obtained in Step S1013 is recorded onto a recording medium that comprises, for example, a semiconductor memory, and is attachable to and detachable from the camera. In Step S1016, the process returns to start.

When the release button is still continuously depressed halfway and the sw1 is still on at the point of Step S1016, the process advances the flow, Steps S1001, S1002, S1003, and S1004 in order. Furthermore, when the release button is fully depressed and the sw2 is on at the point of step S1016, the process does not return to start but waits at Step S1016.

In the abovementioned flow, in parallel with image-taking of the respective images, characteristic point displacement detection and image coordinate conversion are carried out. Therefore, high-speed image processing is necessary.

As a more inexpensive system, a method in which displacement detection, coordinate conversion, and synthesis are carried out slowly after all of the plurality of images are taken is also considered.

In such a method, the burden of the abovementioned image processing is significantly reduced, and furthermore, in a case where a VGA-class small image is handled, the capacity of the image memory can be small, so that a reasonable system is realized.

Figure 6:
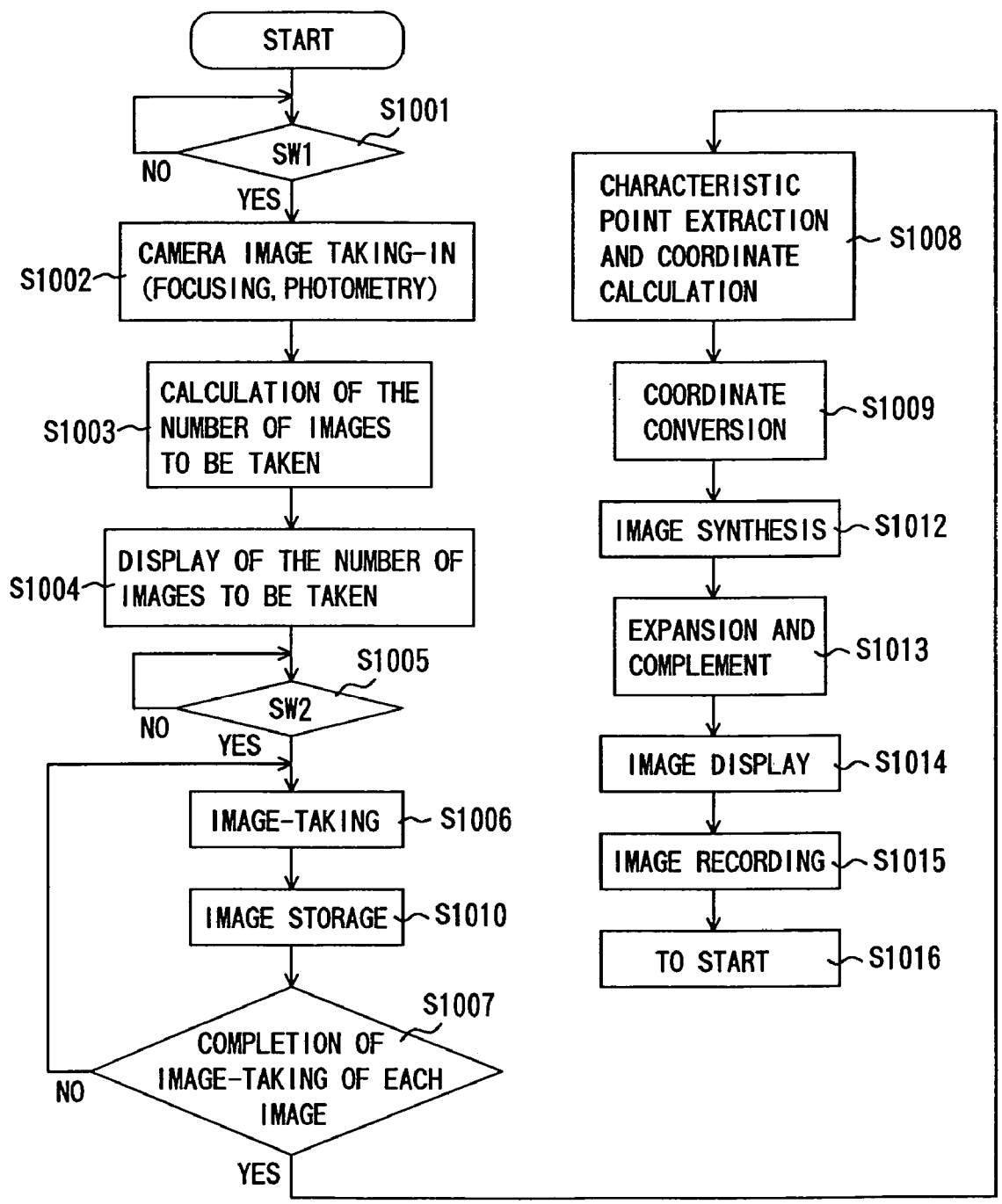
FIG. 6 is a flowchart showing image-taking operation in a modified example of Embodiment 1.

FIG. 6 shows a flow in this case, which is different from the flow of FIG. 5 in that Steps S1006 through S1012 are changed.

The respective images are taken in Step S1006, and the taken images are stored in the image storage circuit 115 in Step S1010 every time image-taking is finished. Until all images are taken and stored, the process circulates through Step S1007 and Step S1006, and when storage of all images is finished, the process advances to Step S1008.

In Step S1008, in the same manner as mentioned above, in the image stored in the image recording circuit 115, a characteristic image (characteristic point) is extracted from the extraction region 125 by the displacement detection circuit 113, and the coordinate of this image is determined.

In Step S1009, coordinate conversion is carried out by the coordinate conversion circuit 114, and the image after being converted is re-stored in the image storage circuit 115. The first image is not subjected to coordinate conversion.

In Step S1012, the images that have been stored in the image storage circuit 115 and subjected to coordinate conversion (however, the first image has not been subjected to coordinate conversion) are all synthesized.

As described, image processing can be executed slowly by utilizing the time until images are displayed (for example, 1 second) after image-taking of all images is finished, so that a vibration isolation system can be constructed without using an expensive image processing chip.

Furthermore, as in a camera mounted on a portable electronics device, in a case where the image size is small (for example, VGA), the capacity of the image storage circuit 115 to temporarily store the taken image data can be small.

As described, by carrying out displacement detection, coordinate conversion, or image synthesis after image-taking of all images is finished, a large-scale device becomes unnecessary and a vibration isolation system can be easily realized.

Embodiment 2

A camera of this embodiment is a modified example of the camera of Embodiment 1 mentioned above. Herein, the structure of the camera of this embodiment is roughly the same as that described in Embodiment 1 (FIG. 1).

In Embodiment 1, the region from which a characteristic point is extracted by the displacement detection circuit 113 is set at the peripheral region 125 (see FIG. 3) of the frame.

However, the characteristic point extraction region is not limited to the peripheral region 125 of the frame, and a region other than a focus area set within the image-taking plane may be regarded as a characteristic point extraction region, or a region other than a currently focused region may be regarded as a characteristic point extraction region.

The reason for this is that, since a main object (person) is overlapped with a focus area when image-taking is carried out, in order to set a characteristic point so as to exclude the main object, a region other than the focus area is set as a characteristic point extraction region.

Figure 7:
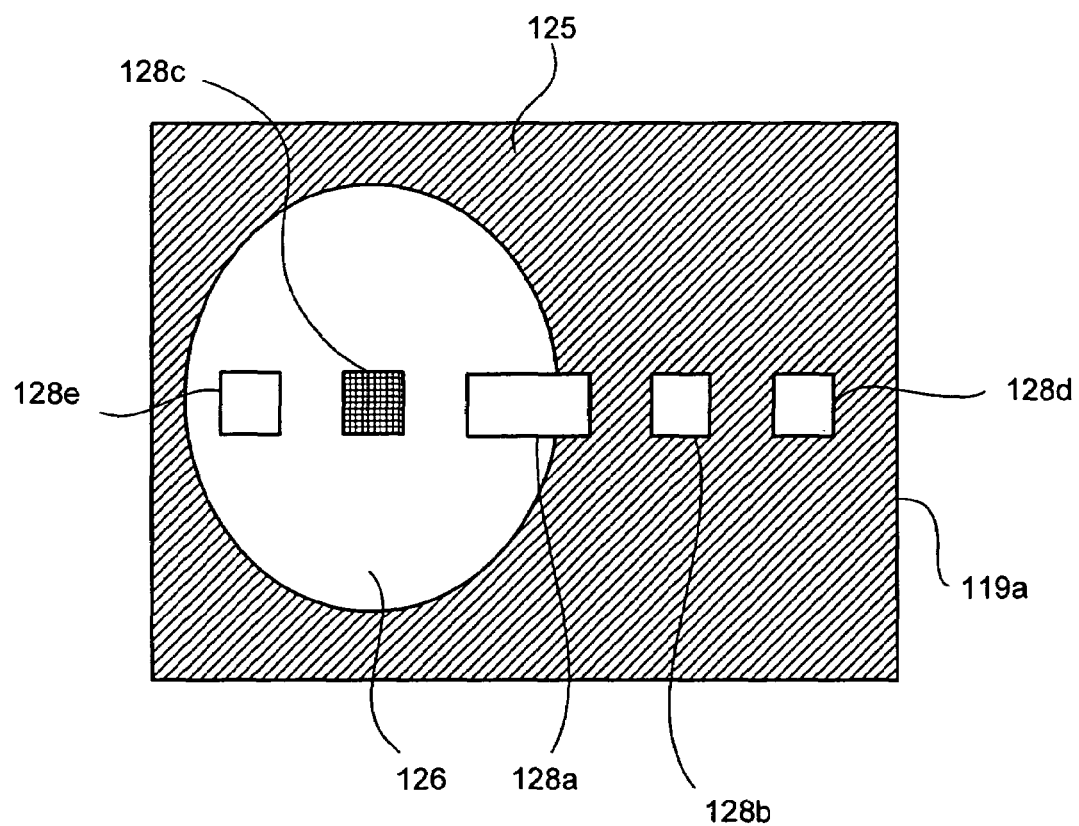
FIG. 7 is an explanatory view of a characteristic point extraction region in Embodiment 2 of the present invention.

FIG. 7 shows a characteristic point extraction region within an image-taking plane. Among focus areas (focus detection area) 128a, 128b, 128c, 128d, and 128e provided within the image-taking plane (frame 119a), when the focus area 128c that captures a main object is focused, an image plane peripheral region 125 (shaded region in FIG. 7) excluding the main object region 126 around this focus area 128c is set as a characteristic point extraction region.

Namely, depending on which of the focus areas 128a, 128b, 128c, 128d, and 128e the main object is positioned at, the main object region 126 and the characteristic point extraction region are changed.

Then, an appropriate image in this characteristic point extraction region is regarded as a characteristic point, displacement of the respective images is corrected (coordinate conversion) based on the coordinate of this characteristic point, and the images are synthesized, whereby preferable image synthesis can be carried out.

The process is described above that the characteristic point is previously extracted within image data and the correction of displacement of each image based on amounts of displacement of characteristic point. However, other variations for the correction of the displacement may be applicable.

For example, a reference image is determined and the reference image is simpliciter divided into a plurality of region. Then, the same process is performed to other images and the differences (motion vector) between the other images and the reference image at each divided region is obtained. Furthermore, coordinate conversion is performed to each other image on the basis of the high-frequency vector among the motion vectors, the other images are aligned with the reference image.

With the method described above, by using high-frequency vector, only the displacement of image (screen) due to not object vibration but hand vibration can be corrected.

Furthermore, in place of image synthesis after all of the images are subjected to coordinate conversion and stored as shown in the flow of FIG. 5, it is also possible that image synthesis can be carried out simultaneously with image-taking.

Figure 8:
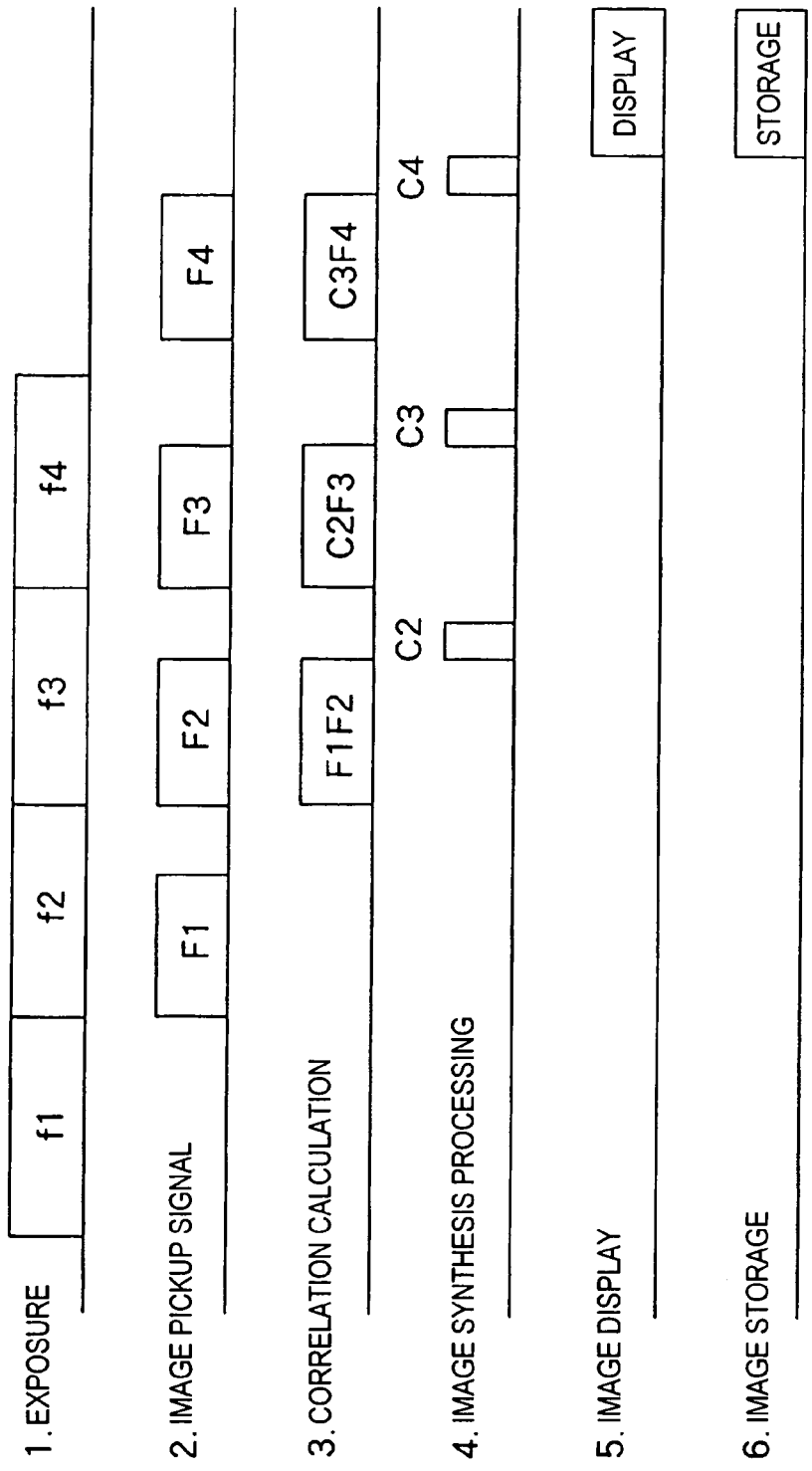
FIG. 8 is a timing chart showing image-taking processing operation in Embodiment 2.

FIG. 8 is a timing chart to explain the above described operation. Herein, a case where image-taking is carried out four times is described. In response to exposure f1, a signal that has been photoelectrically converted and charge-accumulated by the image pickup device 15 is readout as an image pickup signal F1. Then, concurrently with reading-out of an image pickup signal F2, correlative calculation of the previous image pickup signal F1 and the current image pickup signal F2 is carried out. Thereby, a characteristic point change between the two images is determined, and two image signals F1 and F2 are synthesized to obtain a synthesized signal C2.

Next, concurrently with reading-out of an image pickup signal F3, correlative calculation of the previous synthesized signal C2 and the current image pickup signal F3 is carried out to determine a characteristic point change, and the synthesized signal C2 and the image pickup signal F3 are synthesized to obtain a synthesized signal C3.

Next, concurrently with reading-out of an image pickup signal F4, correlative calculation of the previous synthesized signal C3 and the current image pickup signal F4 is carried out to determine a characteristic point change, and the synthesized signal C3 and the image pickup signal F4 are synthesized to obtain a synthesized signal C4.

Then, the obtained synthesized signal C4 (synthesized image) is displayed on a liquid crystal display unit provided on the camera back surface, etc., and recorded onto a recording medium.

Figure 9:
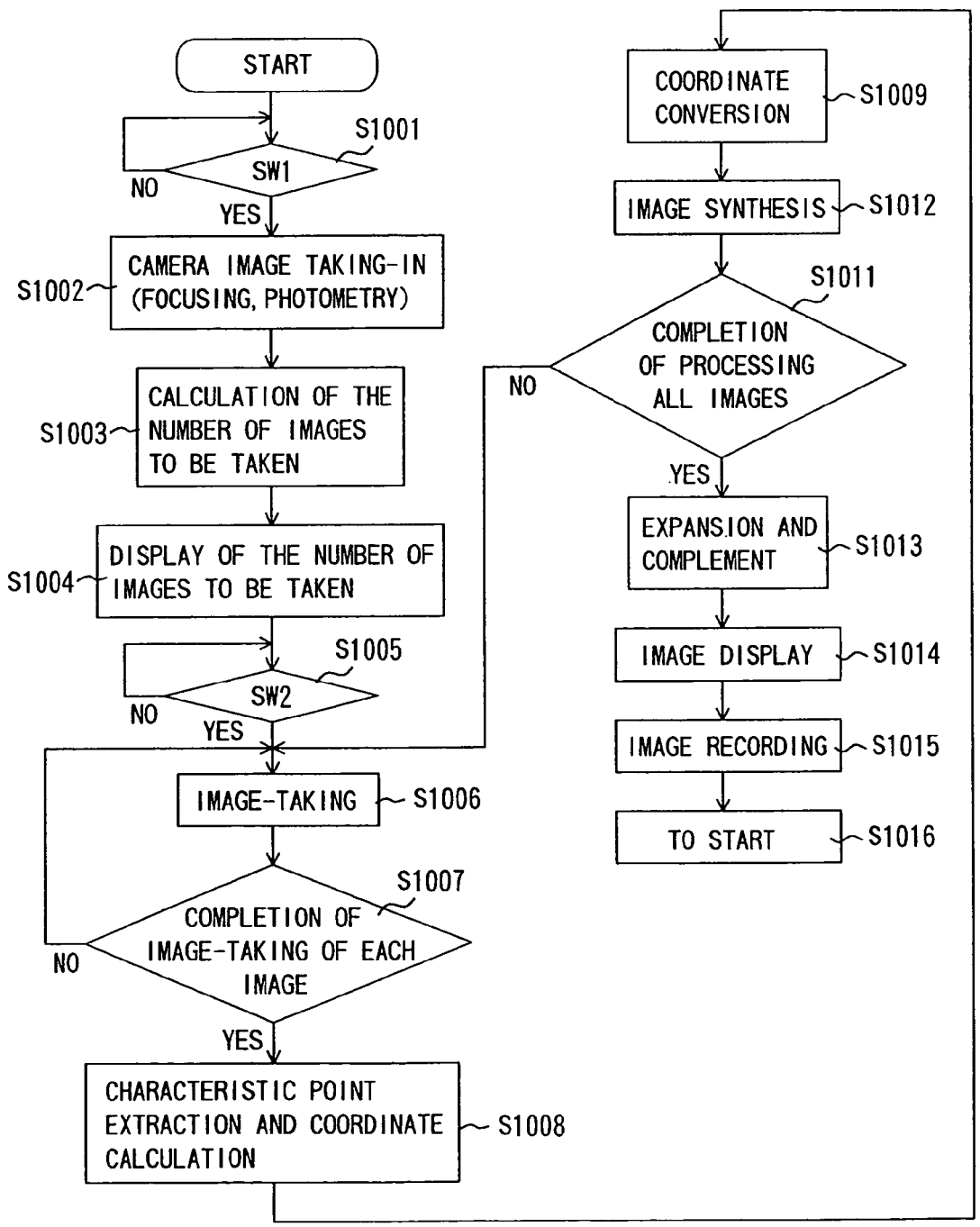
FIG. 9 is a flowchart showing image-taking operation in Embodiment 2.

FIG. 9 is a flowchart describing the abovementioned operation. In comparison with the flowchart of FIG. 5, image storage of Step S1010 is omitted, image synthesis (Step S1012) is carried out after coordinate conversion (Step S1009), and then it is judged whether or not all images have been completely taken (Step S1011).

In this embodiment, the reason for omitting image storage of Step S1010 is that a taken image is, concurrently with image-taking, synthesized with an image taken by previous image-taking, and only one final synthesized image exists, so that it is not necessary to store the plurality of taken images.

Namely, since the synthesized image is renewed every image-taking, it is not necessary to store the respective taken images. Therefore, the camera of this embodiment is not provided with the image storage circuit 115 shown in FIG. 1.

Furthermore, it also appears in the flow of FIG. 9 that the next image-taking is not carried out until all image processing (Step S1008 to Step S1012) is completed, however, in actuality, as shown in the timing chart of FIG. 8, image-taking, image pickup signal output, correlative calculation, and image synthesis are simultaneously carried out.

As described above, in Embodiment 1 and Embodiment 2 of the present invention, the fact that underexposure can be complemented by repeating image-taking a plurality of times in a short exposure period that does not cause image blur and synthesizing a plurality of taken images is recognized, and furthermore, composition displacement among images due to vibration is corrected by applying coordinate conversion to the respective images before synthesis, whereby image blur that may occur in the synthesized image is suppressed.

Thereby, since a digital still camera can electronically carry out vibration correction in the same manner as in a video camera, a vibration isolation system whose size is remarkably smaller than that of a silver-salt camera can be constructed, and furthermore, since displacement of an image itself is corrected, not only angular vibration but also shifting vibration can be corrected.

In addition, in the abovementioned Embodiment 1 and Embodiment 2, it is considered which region a characteristic point should be extracted from in an image-taking plane in displacement detection for coordinate conversion to correct composition displacement of each taken image.

For example, when an image-taking plane is divided into two regions 125 and 126 as shown in FIG. 3 and FIG. 7, a characteristic point is extracted from a region 126 having a high possibility of including a main object (person), and composition displacement is detected, composition displacement cannot be accurately judged due to vibration of the person himself/herself.

Therefore, as in Embodiment 1 and Embodiment 2 mentioned above, in the region 125 that is other than the region 126 in the image-taking plane, a position coordinate of a characteristic point such as a bright spot 123a (see FIG. 2) is detected for each image, and after images are subjected to coordinate conversion so that the positions of the characteristic points detected in the respective images agree with each other, the images are synthesized, whereby one image without image blur can be obtained.

Embodiment 3

Figure 10:
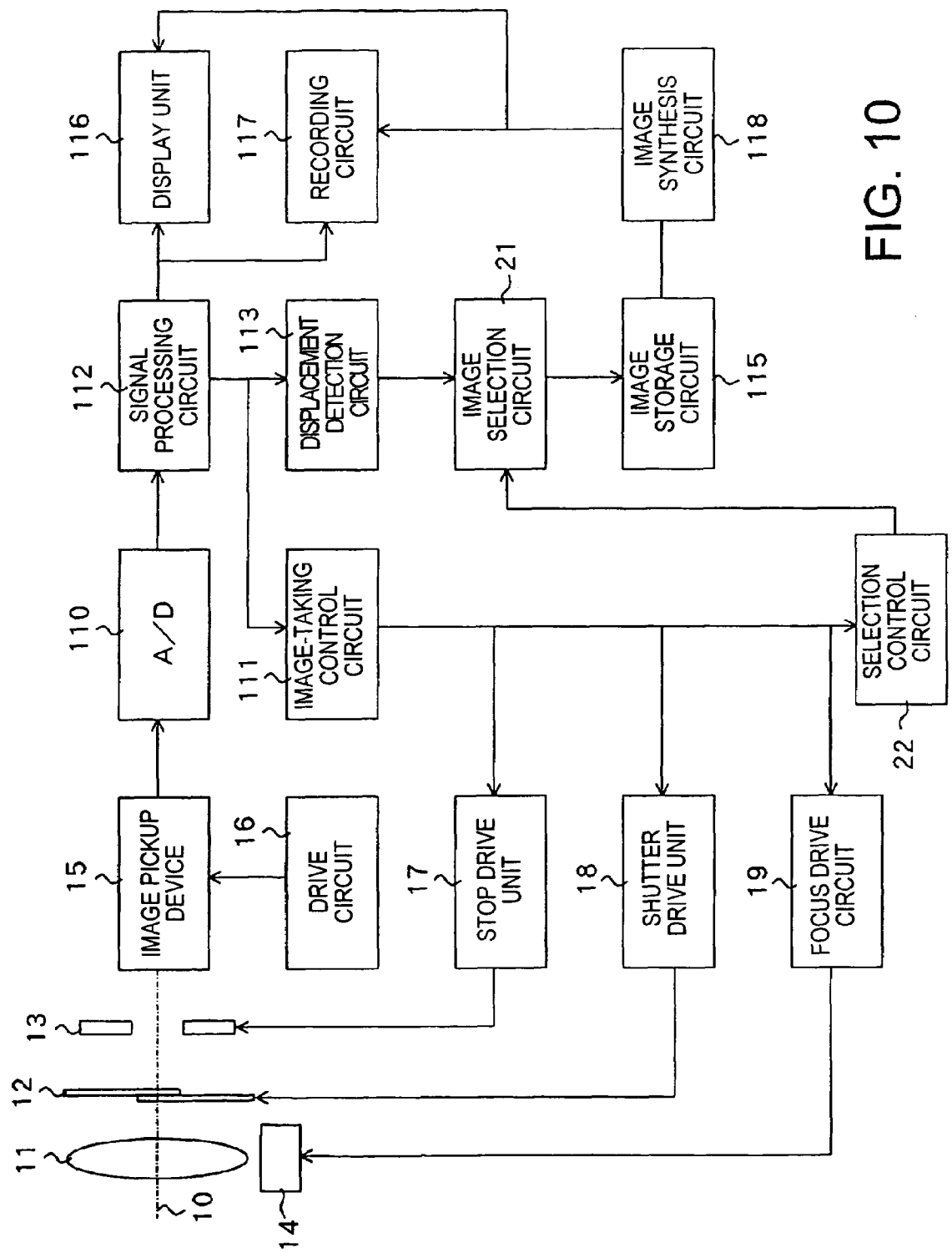
FIG. 10 is a block diagram of a camera of Embodiment 3 of the present invention.

FIG. 10 is a block diagram of a camera of Embodiment 3 of the present invention. In this embodiment, a point of difference from Embodiment 1 (Embodiment 2) is that a synthesized image is obtained by selecting only images with less composition displacement and synthesizing the selected images in place of coordinate conversion of all images.

Therefore, in the structure of the camera of this embodiment, the coordinate conversion circuit 114 provided in Embodiment 1 (FIG. 1) is omitted, and instead, an image selecting circuit (image selecting unit) 21 and a selection control circuit (selection control unit) 22 are provided. Other structural points are the same as in Embodiment 1.

The image selecting circuit 21 selects only images that have characteristic points whose coordinate positions have less displacement among images with displacement detected by the displacement detection circuit 113, as in Embodiment 1, and stores them in the image storage circuit 115.

Therefore, images to be used for synthesis by the image synthesis circuit 118 have less displacement in characteristic point coordinate, so that an image without image blur can be obtained through only image synthesis without coordinate conversion.

However, different from Embodiment 1, only the number of images to be taken which is set in advance may be insufficient for image synthesis. Namely, in this embodiment, an image with great composition displacement is not selected as an image necessary for image synthesis by the image selection circuit 21.

To prevent this, the number of images to be taken must be set in advance to be larger than the actual necessary number of images (the number of images required according to the photometry results).

On the other hand, when an object becomes dark, the number of images required for image-taking increases accordingly, and as a result, the time to complete image-taking of all images becomes longer.

If the image-taking time become longer, the composition displacement due to vibration increases, images that can be selected by the image selection circuit 21 are reduced, so that an image of proper exposure cannot be obtained.

Therefore, in this embodiment, as the object becomes dark, the selection criterion of the image selection circuit 21 are relaxed, and image selection is carried out by allowing slight composition displacement, and selected images are used for image synthesis.

In FIG. 10, the selection control circuit 22 has a role of determining the selection criterion of the image selection circuit 21, when an object is dark according to image-taking information from the image-taking control circuit 111, and the number of images to be taken for obtaining proper exposure increases, the selection criterion of the image selection circuit 21 is relaxed, that is, the allowable amount of change in characteristic point coordinate is increased.

Figure 11:
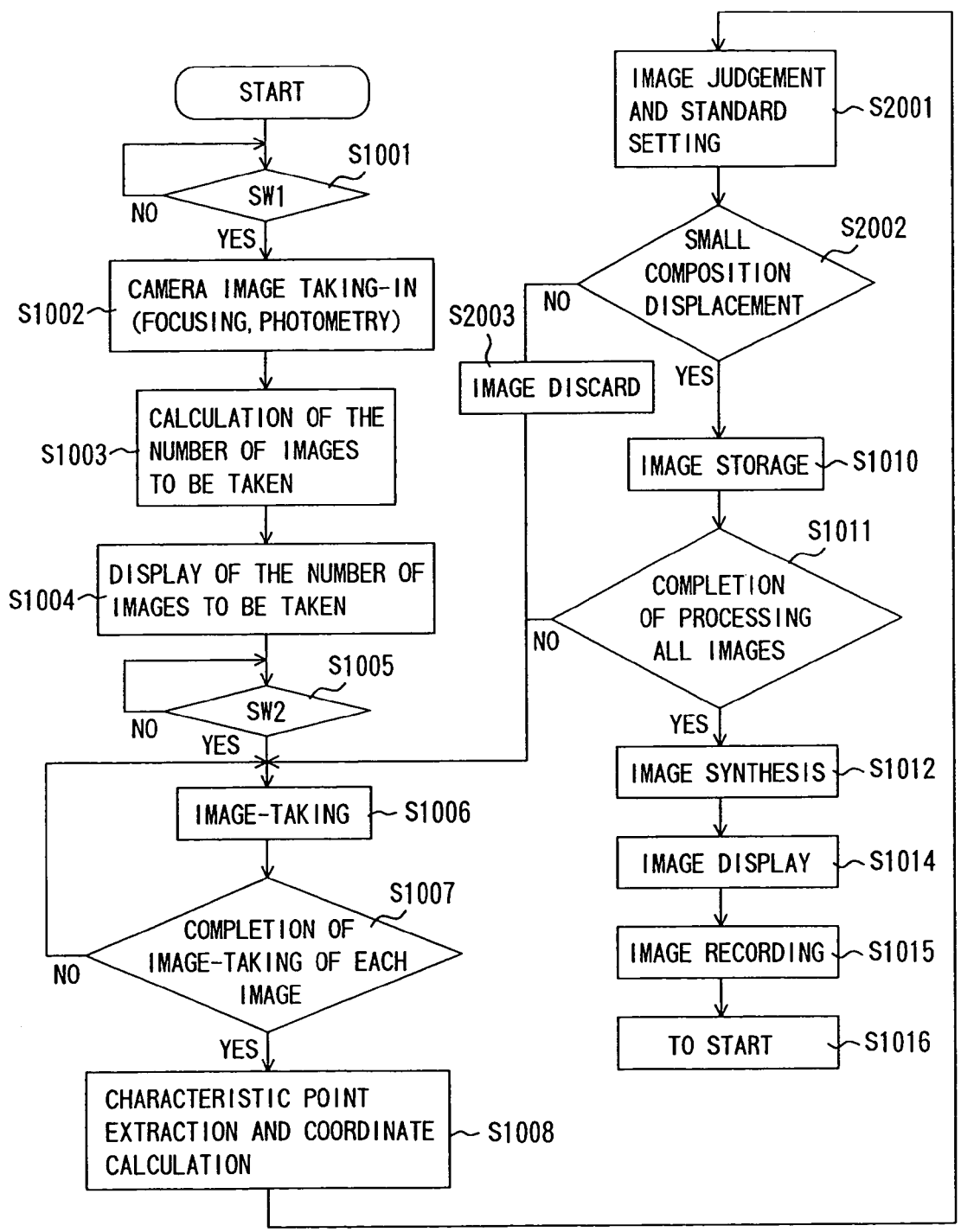
FIG. 11 is a flowchart showing image-taking operation in Embodiment 3.

FIG. 11 is a flowchart showing image-taking operation of the camera of this embodiment, and this flow starts when a vibration isolation switch provided on the camera is turned on.

In Step S1001, the process waits until the sw1 is turned on by half-depression of the release button by a photographer, and when the sw1 is turned on, the process advances to Step S1002.

In Step S1002, exposure to the image pickup device 15 is carried out. The image-taking control circuit 111 moves the image-taking lens 11 in the optical axis direction by driving the AF drive motor 14 while detecting the contrast of an image to be taken based on an output from the signal processing circuit 112. Then, at a point at which the contrast of the object image reaches its peak, by stopping the movement of the image-taking lens 11, the image-taking optical system is turned into a focused condition. Furthermore, the image-taking control circuit 111 determines the brightness of the object based on the output of the image pickup device 15.

In Step S1003, based on the brightness of the object determined in Step S1002, the number of images to be taken is determined.

For example, the brightness of the object is photometered, and for proper exposure based on the results of this photometry, it is supposed that it is necessary to set the stop 13 to full-open (for example, f2.8), and an opening period of the shutter 12, that is, an exposure period is set to ⅛ seconds.

Herein, when the focal length of the image-taking optical system is 30 mm as regards 35 mm film, it is feared that image-taking with an exposure period set to ⅛ seconds results in image blur due to vibration, so that in order to prevent image blur, the exposure period is set to 1/32 seconds and image-taking is carried out 8 times.

In Embodiment 1, the number of times of serial image-taking is set to 4 under the same conditions, however, in this embodiment, images with great composition displacement are not used for image synthesis, so that the number of images to be taken is set to be double by taking images to be discarded into account.

On the other hand, when the focal length of the image-taking optical system is 300 mm, in order to repress image blur, the exposure period is set to 1/320 seconds so that image-taking is carried out 80 times. This number of times is also double the number in the case of Embodiment 1.

In Step S1004, the number of images to be taken is displayed on a display unit provided within a finder of the camera or a liquid crystal display unit provided on the outer package of the camera so as to be known by a photographer.

In Step S1005, the process waits until the sw2 is turned on by full-depression of the release button. During this waiting step, when the half-depression of the release button is released and the sw1 is turned off, the process returns to start.

In Step S1006, image-taking of the first image is started.

In Step S1007, the process waits while circulating through Steps S1006 and S1007 until image-taking of the first image is completed. Then, when image-taking of the first image is completed, the process advances to Step S1008.

In Step S1008, a characteristic image (characteristic point) is extracted from a region 125 (FIG. 3 or FIG. 7) of the frame by the displacement detection circuit 113, and the coordinate of this image is determined.

In actuality correlative calculation is carried out to determine the amount of characteristic point change in this step, and when the process for the second image reaches this step, correlative calculation with the first image is carried out to determine an amount of characteristic point change.

Furthermore, as for the third and fourth images, in this step, correlative calculation with the first image stored in advance is also carried out to determine their amounts of characteristic point change.

In Step S2001, the selection criterion (an amount of characteristic point change as a benchmark for image selection) is changed according to the brightness of the image determined in Step S1002 by the selection control circuit 22.

In detail, in a case where a brightness of an object requires a total exposure period of ⅛ seconds for obtaining proper exposure, the allowable amount (selection criterion value) of composition displacement (amount of characteristic point change) is set to be double the amount in the case where a brightness of an object requires a total exposure period of 1/15 seconds.

For example, in a case where the total exposure period is 1/15 seconds, images to be used for image synthesis are selected by allowing an amount of characteristic point change up to a degree corresponding to 5 pixels (selection criterion) of the image pickup device 15. On the other hand, in a case where the total exposure period is ⅛ seconds, images to be used for image synthesis are selected by allowing an amount of characteristic point change up to a degree corresponding to 10 pixels (selection criterion).

In Step S2002, taken images are judged according to the image selection criterion determined in Step S2001, and when an image whose amount of characteristic point coordinate change exceeds the allowable amount (selection criterion) exists among the images to be judged, the process advances to Step S2003 and discards this image, and then returns to Step S1006.

Furthermore, when the first image is taken, image selection is not carried out and the process directly progresses to Step S1010.

In Step S1010, selected image data is stored in the image storage circuit 115.

In Step S1011, it is judged whether or not image-taking of the number of images to be taken determined in Step S1003 has been finished, and until all of the number of images to be taken is completely taken, the process returns to Step S1006 and repeats image-taking, characteristic point extraction, image selection, and image storage (Steps S1006 through S1010).

Thereby, all the image compositions of the second and subsequent images which are stored in the image storage circuit 115 agree with the image composition of the first image. Thereafter, when image-taking of all the images is finished, the process advances to Step S1012.

In Step S1012, the plurality of images stored in the image storage circuit 115 are synthesized.

Herein, the images are synthesized by arithmetic mean of coordinate signals corresponding to the respective images, and random noise in the images is reduced by arithmetic mean. Then, the gain of an image with reduced noise is increased to make exposure proper.

The point of difference between this embodiment and Embodiment 1 is in that, although the number of images to be synthesized in Embodiment 1 is determined to, for example, 4 when the total exposure period is ⅛ seconds, in this embodiment, the number of images to be selected is unknown.

Herein, when four or more images (proper images) to be used for image synthesis are obtained, among the obtained images, four images selected in order from an image with the smallest composition displacement (amount of characteristic point change) are used for image synthesis. On the other hand, when only two proper images are obtained, image synthesis is carried out by using only these two images, and the image gain is increased while slight noise is allowed, whereby exposure is made proper.

Furthermore, in Embodiment 1, in the image synthesized in Step S1013, a region in which the images do not overlap each other due to composition displacement is cut, and the image is expanded and complemented to the original frame size.

However, in this embodiment, since images with less composition displacement are selected and used for image synthesis, so that the region in which the images do not overlap is small, the step corresponding to Step S1013 of Embodiment 1 (FIG. 5) is omitted.

Namely, in this embodiment, vibration correction which reproduces the whole image-taking plane without waste is realized.

In Step S1014, the image data obtained in Step S1012 is displayed on a liquid crystal display unit provided on the camera back surface, etc., as a taken image.

In Step S1015, the image data obtained in Step S1012 is recorded onto a recording medium.

In Step S1016, the process returns to start.

Furthermore, when the release button is still continuously depressed halfway and the sw1 is on at the point of Step S1016, the process advances in the flow, Steps S1001, Step S1002, Step S1003, and Step S1004 in order again. When the release button is fully depressed and the sw2 is on at the point of Step S1016, the process does not return to start but waits at Step S1016.

As described above, in this embodiment, in place of image coordinate conversion of Embodiment 1, only images with less composition displacement are selected to carry out image synthesis.

Therefore, this has a disadvantage in that the number of images to be taken increases since discarding of images with great composition displacement is taken into account, however, it has advantages in that the great burden of image coordinate conversion is eliminated and the whole image plane can be reproduced since no image deficiency due to synthesis after coordinate conversion occurs.

Embodiment 4

A camera of Embodiment 4 of the present invention is a modified example of the camera of Embodiment 3, and the structure of the camera of this embodiment is similar to that described in Embodiment 3 (FIG. 10).

In Embodiment 3, as seen in the flowchart of FIG. 11, after image discard of Step S2003, additional image-taking is carried out corresponding to the number of discarded images, and needless image-taking can be prevented by making no allowance for the initial number of images to be taken. However, in this case, the point in that a photographer does not know the number of images to be taken in advance and the point in that a photographer cannot estimate the image-taking end lead to problems.

However, in the abovementioned method, a standard number of images to be taken is displayed for a photographer and image-taking is forcibly stopped when excessive images over the displayed number are to be taken, whereby image-taking without waste is possible.

Figure 12:
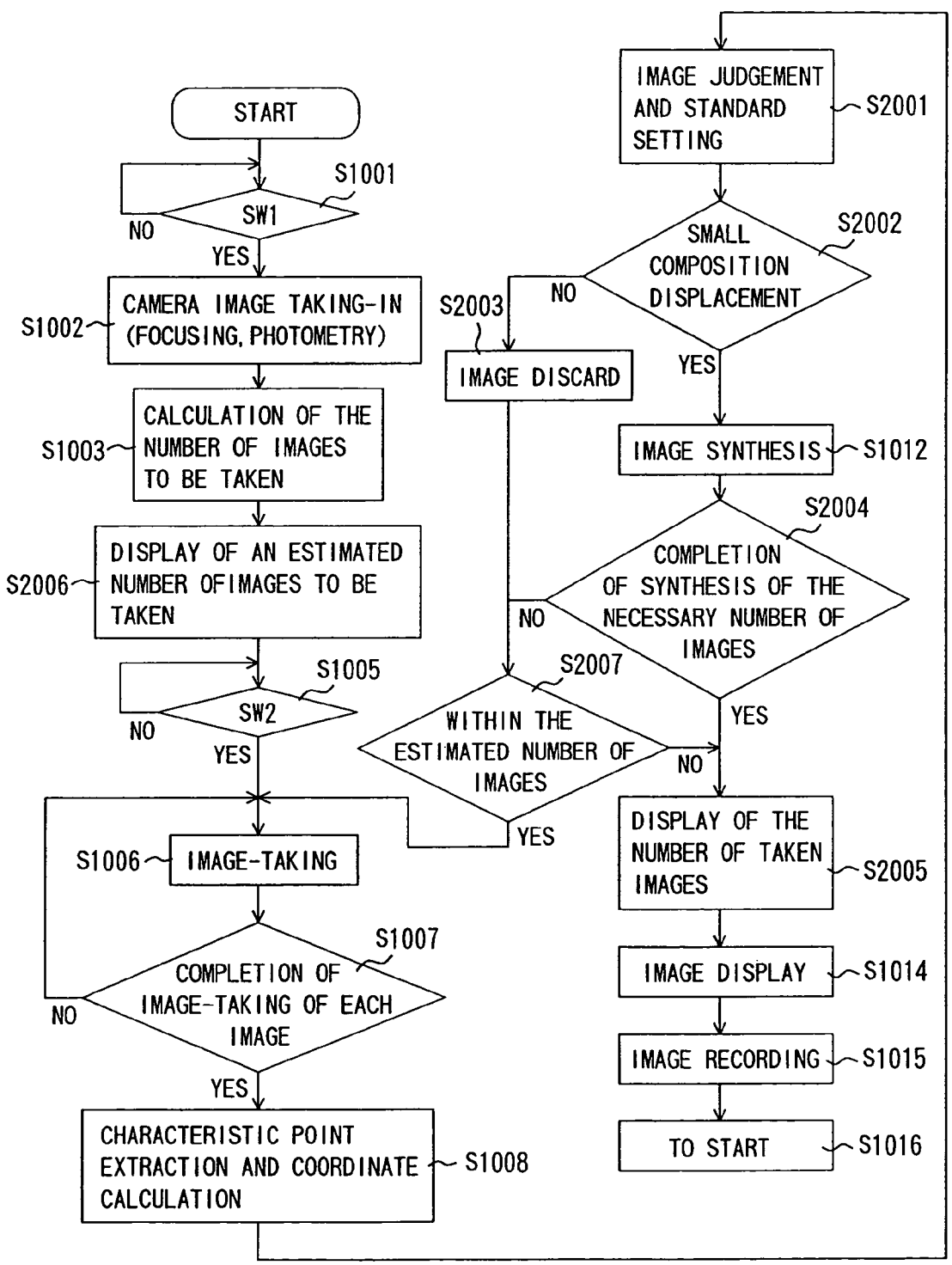
FIG. 12 is a flowchart showing image-taking operation in Embodiment 4 of the present invention.

FIG. 12 is a flowchart describing the abovementioned operation, and this flow starts when the vibration isolation switch provided on the camera is turned on.

In Step S1001, the process waits until the sw1 is turned on by half-depression of the release button by a photographer, and when the sw1 is turned on, the process advances to Step S1002.

In Step S1002, exposure of the image pickup device 15 is carried out. The image-taking control circuit 111 moves the image-taking lens 11 in the optical axis direction by driving the AF drive motor 14 while detecting the contrast of an image on the basis of an output from the signal processing circuit 112. Then, when the contrast of the object image reaches its peak, the image-taking optical system is turned into a focused condition by stopping the movement of the image-taking lens 11. Simultaneously, the brightness of the object is determined on the basis of an output of the image pickup device 15.

In Step S1003, based on the brightness of the object determined in Step S1002, the number of images to be taken is determined.

For example, the brightness of the object is measured (photometry), and for proper exposure based on the results of this photometry, it is assumed that the stop 13 must be set to full-open (for example, f2.8) and the opening period (exposure period) of the shutter 12 must be set to $1/8$ seconds.

Herein, when the focal length of the image-taking optical system is 30 mm as regards 35 mm film, image-taking with an exposure period of $1/8$ seconds may cause image blur due to vibration, so that the exposure period is set to $1/32$ seconds and image-taking is carried out 8 times so as not to cause image blur.

In Embodiment 1, the number of times of image-taking is set to four under the same conditions, however, in this embodiment, images with great composition displacement are not used for synthesis, so that the number of images to be taken is set to be double by taking images to be discarded into account.

On the other hand, under the abovementioned conditions, when the focal length of the image-taking optical system is 300 mm, the exposure period is set to $1/320$ seconds and image-taking is carried out 80 times so as not to cause image blur. This setting is double the setting of Embodiment 1.

In Step S2006, an estimated number of images to be taken is displayed on a display unit provided within a camera finder or a liquid crystal display unit provided on the outer package of the camera so as to be known by a photographer.

Herein, the reason for using "estimated" is that the actual number of images to be used for image synthesis changes depending on amounts of composition displacement (amounts of characteristic point change) of the respective taken images. For example, in a case where a camera is securely fixed and none of the images has composition displacement, image-taking is finished when four images are taken. On the other hand, when an image with great composition displacement is obtained, there is a possibility that images necessary for image synthesis are insufficient even when eight images are taken. Therefore, by considering this, an estimated number of images is displayed.

In Step S1005, the process waits until the sw2 is turned on by full depression of the release button. During this waiting step, when the half-depression of the release button is released and the sw1 is turned off, the process returns to start.

In Step S1006, image-taking of the first image is started.

In Step S1007, the process waits while circulating through. Steps S1006 and S1007 until image-taking of the first image is completed. Then, when image-taking of the first image is completed, the process advances to Step S1008.

In Step S1008, a characteristic image (characteristic point) is extracted from the peripheral region 125 (FIG. 3 or FIG. 6) of the frame by the displacement detection circuit 113, and the coordinate of this image is determined.

In actuality, an amount of characteristic point change is determined through correlative calculation in this step, and when the process for the second image reaches this step, correlative calculation with the first image is carried out to determine the amount of characteristic point change.

Furthermore, for the third and fourth images, in this step, correlative calculation with the first image stored in advance is also carried out to determine their amounts of characteristic point change.

In Step S2001, the selection control circuit 22 changes the selection criterion of the image selection circuit 21 (amount of characteristic point change as a benchmark for image selection) according to the image brightness determined in Step S1002.

In detail, in the case where the brightness of the object requires a total exposure period of $1/8$ seconds for proper exposure, an allowable amount of composition displacement is set to be double the amount in the case where the brightness of the object requires a total exposure period of $1/15$ seconds.

For example, in the case of a total exposure period of $1/15$ seconds, when an amount of characteristic point change is allowed up to a degree corresponding to 5 pixels (selection criterion) of the image pickup device 15, an amount of characteristic point change is allowed up to a degree corresponding to 10 pixels (selection criterion) in the case of a total exposure period of $1/8$ seconds.

In Step S2002, based on the image selection criterion determined in Step S2001, taken images are judged, and in a case where an image whose characteristic point coordinate exceeds the allowable amount (selection criterion) exists among the images to be judged, the process advances to Step S2003 and discards this image, and then returns to Step S1006.

When the first image is taken, the process advances to Step S1012 without image selection.

In Step S1012, selected images are synthesized.

Herein, image synthesis is carried out by arithmetic mean of coordinate signals corresponding to the respective images, and random noise in the images is reduced by arithmetic mean. Then, the gain of an image with reduced noise is increased to make exposure proper.

In Step S2004, it is judged whether or not the number of images to be taken necessary for proper exposure have been synthesized.

For example, in a case where a total exposure period is ⅛ seconds, and image-taking is carried out a plurality of times by setting an exposure period of 1/32 seconds, four images with less composition displacement selected in Step S2002 are obtained, and when these images are synthesized, the process advances to Step S2005.

On the other hand, in a case where the necessary number of images have not been synthesized, the process returns to Step S1006 and repeats image-taking, characteristic point extraction, image selection, and image synthesis (Steps S1006 through S1012) until the necessary number of images are synthesized.

Furthermore, Step S2007 is set between Step S2004 and Step S1006, and when the current number of taken images is less than the estimated number of images to be taken (for example, 8), the process advances to Step S1006, and when the estimated number is exceeded, the process advances to Step S2005.

This is for preventing a needless increase in the number of images to be taken in order to take images with less composition displacement.

In a case where the number of taken images necessary for proper exposure could not be obtained as images for synthesis, for example, when only two images with less composition displacement are obtained although four images are necessary for image synthesis, only the obtained images are synthesized and the gain of the synthesized image signal is increased to correct exposure.

Furthermore, in Embodiment 1, in the image synthesized in Step S1013, a region that includes no overlapping due to composition displacement is cut and the image is expanded and complemented to the original frame size.

However, in this embodiment, since images with less composition displacement are selected and used for image synthesis, the region without image overlapping is small, so that the step corresponding to Step S1013 of Embodiment 1 is omitted.

Namely, in this embodiment, vibration correction which realizes reproduction of the whole image-taking plane without waste is possible.

In Step S2005, the number of images actually taken is displayed on a display unit provided within the camera finder or a liquid crystal display unit provided on the camera back surface.

In Step S1014, synthesized image data obtained in Step S1012 is displayed on a liquid crystal display unit provided on the camera back surface, etc., as a taken image.

In Step S1015, image data obtained in Step S1012 is recorded onto a recording medium.

In Step S1016, the process returns to start.

Furthermore, when the sw1 is still on by continuous half-depression of the release button at the point of Step S1016, the process advances in the flow, Step S1001, Step S1002, and Step S1003 in order again. Furthermore, when the sw2 is still on by full-depression of the release button at the point of Step S1016, the process does not return to start but waits at Step S1016.

Every synthesis of a plurality of images improves underexposure of the images one by one. Therefore, the number of images to be taken necessary for exposure improvement can be known in advance by means of photometry before image-taking.

However, among the taken images, some images have great composition displacement and are not suitable for synthesis.

Therefore, in the abovementioned Embodiment 3 and Embodiment 4, when image-taking of a plurality of images is executed, images more than the necessary number of images are taken in advance, and among the obtained images, images with comparatively less composition displacement are selected and the selected images are synthesized, whereby a synthesized image with less image blur can be obtained.

For example, for a long period of exposure, one time of exposure image-taking is divided into many short periods of exposure image-taking, however, as the number of images to be taken increases, composition displacement of the respective image also increases.

Therefore, it is feared that the necessary number of images suitable for synthesis cannot be selected by the image selection circuit 21.

Therefore, in Embodiment 4, the selection criterion is relaxed in a case of an image-taking condition involving a long period of exposure so that images with slight composition displacement are selected, whereby image-taking is reliably continued.

Embodiment 5

Figure 13:
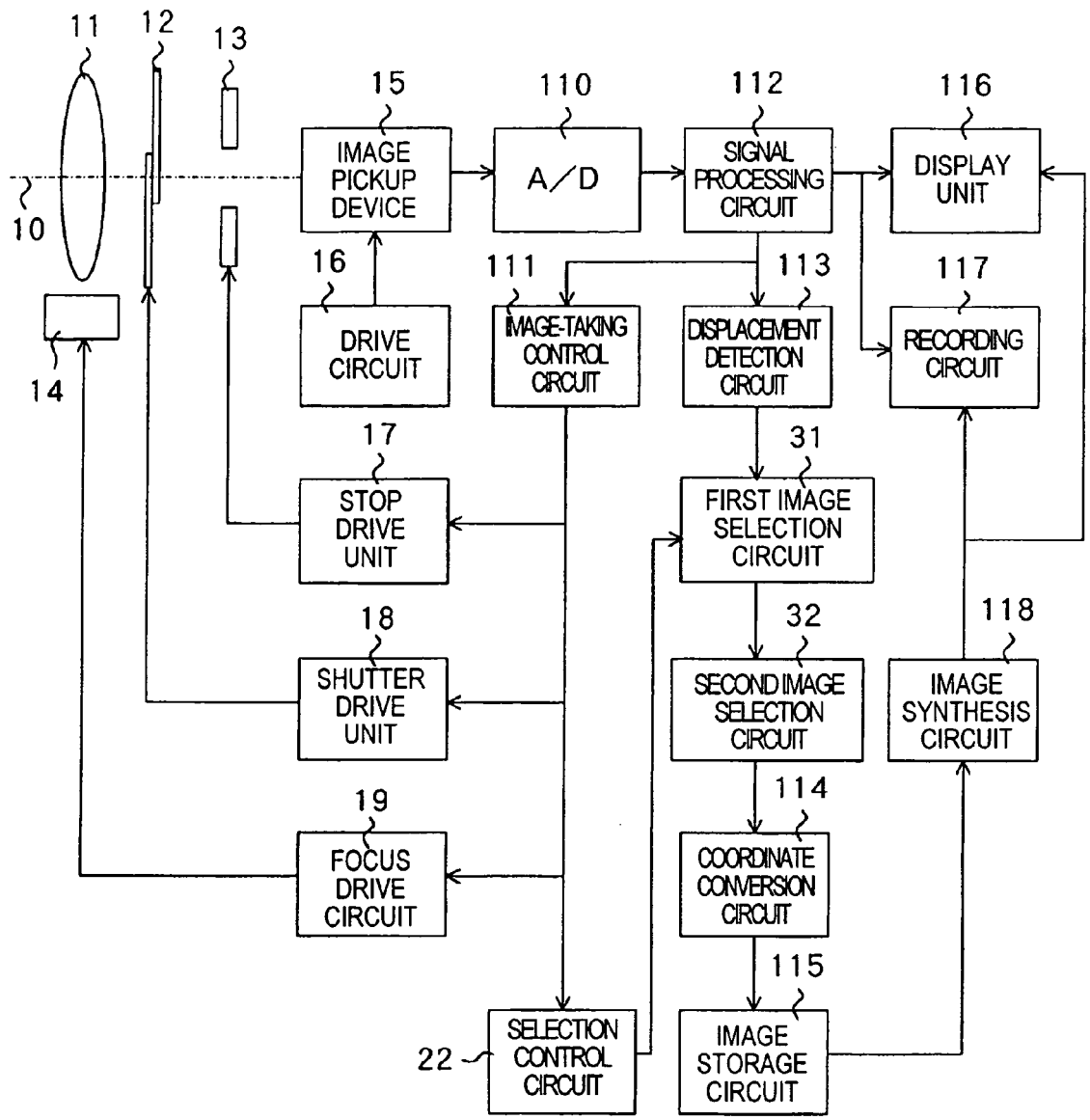
FIG. 13 is a block diagram of a camera of Embodiment 5 of the present invention.

FIG. 13 is a block diagram of a camera of Embodiment 5 of the present invention. In this figure, the same members as those described in FIG. 1 and FIG. 10 are attached with the same symbols and description thereof is omitted.

In this embodiment, a point of difference from Embodiment 3 (Embodiment 4) is in that images with some degree of composition displacement are allowed by the image selection circuit and used as images to be synthesized, and these images are subjected to coordinate conversion in the same manner as in Embodiment 1 so that composition displacement is corrected.

Furthermore, for image selection, not only characteristic point changes at still objects (region 125 of FIG. 3 or FIG. 7) at the periphery of the frame as in Embodiment 3 but also characteristic point changes at a main object (person) are considered.

Herein, the reason why image coordinate conversion as in Embodiment 1 is carried out and image selection as in Embodiment 2 is carried out is described.

Among a plurality of taken images in actuality, some images increase their composition displacement as the image-taking period becomes longer.

In a case of such great composition displacement, even when synthesis is carried out after coordinate conversion is applied to the images, an image plane deficiency (region 127 of FIG. 4) becomes larger, resulting in an excessively narrow image region to be observed.

Furthermore, in the case of great composition displacement, images not only shift on the coordinates but also increase their image distortion due to camera lens characteristics and a change in tilt and shift posture of the camera, so that the whole image does not overlap the previous image well even through some characteristic point changes on the images is corrected by the coordinate conversion.

Therefore, only images with composition displacement that is small to some degree are selected, and these selected images are subjected to coordinate conversion, and then image-synthesized.

Next, the point in that not only the characteristic point changes at the periphery of the image plane as in Embodiment 2 but also amounts of motion of the main object are taken into account for image selection is described.

As the exposure period becomes longer, not only composition changes due to vibration (hand shaking) but also motion of the main object (object vibration) increase.

Then, in each image-taking, if images including great motion of the main object are synthesized, the main object in the synthesized image blurs.

For example, when the process comes close to the last image-taking during image-taking of a plurality of images, the main object (person) misunderstands that the image-taking has been finished and may move from the image-taking position.

Therefore, in this embodiment, such images including great motion of the main object are not used for synthesis.

In FIG. 13, when a characteristic point change is great in a region having a high possibility of including the main object like the region 126 of FIG. 3 or the region 126 of FIG. 7, the image with this change is not used for synthesis.

A signal outputted from the signal processing circuit 112 is inputted into the displacement detection circuit 113, and a characteristic point change is determined in this displacement detection circuit 113.

To determine this characteristic point change, the image-taking plane is divided into the region 125 (excluding a main object region) and region 126 (including the main object region, etc.) of FIG. 3 and FIG. 7, and characteristic point changes are determined in the respective regions. Then, a plurality of characteristic point changes are determined in the respective regions, and an average or the abovementioned minimum value is determined for each region.

The first image selection circuit 31 carries out image selection based on the characteristic point change in the region 125 (FIG. 3 and FIG. 7) of the taken image by the displacement detection circuit 113 and the selection criterion (amount of characteristic point change as a benchmark for image selection) determined in the selection control circuit 22, and outputs only the selected images to the second image selection circuit 32.

Herein, the image selection criterion is not stricter than that in Embodiment 3. The reason for this is that some degree of composition displacement (characteristic point change) can be corrected (coordinate-converted) by the coordinate conversion circuit 114.

Therefore, in Embodiment 3, for example, in a case where a total exposure period is 1/15 seconds, an amount of characteristic point change is allowed up to a degree corresponding to 5 pixels (selection criterion) of the image pickup device 15, however, in this embodiment, an amount of characteristic point change is allowed up to a degree corresponding to 10 pixels (selection criterion).

In addition, this selection criterion is changed by the selection control circuit 22 in the same manner as in Embodiment 3, and in a case where the brightness of an object requires a total exposure period of 1/8 seconds, the value of the selection criterion is set to be double the value in the case where the brightness of the object requires a total exposure period of 1/15 seconds.

For example, image selection is carried out, in a case of a total exposure period of 1/15 seconds, by allowing an amount of characteristic point change up to a degree corresponding to 10 pixels (selection criterion) of the image pickup device 15, and in a case of a total exposure period of 1/8 seconds, image selection is carried out by allowing the amount of characteristic point up to a degree corresponding to 20 pixels (selection criterion).

The second image selection circuit 32 carries out image selection based on a characteristic point change in the region 126 (FIG. 3 and FIG. 7) detected by the displacement detection circuit 113, and outputs only the selected images to the coordinate conversion circuit 114.

Furthermore, the characteristic point change herein is a value from which the characteristic point change in the region 125 has been deleted so as to express pure motion of the main object (person) without composition displacement as a characteristic point change, and is not simply determined as the characteristic point change in the region 126.

The role of the second image selection circuit 32 is to prevent images including the main object with great vibration from being used for image synthesis as mentioned above, and for example, it prevents images including main object vibration (amount of characteristic point change) equivalent to 10 pixels or more of the image pickup device 15 from being used for synthesis.

The coordinate conversion circuit 114 applies coordinate conversion to the images outputted from the second image selection circuit 32 based on the characteristic point change in the region 125 as in Embodiment 1, and outputs the results of this coordinate conversion to the image storage circuit 115.

When the image storage circuit 115 stores data of the respective images corresponding to the number of images to be synthesized necessary for proper exposure, it outputs these image data to the image synthesis circuit 118.

The image synthesis circuit 118 synthesizes the inputted images to one image by arithmetic mean, properly changes the gain thereof, cuts the image deficiency region 127 of FIG. 4 and enlarges and complements the synthesized image to the original frame size.

Then, the finished image data is outputted to the display unit 116 and the recording circuit 117, displayed as a taken image on the liquid crystal display unit provided on the camera back surface, and recorded onto a recording medium comprising a semiconductor memory, etc.

Figure 14:
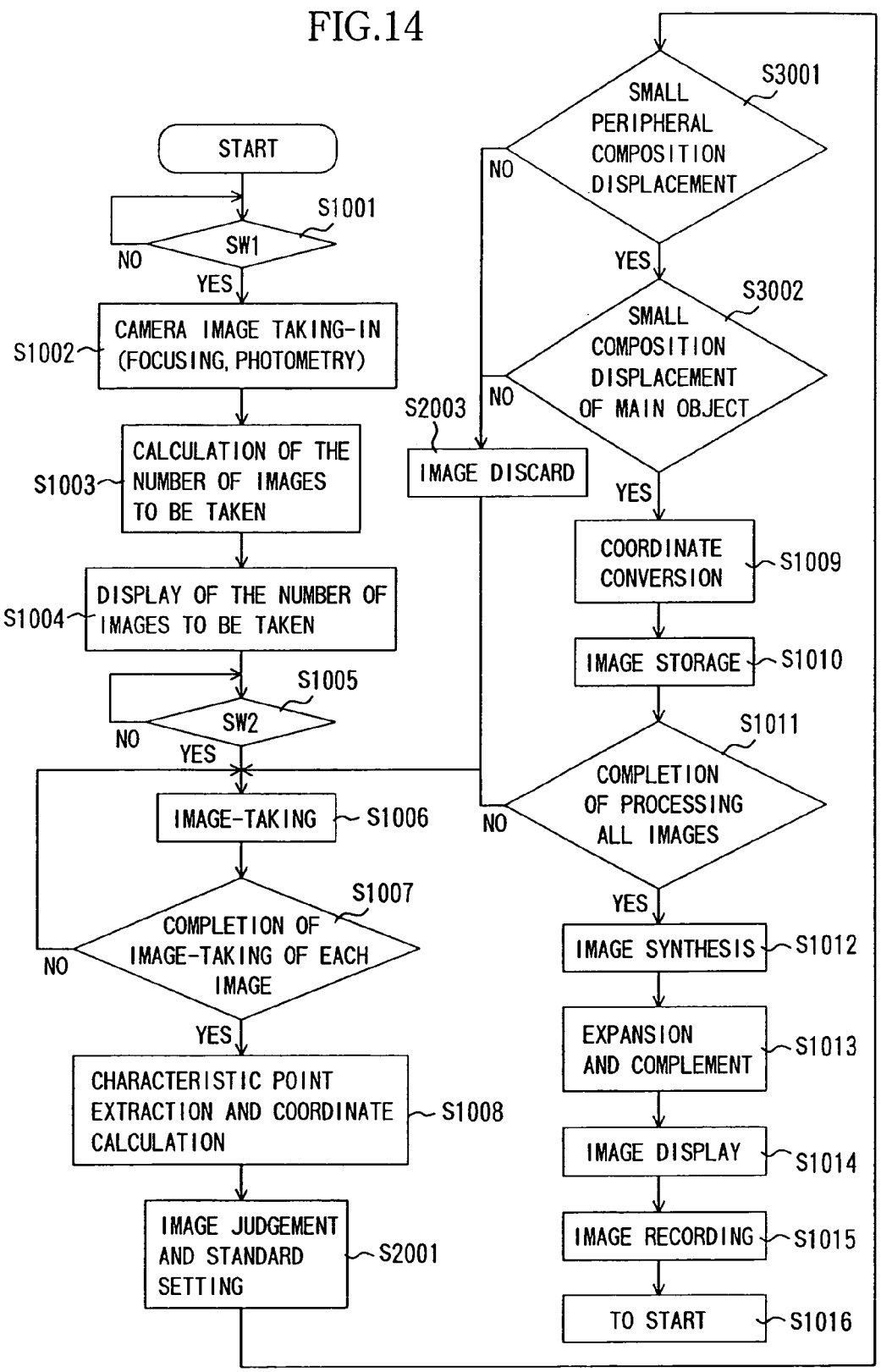
FIG. 14 is a flowchart showing image-taking operation in Embodiment 5.

FIG. 14 is a flowchart showing the image-taking operation in this embodiment, and this flow starts when the vibration isolation switch is turned on.

In Step S1001, the process waits until the sw1 is turned on in response to half-depression of the release button by a photographer, and when the sw1 is turned on, the process advances to Step S1002.

In Step S1002, imaging by the image pickup device 15 is carried out. The image-taking control circuit 111 moves the image-taking lens 11 in the optical axis direction by driving the AF drive motor 14 while detecting the contrast of the image based on the output of the signal processing circuit 112. Then, when the contrast reaches its peak, the movement of the image-taking lens 11 is stopped. Whereby, the image-taking optical system is turned into a focused condition.

Furthermore, the image-taking control circuit 111 determines the brightness of the object based on an output of the image pickup device 15.

In Step S1003, based on the brightness of the object determined in Step S1002, the number of images to be taken is determined.

For example, the brightness of the object is measured (photometry), and for proper exposure based on the results of this photometry, it is assumed that the stop 13 must be set to full-open (for example, f2.8) and the opening exposure of the shutter 12, that is, the exposure period must be set to 1/8 seconds.

Herein, when the focal length of the image-taking optical system is 30 mm as regards 35 mm film, it is feared that image blur occurs due to vibration during image-taking with an exposure period set to 1/8 seconds, so that the exposure period is set to 1/32 seconds and image-taking is carried out 6 times so as not to cause image blur.

In Embodiment 1, the number of times of image-taking is set to 4 times under the same conditions, and in Embodiment 3, images with great composition displacement (amount of characteristic point change) are not used for synthesis, so that the number of images to be taken is doubled by taking images to be discarded into account.

On the other hand, in this embodiment, the judgment criterion for discarding due to composition displacement of images is relaxed (the selection criterion value is raised), and in the signal processing, composition displacement is corrected by coordinate conversion, so that the number of images to be taken is set to be smaller than in Embodiment 3.

Furthermore, when the focal length of the image-taking optical system is 300 mm, the exposure period is set to 1/320 seconds and image-taking is carried out 60 times so as to eliminate the possibility of image blur.

In this case, the number of images to be taken is also set to be larger than in Embodiment 1 and smaller than in Embodiment 3.

In Step S1004, the number of images to be taken is displayed on a display unit provided within the camera finder or a liquid crystal display unit provided on the outer package of the camera so as to be known by a photographer.

In Step S1005, the process waits until the sw2 is turned on in response to full-depression of the release button.

When the half-depression is released and the sw1 is turned off during this waiting step, the process returns to start.

In Step S1006, image-taking of the first image is started.

In Step S1007, the process waits while circulating Step S1006 and Step S1007 until image-taking of the first image is completed. Then, when image-taking of the first image is completed, the process advances to Step S1008.

In Step S1008, a characteristic image (characteristic points) is extracted from the region 125 (FIG. 3 and FIG. 7) within the image-taking plane and the coordinate of the image is determined by the displacement detection circuit 113.

In actuality, an amount of characteristic point change is determined by executing correlative calculation herein, and when image-taking of the second image is carried out and the process reaches this step, correlative calculation of the second image with the first image is executed to determine the amount of characteristic point change.

As mentioned above, in this step, characteristic point changes in the two regions 125 and 126 (FIG. 3 and FIG. 6) are determined, and a plurality of characteristic point changes are determined in each of the region 125 (periphery of the image plane) and the region 126 (main object region, etc.). Then, an average or a minimum value as mentioned above is determined for each region and regarded as an amount of characteristic point change of each region.

For the characteristic point in the region 126, a difference in an amount of motion in the region 125 from an actual amount of image coordinate movement in the region 126 is determined, whereby the characteristic point change of the region 126 is determined as pure object vibration excluding composition displacement caused by vibration.

Likewise, as for the third image and fourth image, correlative calculation with the first image stored in advance is carried out to determine their amounts of characteristic point change in Step S1008.

In Step S2001, the selection control circuit 22 changes the selection criterion (first selection criterion) of the first image selection circuit 31 according to the brightness of the image determined in Step S1002.

In this first selection criterion change, in a case where the object brightness requires a total exposure period of 1/8 seconds for proper exposure as mentioned above, the first election criterion value is set to be double the value in a case where the object brightness requires a total exposure period of 1/15 seconds.

For example, in a case where the total exposure period is 1/15 seconds, the amount of characteristic point change is allowed up to a degree corresponding to 10 pixels of the image pickup device 15, and in a case where the total exposure period is 1/8 seconds, the amount is allowed up to a degree corresponding to 20 pixels.

In Step S3001, composition displacement of a taken image is judged based on the characteristic point change in the region 125 determined in Step S1008 and the first selection criterion determined in Step S2001. Herein, when the coordinate change of the characteristic point exceeds the allowable amount (first selection criterion value), the process advances to Step S2003, discards this image, and returns to Step S1006.

In a case where only the first image is taken, the process directly progresses to Step 3002 without image selection.

In Step S3002, composition displacement of a taken image is judged based on the characteristic point change in the region 126 determined in Step S1008. When the amount of coordinate change of the characteristic point exceeds the predetermined allowable amount (second selection criterion value), the process advances to Step S2003, discards this image, and returns to Step S1006.

The judgement criterion for the Step S3002 may also be changed according to the image-taking conditions such as the exposure period as in Step S3001.

Also, in this Step S3002, in a case where only the first image is taken, the process directly progresses to Step S1009 without image selection.

In Step S1009, image coordinate conversion is carried out based on the characteristic point change in the region 125 determined in Step S1008, and the second and subsequent images are processed so as to overlap the first image.

In Step S1010, the first image and the second and subsequent images which are selected in Step S3002 are stored in the image storage circuit 115.

In Step S1011, it is judged whether or not image-taking of all of the images determined in Step S1003 has been finished, and until image-taking of all images is finished, the process returns to Step S1006 and repeats image-taking, characteristic point extraction, image selection, and image storage (Step S1006 through Step S1010).

Furthermore, in this flow, it appears that image-taking of the second image is executed after image-taking of the first image is finished, however, in actuality, even during characteristic point extraction, coordinate calculation, and image storage of the first image, imaging and reading-out of the second image from the image pickup device 15 are carried out.

Thereby, the compositions of the second and subsequent images to be stored in the image storage circuit 115 all agree with the composition of the first image.

When image-taking of all images is finished, the process advances to Step S1012.

In Step S1012, image synthesis is carried out.

Herein, image synthesis is carried out by arithmetic mean of coordinate signals corresponding to the respective images, and random noise in the images is reduced by arithmetic mean. Then, the gain of the image with reduced noise is increased to make exposure proper.

Furthermore, it is unknown in this step whether or not the number of images necessary for synthesis can be obtained as in Embodiment 3.

Namely, even when six images are taken, the number of images that have less composition displacement or less main object displacement and can be used for image synthesis may be 6, or may be only 3.

Therefore, in this step, for example, in a case where the number of images necessary for synthesis is four, and four or more proper images are obtained, four images selected in order from the image with the smallest composition displacement (amount of characteristic point change) among the images are used for synthesis.

On the other hand, in a case where the number of obtained proper images is less than 4 (for example, 3), image synthesis is carried out by using only this number of images, slight noise is allowed, and the gain of the image is increased to make exposure proper.

In Step S1013, a region (region 127 of FIG. 4) in which the respective images do not overlap each other due to composition displacement in the image synthesized in Step S1012 is cut, and the image is expanded and complemented to the original frame size.

In Step S1014, the image obtained in Step S1013 is displayed on the liquid crystal display unit provided on the camera back surface, etc.

In Step S1015, the image obtained in Step S1013 is recorded onto a recording medium.

In Step S1016, the process returns to start.

When the release button is still continuously depressed halfway and the sw1 is still on at the point of Step S1016, the process advances in the flow in order again, to Steps S1001, S1002, S1003, and S1004.

Furthermore, when the sw2 is on by full-depression of the release button at the point of Step S1016, the process does not return to start but waits at Step S1016.

Embodiment 6

Embodiment 6 of the present invention is a modified example of the abovementioned Embodiment 5, and the structure of the camera of this embodiment is similar to that described in Embodiment 5 (FIG. 13).

As seen in the flowchart of FIG. 14, after image discard in Step S2003, additional image-taking is carried out accordingly, and needless image-taking can be prevented by making no allowance for the initial number of images to be taken. However, in this case, the point in that a photographer never knows the number of images to be taken in advance and the point in that a photographer cannot estimate the image-taking end lead to problems.

However, even in the abovementioned method, the standard number of images to be taken is displayed for a photographer and image-taking is forcibly stopped when image-taking of images over the standard number is carried out, image-taking without waste can be carried out.

Figure 15:
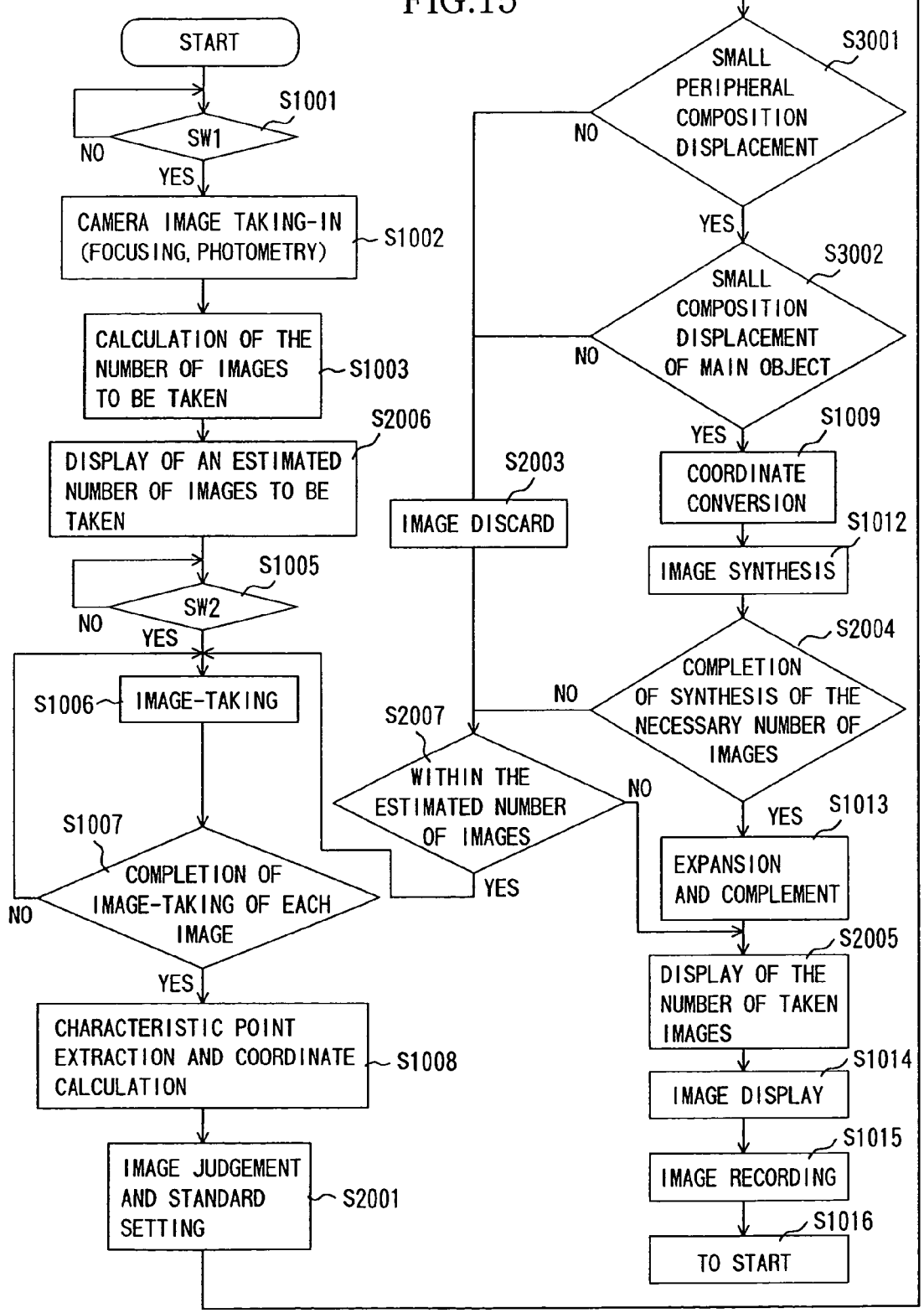
FIG. 15 is flowchart showing image-taking operation in Embodiment 6 of the present invention.

FIG. 15 is a flowchart explaining abovementioned operation, and this flow starts when the vibration isolation switch is turned on.

In Step S1001, the process waits until the sw1 is turned on in response to half-depression of the release button by a photographer, and when sw1 is turned on, the process advances to Step S1002.

In Step S1002, imaging is carried out by the image pickup device 15. The image-taking control circuit 111 moves the image-taking lens 11 in the optical axis direction by driving the AF drive motor 14 while detecting the contrast of the image based on an output from the signal processing circuit 112. Then, when the contrast becomes highest, the movement of the image-taking lens 11 is stopped. Thereby, the image-taking optical system is turned into a focused condition.

Furthermore, the image-taking control circuit 111 determines the brightness of the object based on an output of the image pickup device 15 simultaneously.

In Step S1003, based on the brightness of the object determined in Step S1002, the number of images to be taken is determined.

For example, the brightness of an object is measured (photometry), and for proper exposure based on the results of this photometry, it is assumed that the stop 13 must be set to full-open (for example, f2.8) and the opening exposure of the shutter 12, that is, the exposure period must be set to 1/8 seconds.

Herein, when the focal length of the image-taking optical system is 30 mm as regards 35 mm film, it is feared that image blur due to vibration occurs in image-taking with an exposure period set to 1/8 seconds, so that the exposure period is set to 1/32 seconds and image-taking is carried out 6 times so as to eliminate the possibility of image blur.

In Embodiment 1, the number of times of image-taking is set to 4 under the same conditions, and in Embodiment 3, images with great composition displacement are not used for synthesis, so that the number of images to be taken is set to be double by taking images to be discarded into account.

In this embodiment, the judgement criterion for discarding of images with composition displacement is relaxed, and the number of images to be taken is set to be smaller than in Embodiment 3 with the premise that the composition displacement is corrected by coordinate conversion in the signal processing step.

On the other hand, when the focal length of the image-taking optical system is 300 mm, the exposure period is set to 1/320 seconds and image-taking is carried out 60 times so as to eliminate the possibility of image blur.

In this case, the number of images to be taken is also set to be larger than in Embodiment 1 and smaller than in Embodiment 3.

In Step S2006, an estimated number of images to be taken is displayed on a display unit provided within a camera finder or a liquid crystal display unit provided on the outer package of the camera so as to be known by a photographer.

Herein, the reason for using "estimated" is that the actual number of the images to be used for image synthesis changes depending on amounts of composition displacement (amounts of characteristic point change) of the respective taken images. For example, in a case where a camera is securely fixed and none of images has composition displacement, image-taking is finished when four images are taken. On the other hand, when an image with great composition displacement is obtained for every time of image-taking, there is a possibility that images necessary for image synthesis are insufficient even when eight images are taken. Therefore, by considering this, an estimated number of images is set.

In Step S1005, the process waits until the sw2 is turned on by full-depression of the release button.

Furthermore, during this waiting step, when the half-depression of the release button is released and the sw1 is turned off, the process returns to start.

In Step S1006, image-taking of the first image is started.

In Step S1007, the process waits while circulating through Steps S1006 and S1007 until image-taking of the first image is completed. Then, when image-taking of the first image is completed, the process advances to Step S1008.

In Step S1008, a characteristic image (characteristic point) is extracted from the region 125 (FIG. 3 or FIG. 6) within the image-taking plane by the displacement detection circuit 113, and the coordinate of this image is determined.

In actuality, an amount of characteristic point change is determined by executing correlative calculation herein, and image-taking of the second image is carried out and when the process reaches this step, correlative calculation of the second image and the first image is carried out to determine the amount of characteristic point change.

As mentioned above, in this step, characteristic point changes in the two regions 125 and 126 are determined, and a plurality of characteristic point changes are determined for each of the region 125 (periphery, etc., of the image plane) and the region 126 (main object region, etc.). Then, an average or a minimum value as mentioned above is determined for each region and regarded as a characteristic point change of each region.

For the characteristic point of the region 126, a difference in an amount of motion of the region 125 from the amount of movement of the coordinate of the image of the actual region 126 is determined, whereby the characteristic point change of the region 126 is determined as only pure object vibration excluding the composition displacement due to vibration.

For the third image and fourth image, correlative calculation with the first image stored in advance is carried out in the same manner to determine their amounts of characteristic point change in Step S1008.

In Step S2001, the selection control circuit 22 changes the first selection criterion (amount of characteristic point change as a benchmark for image selection) at the first image selection circuit 31 according to the brightness of the image determined in Step S1002.

In this first selection criterion change, in a case where the brightness of the object requires a total exposure period of ⅛ seconds for proper exposure as mentioned above, the allowable amount of composition displacement (first selection criterion value) is set to be double the value in a case where the brightness of the object requires a total exposure period of 1/15 seconds.

For example, when the total exposure period is 1/15 seconds, the amount of characteristic point change is allowed up to a degree corresponding to 10 pixels (first selection criterion) of the image pickup device 15, and when the total exposure period is ⅛ seconds, the amount is allowed up to a degree corresponding to 20 pixels (first selection criterion). Then, as described later, by comparison between the amount of characteristic point change and the first selection criterion, images to be used for synthesis are selected.

In Step S3001, based on the characteristic point change in the region 125 determined in Step S1008 and the image selection criterion determined in Step S2001, composition displacement of the taken image is judged. When the amount of coordinate change of the characteristic point exceeds the allowable amount (first selection criterion value), the process advances to Step S2003, discards this image, and progresses to Step S2007.

Furthermore, in a case where only the first image is taken, the process directly progresses to Step S3002 without image selection.

In Step S3002, composition displacement of a taken image is judged based on the characteristic point change in the region 126 determined in Step S1008. Then, when the amount of coordinate change of the characteristic point exceeds a predetermined allowable amount (second selection criterion value), the process advances to Step S2003, discards this image, and returns to Step S2007.

Furthermore, the judgement criterion (second selection criterion) in this step can also be changed according to the image-taking conditions such as the exposure period as in step S2001. Also, in this step S3002, when only the first image is taken, the process directly progresses to Step S1009 without image selection.

In Step S1009, image coordinate conversion is carried out based on the characteristic point change in the region 125 determined in Step S1008, and the second and subsequent images are processed so as to overlap the first image.

In Step S1012, image synthesis is carried out.

Herein, image synthesis is carried out by arithmetic mean of coordinate signals corresponding to the respective images, and random noise in the images is reduced by arithmetic mean. Then, the gain of the image with reduced noise is increased to make exposure proper.

In Step S2004, it is judged whether or not the number of images necessary for making exposure proper have been synthesized.

For example, in a case where exposure for a total of ⅛ seconds is carried out by four times of 1/32-second exposure, when four images (necessary number of images) with less composition displacement which have passed through Steps S3001 and S3002 are obtained, the process advances to Step S1013 when these images are synthesized, and otherwise the process advances to Step S2007.

Step S2007 is provided between Step S2003 and Step S1006, and when the current number of taken images is less than the estimated number of images to be taken (for example, 8), the process advances to Step S1006, and when the current number exceeds the estimated number, the process advances to Step S2005.

This is for preventing a needless increase in number of images to be taken due to taking an image with less composition displacement.

In a case where the number of images for synthesis necessary for proper exposure could not be obtained, for example, when only two images with less composition displacement (satisfying the abovementioned selection criterion) are obtained although four images are necessary for synthesis, only the obtained images are synthesized and the gain of the signal is increased to correct exposure.

In Step S1013, in the image synthesized in Step S1012, a region in which the respective images do not overlap due to composition displacement (region 127 of FIG. 4) is cut, and the image is expanded and complemented to the original frame size.

In Step S2005, the number of taken images is displayed on the liquid crystal display unit, etc., on the camera.

In Step S1014, the image obtained in Step S1013 is displayed on the liquid crystal display unit provided on the camera back surface, etc.

In Step S1015, the image data obtained in Step S1013 is recorded onto a recording medium.

In step S1016, the process returns to start.

When the release button is still continuously depressed halfway and the sw1 is still on at the point of Step S1016, the process advances in the flow in order again, to Steps S1001, S1002 and S1003.

When the release button is fully depressed and the sw2 is on at the point of Step S1016, the process does not return to start but waits at Step S1016.

Underexposure of a plurality of images are improved one by one by each synthesis. Therefore, the number of images to be taken necessary for exposure improvement is known in advance by photometry before image-taking.

However, among the taken images, some images have great composition displacement and are not suitable for synthesis.

Therefore, in the abovementioned embodiment, images more than the necessary number of images to be taken are taken when image-taking is executed, and among these images, images with comparatively less composition displacement (satisfying the selection criterion) are selected, and the selected images are synthesized, whereby a synthesized image with less blur can be obtained.

Furthermore, by synthesis after compositions are matched by coordinate conversion for each image to eliminate subtle composition displacement among the selected images, a more excellent image can be obtained.

On the other hand, among the plurality of taken images, some images include great movement of the main object (person). Even when each of these images has no composition displacement (vibration during image-taking of the plurality of images), if these images are synthesized, the main object cannot be expressed as a clear image.

Therefore, the position, etc., of the main object are specified by a focus area (128a through 128e of FIG. 7), and an image including motion within this area (region 126 of FIG. 7) greatly different from that of other taken images is not synthesized so that a synthesized image including a clear main object is obtained.

Embodiment 7

Figure 16:
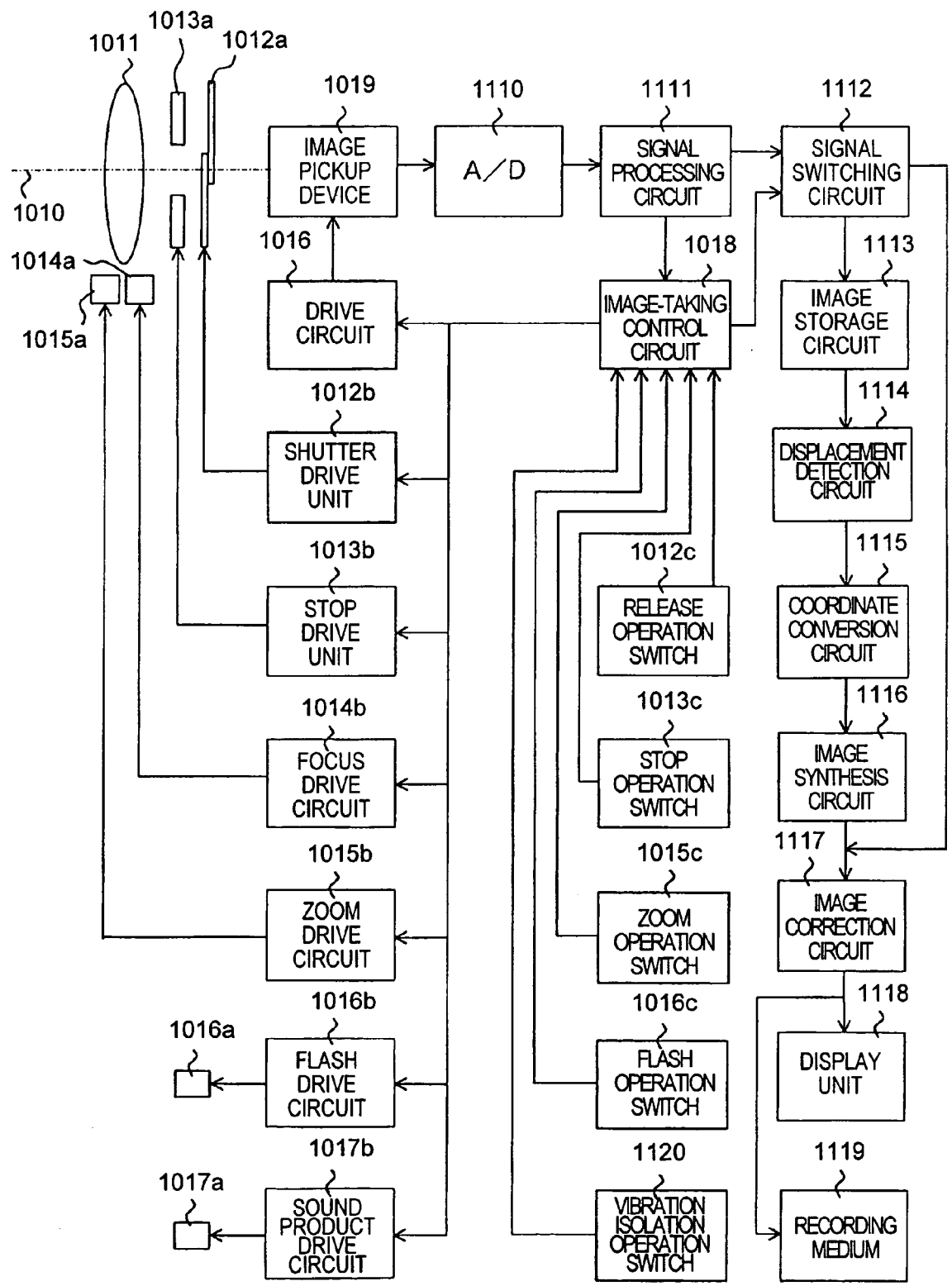
FIG. 16 is a block diagram of a camera of Embodiment 7 of the present invention.

FIG. 16 is a diagram showing the structure of a camera of Embodiment 7 of the present invention. A light flux (image-taking light) that has entered in an image-taking lens 1011 is restricted in light amount by a stop 1013a, passes through a shutter 1012a, and is imaged at an image pickup device 1019. The image pickup device 1019 comprises a semiconductor image pickup device such as an MOS or CCD, etc.

The image-taking lens 1011 comprises a plurality of optical lens units, and a part or all of these lens units move on the optical axis 1010 by receiving a driving force from an AF drive motor 1014a and stop at a predetermined focusing position to carry out focusing. The AF drive motor 1014a drives in response to a drive signal from a focus drive circuit 1014b.

In the image-taking lens 1011, a part of the optical lens units moves on the optical axis 1010 by receiving a driving force from a zoom drive motor 1015a and stops at a predetermined zooming position to change the image-taking angle of view. The zoom drive motor 1015a drives in response to a drive signal from a zoom drive circuit 1015b.

The stop 1013a has a plurality of stop blades, and these stop blades move by receiving a driving force from a stop drive unit 1013b to change the aperture area (stop aperture diameter) that serves as a light passing aperture. A shutter 1012a has a plurality of shutter blades, and these shutter blades open and close the aperture serving as a light passing aperture by receiving a driving force from a shutter drive unit 1012b. Thereby, the light amount to enter the image pickup device 1019 is controlled.

Furthermore, according to the conditions (object luminance, etc.) when image-taking, a strobe 1016a drives (flashes) in response to a drive signal from a flash drive circuit 1016b.

Furthermore, in order to inform a photographer of the image-taking operation, a speaker 1017a drives (sound production) in response to a drive signal from a sound production drive circuit 1017b.

Driving of the focus drive circuit 1014b, the zoom drive circuit 1015b, the stop drive unit 1013b, the shutter drive unit 1012b, the flash drive circuit 1016b, and the sound production drive circuit 1017b is controlled by an image-taking control circuit 1018.

Into the image-taking control circuit 1018, operation signals from a release operation switch 1012c, a stop control switch 1013c, a zoom control switch 1015c, a flash operation switch 1016c, and a vibration isolation operation switch 1120 described later are inputted. The image-taking control circuit 1018 sets image-taking conditions by controlling driving of the focus drive circuit 1014b, the zoom drive circuit 1015b, the stop drive unit 1013b, the shutter drive unit 1012b, and the flash drive circuit 1016b according to the inputted signals, and thereafter, carries out image-taking.

Setting of the aperture diameter of the stop 1013a and flashing of the strobe 1016a are normally automatically set by the camera side when image-taking, so that the stop operation switch 1013c and the flash operation switch 1016c are not necessary, however, they are provided for a photographer to arbitrarily set the image-taking conditions.

The image-taking control circuit 1018 measures the object luminance (photometry) based on image signals taken into a signal processing circuit 1111 described later, and determines the stop aperture diameter of the stop 1013a and the closing timing (exposure period) of the shutter 1012a based on the results of photometry. Furthermore, the image-taking control circuit 1018 determines the focusing position of the image-taking lens 1011 based on an output from the signal processing circuit 1111 while driving the focus drive circuit 1014b.

Video signals (analog signals) outputted from the image pickup device 1019 are converted into digital signals by an A/D conversion circuit 1110 and inputted into the signal processing circuit 1111. The signal processing circuit 1111 forms color video signals by applying signal processing such as forming luminance signals and color signals to the inputted signals.

Then, video signals subjected to signal processing at the signal processing circuit 1111 are inputted into an image correction circuit 1117 via a signal switching circuit 1112.

In the image correction circuit 1117, gamma correction and compression of the inputted signals (image data) are carried out.

Output signals of the image correction circuit 1117 are inputted into a display unit 1118 and a recording medium 1119, and a taken image is displayed on the display unit 1118 and recorded onto the recording medium 1119.

In the operation described above, when the image-taken object is dark and the exposure seconds become longer, there is a possibility of image blur due to vibration, so that a photographer operates the vibration isolation operation switch 1120 to turn the vibration isolation system on and switch the system to the following operation.

First, when the photographer depresses halfway the release button (the release operation switch 1012c), image-taking preparation operation (focusing operation and photometric operation, etc.) is started. Then, based on a photometric value obtained through the photometric operation, the closing timing (exposure period) of the shutter 1012a and the stop aperture diameter of the stop 1013a are set, however, since an object is generally dark under the image-taking conditions using a vibration isolation system, the stop is set to full-open, and the exposure period is set to be long in seconds.

Therefore, this exposure period is divided into a plurality of short exposure periods, and image-taking is repeated the number of times corresponding to the number of divisions. By division into such short exposure periods, each image obtained by exposure becomes underexposed, however, the influence from vibration on the images becomes smaller.

Then, by synthesizing the plurality of images into one image after completion of image-taking, exposure is improved.

However, when a plurality of images are taken, although vibration does not influence the respective images obtained through a plurality of times of image-taking, in some cases, the composition is slightly displaced among the images due to vibration during serial image-taking. Herein, if these images are synthesized as they are, the synthesized image has a blurred composition due to displacement among the images.

In this embodiment, a plurality of image signals that are outputted every image-taking from the image pickup device 1019 are converted into digital signals by the A/D conversion circuit 1110 and then subjected to signal processing by the signal processing circuit 1111.

On the other hand, when the image-taking control circuit 1018 is informed that the vibration isolation system is turned on by operating the vibration isolation operation switch 1120, image data from the signal processing circuit 1111 is inputted into the image storage circuit 1113 via a signal switching circuit 1112. Namely, input into the image correction circuit 1117 is interrupted.

The image storage circuit 1113 stores all of the plurality of taken images.

A displacement detection circuit 1114 extracts characteristic points (specific points) in the images stored in the image storage circuit 1113, and calculates the position coordinates of the characteristic points within the image-taking plane.

For example, in the frame 119a as shown in FIG. 2 described above, a case of a picture of a person 120a standing against a building 121a is taken is considered. In this case, as in the frame 119b, when a plurality of images are taken, an image with composition displaced from the frame 119a due to vibration may be taken.

The displacement detection circuit 1114 extracts an edge 123a of a window 122a having a high luminance in the building 121a positioned at the periphery (vicinity of outer frame) of the image plane as a characteristic point by edge detection, compares this characteristic point 123a with the characteristic point 123b in the frame 119b, and corrects a difference between them (coordinate conversion).

In FIG. 2, coordinate conversion of the frame 119b is carried out by overlapping the characteristic point 123b of the frame 119b with the characteristic point 123a of the frame 119a as shown by the arrow 124.

Herein, the reason why the periphery (vicinity of outer frame) of the image-taking plane is used as a region in which characteristic point is selected is described below.

In many cases of image-taking, a main object is positioned in the vicinity of the image plane center, and the main object is a person. In such a case, if the main object is selected as a characteristic point, a problem occurs due to object vibration.

Namely, during image-taking of a plurality of images, not only hand vibration of a photographer but also object vibration overlap, so that image coordinate conversion is carried out based on the object vibration.

In this case, it appears that a preferable image is obtained since coordinate conversion is carried out to make the composition of the main object proper, however, motion of a person is generally complicated, and the displacement detection accuracy is greatly influenced by the location of characteristic point selection.

For example, when an eye of the main object (person) is selected as a characteristic point, blinking influences, and when the tip of a hand is selected as a characteristic point, a hand easily moves and vibration thereof is different from the actual vibration of the whole object.

Even such image coordinate conversion by selecting one point of a person as a characteristic point does not result in proper coordinate conversion of the whole of the person, and even in a case where a plurality of images are subjected to coordinate conversion and synthesized, the coordinate position disperses among the images and a preferable image cannot be obtained.

Therefore, as in this embodiment, image coordinate conversion upon selecting a still object such as a background as a characteristic point results in obtaining a preferable image. In this case, the abovementioned object vibration influences.

Therefore, in this embodiment, for image-taking of only one frame of the plurality of divided times of image-taking, an object is irradiated with light of the strobe 1016a.

Herein, an image taken by using the strobe 1016a is defined as a primary image, and an image taken without using the strobe 1016a is defined as a secondary image.

In this case, the primary image and the secondary image are different from each other in the following point in addition to the abovementioned composition displacement.

That is, the brightness of the object region in the primary image for which flash has reached is different from the brightness of the same region in the secondary image.

Then, in the primary image, sufficient exposure is obtained for the object for which flash has reached, and exposure are insufficient for the background for which flash has not reached. The reason for this is that the flash reaches a main object such as a person since the object is located near the camera in general, and the background is far from the camera and flash does not reach the background.

For the background having underexposure, a plurality of secondary images are synthesized while correcting composition displacement to complement the exposure.

FIG. 17 show a selection method for a characteristic point extraction region by the displacement detection circuit 1114. When the primary image 127 (FIG. 17(A)) taken by using the strobe 1016a and the secondary image taken without using the strobe 1016a (among the plurality of secondary images, one image 128 is shown in FIG. 17(B)) are compared, with respect to the person 120a, the strobe light reaches the person 120a in the primary image 127, and on the other hand, in the secondary image 128, the person is dark since the person is not irradiated with strobe light.

On the other hand, in the background for which a strobe light does not reach, the brightness of the characteristic point 123a (123b) of the building 121a (121b) does not change between the primary image 127 and the secondary image 128.

Such a background region having no change in brightness becomes underexposed since the strobe light does not reach the region, so that this region is considered as a point of image synthesis, and composition displacement is corrected (coordinate conversion) by defining this region as a characteristic point extraction region.

In FIG. 17, in the building 121a (121b) at the periphery of the image plane, which has no change in brightness between the primary image 127 and the secondary image 128 as mentioned above, the window edge 123a with a high luminance is extracted as a characteristic point by edge detection.

Then, as described in FIG. 2, the characteristic point 123a in the primary image 127 and the characteristic point 123b in the secondary image 128 are compared with each other, and a difference between them is corrected (coordinate conversion). Namely, the coordinate conversion circuit 1115 applies coordinate conversion to the secondary image 128 so that the characteristic point 123b of the secondary image 128 overlaps the characteristic point 123a of the primary image 127.

Then, among the obtained plurality of secondary images, the coordinate of the characteristic point 123b is also determined for each of the second and subsequent images, and the coordinate conversion circuit 1115 applies coordinate conversion to the respective images (secondary images) so that the each characteristic point 1236 overlap the characteristic point 123a in the primary image 127.

Herein, the characteristic point coordinate is determined for each image for the sake of description, however, in actuality, correlative calculation of the primary image 127 and the first image 128 of the obtained plurality of secondary images is carried out, and each corresponding pixel change is determined as a motion vector by the displacement detection circuit 1114 and regarded as a characteristic point change.

Then, for the second and subsequent images of the obtained plurality of secondary images, characteristic point changes are determined by correlative calculation with the primary image 127, and in the same manner, characteristic point changes of the respective images are determined.

It is also possible that not just one characteristic point is selected but a plurality of points are selected, and an average motion vector or the minimum scalar of these points is regarded as a characteristic point change.

Herein, the reason why the abovementioned minimum value is used as a characteristic point change is for selecting the most moveless characteristic point since a characteristic point selected in the periphery of the image plane also has a possibility of moving by itself.

The images subjected to coordinate conversion by the coordinate conversion circuit 1115 are outputted to the image synthesis circuit 1116 and synthesized into one image.

As mentioned above, in this embodiment, the primary image 127 taken by using the strobe 1016a is defined as a standard (center), and a plurality of obtained secondary images 128 are subjected to coordinate conversion so as to overlap the primary image.

Herein, the reason for defining the primary image 127 as an image synthesis standard is described.

As shown in FIG. 2, when two images with compositions displaced from each other are synthesized, a region 127 in which the two images do not overlap each other appears as shown in FIG. 4. Therefore, the image synthesis circuit 1116 cuts the region 127 and applies expansion and complement processing to only the region with the overlapping two images to restore the image to the original frame size.

Therefore, the each image of in the secondary images are cut at the periphery of the image plane according to the orientation and degree of the composition displacement.

Most excellent image information in the primary image 127 and the secondary images 128 is obtained from the primary image 127 taken by using the strobe 1016a.

Therefore, in order to prevent the circumference of the primary image 127 from being cut, it is preferable that the primary image 127 is defined as a reference image and the obtained plurality of secondary images 128 are overlapped with the reference image.

In a case of a digital image, it is possible to correct exposure by increasing the gain even for only one underexposed image, however, if the gain is increased, noise also increases and results in an undesirable image.

However, as in this embodiment, in the case where the gain of the whole image is increased by synthesizing many images, noise of the images is averaged, so that an image with a high S/N ratio can be obtained, and as a result, exposure can be made proper while suppressing noise.

In another consideration, it can also be said that, for example, a plurality of images are taken by allowing noise and setting a high sensitivity of the image pickup device 1019, and these images are subjected to arithmetic mean, whereby random noise included in the synthesized image is reduced.

The synthesized image data is inputted into the image correction circuit 1117 and subjected to gamma correction and compression, and then displayed on the display unit 1118 as a taken image and recorded onto the recording medium 1119.

Figure 18:
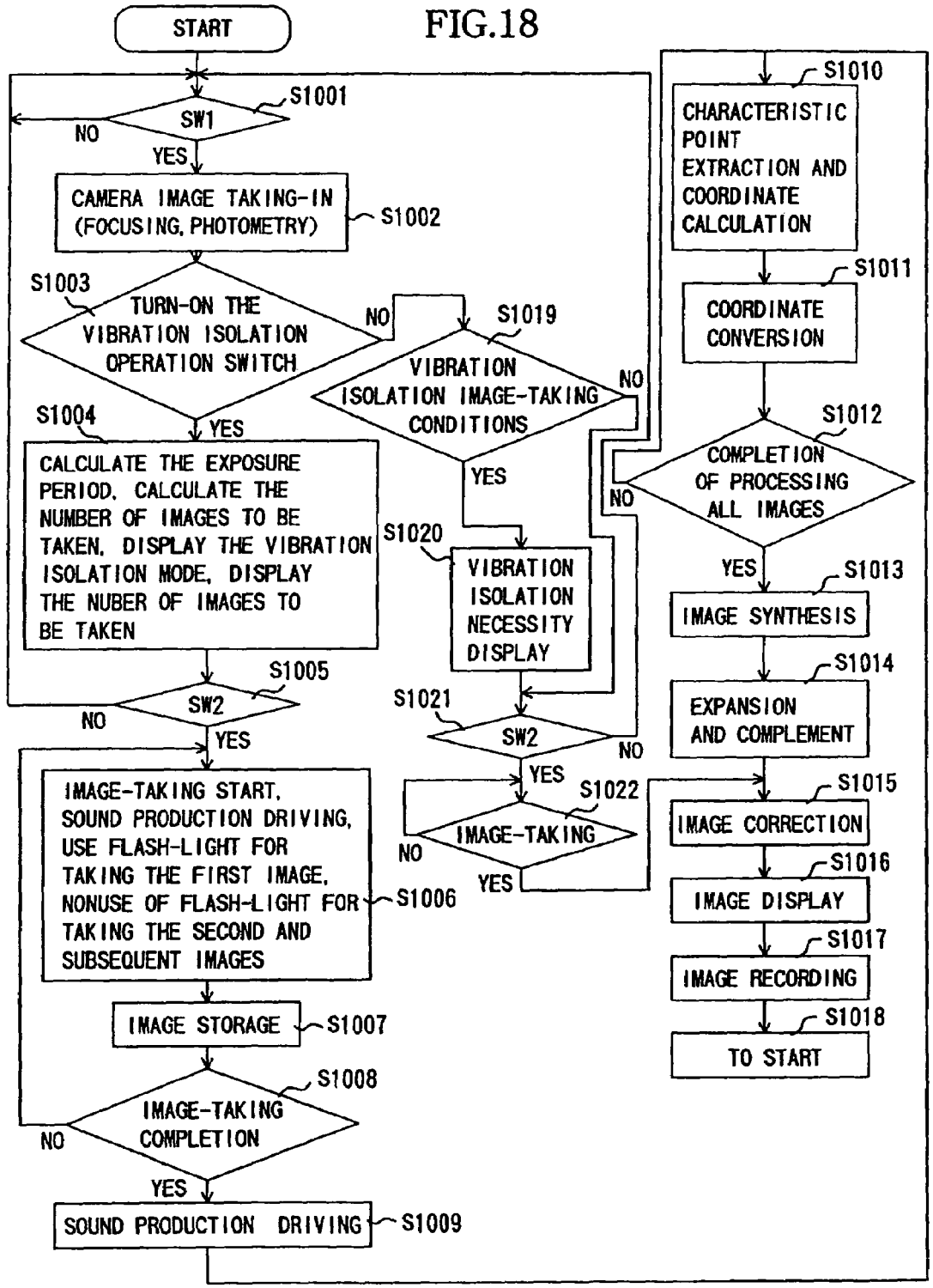
FIG. 18 is a flowchart showing image-taking operation in Embodiment 7.

FIG. 18 is a flowchart summarizing the image-taking operation of the camera of this embodiment, and this flow starts when the power source of the camera is turned on.

In Step S1001, the process waits until the sw1 is turned on by half-depression of the release button by a photographer, and when the sw1 is turned on, the process advances to Step S1002.

In step S1002, imaging is carried out at the image pickup device 1019. The image-taking control circuit 1018 moves the image-taking lens 1011 in the optical axis direction by driving the AF drive motor 1014a while detecting the image contrast based on an output from the signal processing circuit 1111.

Then, at a point at which the contract is highest, driving of the image-taking lens 1011 is stopped to obtain a focused condition of the image-taking optical system (AF by means of the hill-climbing method). Focusing can be carried out by phase difference detection method.

Furthermore, the image-taking control circuit 1018 simultaneously determines the brightness of the object based on an output of the image pickup device 1019.

In Step S1003, it is judged whether or not a photographer has turned the vibration isolation operation switch 1120 on, and if it has been turned on, the process advances to Step S1004, and when it is off, the process advances to Step S1019.

First, the flow to be followed in the case where the vibration isolation operation switch 1120 is on is described.

In Step S1004, based on the image-taking conditions such as the brightness of the object, etc., determined in Step S1002, the number of images to be taken and exposure periods for the images are determined.

The image-taking conditions described herein are the following four.
  Brightness of the object
  Focal length of the image-taking optical system
  Brightness of the image-taking optical system (stop number)
  Sensitivity of the image-taking device 1019

For example, it is assumed that the sensitivity of the image pickup device 1019 is set to ISO200.

The brightness of the object is measured (photometered), and for proper exposure based on the results of this photometry, it is assumed that the stop 1013a must be set to full-open (for example, f2.8) and the closing timing of the shutter 1012a, that is, the exposure period must be set to ⅛ seconds.

Herein, when the focal length of the image-taking optical system is 30 mm as regards 35 mm film, it is feared that image blur occurs due to vibration during image-taking with an exposure period set to ⅛ seconds, so that the exposure period is set to 1/32 seconds and image-taking is carried out four times so as not to cause image blur.

On the other hand, when the focal length of the image-taking optical system is 300 mm, the exposure period is set to 1/320 seconds and image-taking is carried out 40 times so as not to cause image blur.

The exposure period when a plurality of images are taken is thus determined according to the image-taking conditions, and the number of images to be taken is also set according to the image-taking conditions.

Even when image-taking of the same object is divided into a plurality of times, the exposure condition of each image-taking is preferably set as close to proper exposure to obtain accurate information by imaging at the image pickup device 1019.

Therefore, when an object is dark, the stop 1013a is stopped down and the brightness is low, or the sensitivity of the image pickup device 1019 is set to be low, even if a plurality of images are taken, the exposure period of each image-taking is made as long as possible to obtain an effective exposure condition.

However, if the exposure period is excessively long, the influence of image deterioration due to vibration appears on the image plane, so that the exposure period is set to 1/32 seconds that is equal to approximately 1/focal length so as not to cause image blur when the focal length of the image-taking optical system is 30 mm as regards 35 mm film as mentioned above.

Then, the insufficiency that cannot be covered by the exposure period is covered by the number of images to be taken.

When the focal length is long, since image deterioration occurs due to vibration unless the exposure period is made shorter, the exposure period is made shorter and the number of images to be taken is increased accordingly, whereby an exposure complement is carried out.

As mentioned above, the exposure period in the case of the image-taking of a plurality of images becomes longer as the image-taking object becomes darker, the image-taking lens becomes darker, or the sensitivity of the image pickup device 1019 becomes lower, and the exposure period becomes shorter as the focal length of the lens becomes longer.

Then, in the case of the image-taking of a plurality of images, the number of images to be taken becomes larger as the image-taking object becomes darker, the image-taking lens becomes darker, the sensitivity of the image pickup device 1019 becomes lower, or the focal length of the lens becomes longer.

As mentioned above, after calculation of the exposure period and the number of images to be taken according to the image-taking conditions is finished, the display unit provided in the camera finder or the liquid crystal display unit provided on the outer package of the camera displays that the vibration isolation mode (multiple-time image-taking mode) has been set, and simultaneously displays the determined number of images to be taken and informs a photographer of it.

In Step S1005, the process waits while circulating through Steps S1001 and S1005 until the sw2 is turned on by full-depression of the release button.

In Step S1006, image-taking of the first image is started.

Furthermore, sound production for informing image-taking start is simultaneously carried out by driving the speaker 1017a via the sound production drive circuit 1017b.

This sound may be an electronic bleep sound, may be the sound of shutter opening of a film camera, etc., or may be the sound of mirror rising.

Steps S1006 to S1014 described later are an operation of a synthesizing image-taking mode in which image-taking with a short exposure period is repeated a plurality of times, images obtained through the plurality of times of image-taking are synthesized, whereby apparent exposure is made proper.

Herein, as described in this step, image-taking of the first image is carried out by making the strobe 1016a to flash to obtain the abovementioned primary image 127 (FIG. 17(A)).

In Step S1007, taken images are temporarily stored in the image storage circuit 1113.

In Step S1008, the process waits while circulating through Steps S1006 and S1007 until image-taking of all images is completed. In this case, image-taking of the second and subsequent images is carried out without using the strobe 1016a so as to obtain the secondary images.

Then, when image-taking is completed, the process advances to Step S1009.

In Step S1009, sound production for informing the image-taking completion is carried out by driving the speaker 1017a via the sound production drive circuit 1017b.

This sound may be, for example, an electronic bleep sound, or may be a shutter closing sound, a mirror lowering sound or a film winding sound in a film camera, etc.

In such a case of image-taking of a plurality of images, sound expressing this operation is one set of sounds (one sound is made for each of exposure start for initial image-taking and exposure completion of the last image-taking), so that the sound does not allow a photographer any sense of discomfort.

Namely, the number of sounds is equal between the normal image-taking (one time of exposure) and image-taking of a plurality of images, and this prevents a photographer from experiencing any during image-taking.

In Step S1010, the displacement detection circuit 1114 extracts a characteristic image (characteristic point) from the peripheral region (for example, the building 123a and 123b of FIG. 17) of the image, and determines the coordinate of this image.

This is, as mentioned above, to extract a characteristic point and determine the coordinate of the point from a region (that is, a region in which the object is not sufficiently irradiated with flash of the strobe 1016a) other than the region whose brightness differs between the primary image 127 and each image 128 of the obtained plurality of secondary images (that is, a region in which the object is sufficiently irradiated with flash of the strobe 1016a) by comparing these images.

In Step S1011, the coordinate conversion circuit 1115 carries out coordinate conversion for each image. Herein, only the first image (the primary image 127 taken by using the strobe 1016a) is not subjected to coordinate conversion. Namely, this primary image 127 is used as a standard for coordinate conversion.

In Step S1012, the process waits while circulating through Steps S1010 and S1011 until coordinate conversion for all of the obtained plurality of secondary images 128 is finished, and when coordinate conversion of all images is completed, the process advances to Step S1013.

In Step S1013, the primary image 127 and each image 128 of the obtained plurality of secondary images subjected to coordinate conversion are synthesized.

Herein, image synthesis is carried out by arithmetic mean of coordinate signals corresponding to the respective images, and random noise in the images is reduced by arithmetic mean. Then, the gain of the image with reduced noise is increased to make exposure proper.

In Step S1014, a region (region 127 of FIG. 4) in which the images do not overlap each other due to composition displacement in the synthesized image is cut, and the image is expanded and complemented to the original frame size.

In Step S1015, gamma correction and compression are applied to the synthesized image signal.

In Step S1016, the image obtained in Step S1015 is displayed on a liquid crystal display unit (display unit 1118) provided on the camera back surface, etc.

In Step S1017, image data obtained in Step S1015 is recorded onto a recording medium 1119 that comprises, for example, a semiconductor memory and is attachable to and detachable from the camera.

In Step S1018, the process returns to start.

When the release button is still continuously depressed halfway and the sw1 is still on at the point of Step S1018, the process advances in the flow in order again, to Steps S1001, S1002, S1003, and S1004.

When the release button is fully depressed and the sw2 is on at the point of Step S1018, the process does not return to start but waits at Step S1018.

Next, the flow to be followed in a case where the vibration isolation operation switch 1120 is off in Step S1003 is described.

In Step S1003, when the vibration isolation operation switch 1120 is judged as being off, the process advances to Step S1019.

In Step S1019, it is judged whether or not the image-taking conditions cause image deterioration due to vibration unless the vibration isolation system is used.

The image-taking conditions include, as mentioned above, the brightness of the object, the brightness of the lens, the imaging sensitivity, and the focal length of the image-taking optical system, and an exposure period is determined based on the brightness of the object, the brightness of the lens, and the imaging sensitivity, and it is judged whether or not there is a possibility that the determined exposure period causes image deterioration due to vibration at the current image-taking focal length in Step S1019.

Then, when there is a possibility of image deterioration, the process advances to Step S1020, and otherwise the process advances to Step S1021.

In Step S1020, a recommendation for setting the vibration isolation mode is displayed on the display unit provided in the camera finder or the liquid crystal display unit (display unit 1118) provided on the outer package of the camera.

In Step S1021, the process waits while circulating through Steps S1001 and S1021 until the release button is fully depressed and the sw2 is turned on.

In Step S1022, the process waits until the normal image-taking (image-taking in the normal image-taking mode in which an effective exposure condition is formed by one time of exposure, that is, the second image-taking mode) is completed, and simultaneously with exposure completion, the process advances to Step S1015.

During image-taking in the normal image-taking mode, the speaker 1017a also makes image-taking operation sounds in timing with the operations from image-taking start to completion although omitted herein.

Namely, in both the synthesizing image-taking mode (mode in which images obtained through a plurality of times of image-taking are synthesized, that is, the first image-taking mode) and the normal image-taking mode, image-taking operation sounds are made in the same pattern. In this case, the sounds are on the level enabling a photographer to recognize whether or not the exposure is long according to differences in length between the operation sounds (length from the image-taking start sound to the image-taking completion sound) from the speaker 1017a, so that the photographer never knows whether or not image-taking of a plurality of images is being carried out.

Therefore, the photographer is prevented from recognizing that special image-taking is carried out even in the synthesizing image-taking mode, so that the camera is easy to use.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, image data obtained in Step S1015 is recorded onto a recording medium 1119 that comprises, for example, a semiconductor memory and is attachable to and detachable from the camera.

In Step S1018, the process returns to start.

As seen in this flow, when the image-taking conditions cause image deterioration due to vibration in a case where the vibration isolation operation switch 1120 is off, display that urges a photographer to utilize the vibration isolation system (synthesizing image-taking mode) is made to prevent image deterioration. Thereby, the vibration isolation function (synthesizing image-taking mode) can be made easy for a photographer, and an image can be obtained without an image-taking failure (image blur).

In the synthesizing image-taking mode, by changing the exposure periods according to the focal length of the image-taking optical system, desirable image-taking to obtain a image without image deterioration is possible at any focal length.

Embodiment 8

This embodiment is a modified example of Embodiment 7. The structure of the camera of this embodiment is roughly the same as that of Embodiment 7 (FIG. 16), and the same members are attached with the same symbols and described.

In Embodiment 7, as a region for characteristic point extraction by the displacement detection circuit 1114, a region in which flash irradiation by the strobe 1016a is judged as insufficient by a brightness comparison among taken images is set.

However, the characteristic point extraction region is not limited to this example, and a region other than the focus area within the image-taking plane during image-taking may be set as a characteristic point extraction region, or a region other than a currently focused region may be set as a characteristic point extraction region.

The reason for this is that, since the main object (person) is overlapped with the focus area (focus detection region) for image-taking, in order to set a characteristic point so as to exclude the main object, a region other than the focus area is set as a characteristic point extraction region (see FIG. 7).

FIG. 7 shows a characteristic point extraction region within an image-taking plane, and when among the focus areas 128a, 128b, 128c, 128d, and 128e provided in the image-taking plane (the frame 119a), the focus area 128c capturing the main object is focused, the image plane peripheral region 125 excluding the main object region 126 around the focus area 128c is set as a characteristic point extraction region.

Namely, depending on which of the focus areas 128a, 128b, 128c, 128d, and 128e the main object is positioned in, the main object region 126 and the characteristic point extraction region are changed.

Then, by regarding an appropriate image in this characteristic point extraction region as a characteristic point, displacement of the images is corrected based on the coordinate of this characteristic point, and image synthesis is carried out, whereby preferable image synthesis is possible.

Furthermore, in place of image synthesis after coordinate conversion of all of the images is finished and these images are stored as shown in the flow of FIG. 18, it is also possible that image synthesis is carried out in parallel with image-taking (see FIG. 8).

FIG. 8 is a timing chart describing this operation. In response to exposure f1 (f1 is exposure using the strobe 1016a), a signal subjected to photoelectric conversion and charge accumulation at the image pickup device 1019 is readout as an image pickup signal F1. Likewise, in response to exposure f2 (f2 does not use the strobe 1016a), a signal subjected to photoelectric conversion and charge accumulation at the image pickup device 1019 is readout as an image pickup signal F2. In parallel with reading-out of the image pickup signal F2, correlative calculation of the previous image pickup signal F1 and the current image pickup signal F2 is carried out. Thereby, a characteristic point change between the two images is determined, and the two image pickup signals F1 and F2 are synthesized to obtain a synthesized signal C2.

Next, in parallel with reading-out of an image pickup signal F3, correlative calculation of the previous synthesized signal C2 and the current image pickup signal F3 is carried out to determine a characteristic point change, and the synthesized signal C2 and the image pickup signal F3 are synthesized to obtain a synthesized signal C3.

Next, in parallel with reading-out of an image pickup signal F4, correlative calculation of the previous synthesized signal C3 and the current image pickup signal F4 is carried out to determine a characteristic point change, and the synthesized signal C3 and the image pickup signal F4 are synthesized to obtain a synthesized signal C4.

Then, the obtained synthesized signal (synthesized image) C4 is displayed on a liquid crystal display unit provided on the camera back surface, etc., and recorded onto a recording medium.

Figure 19:
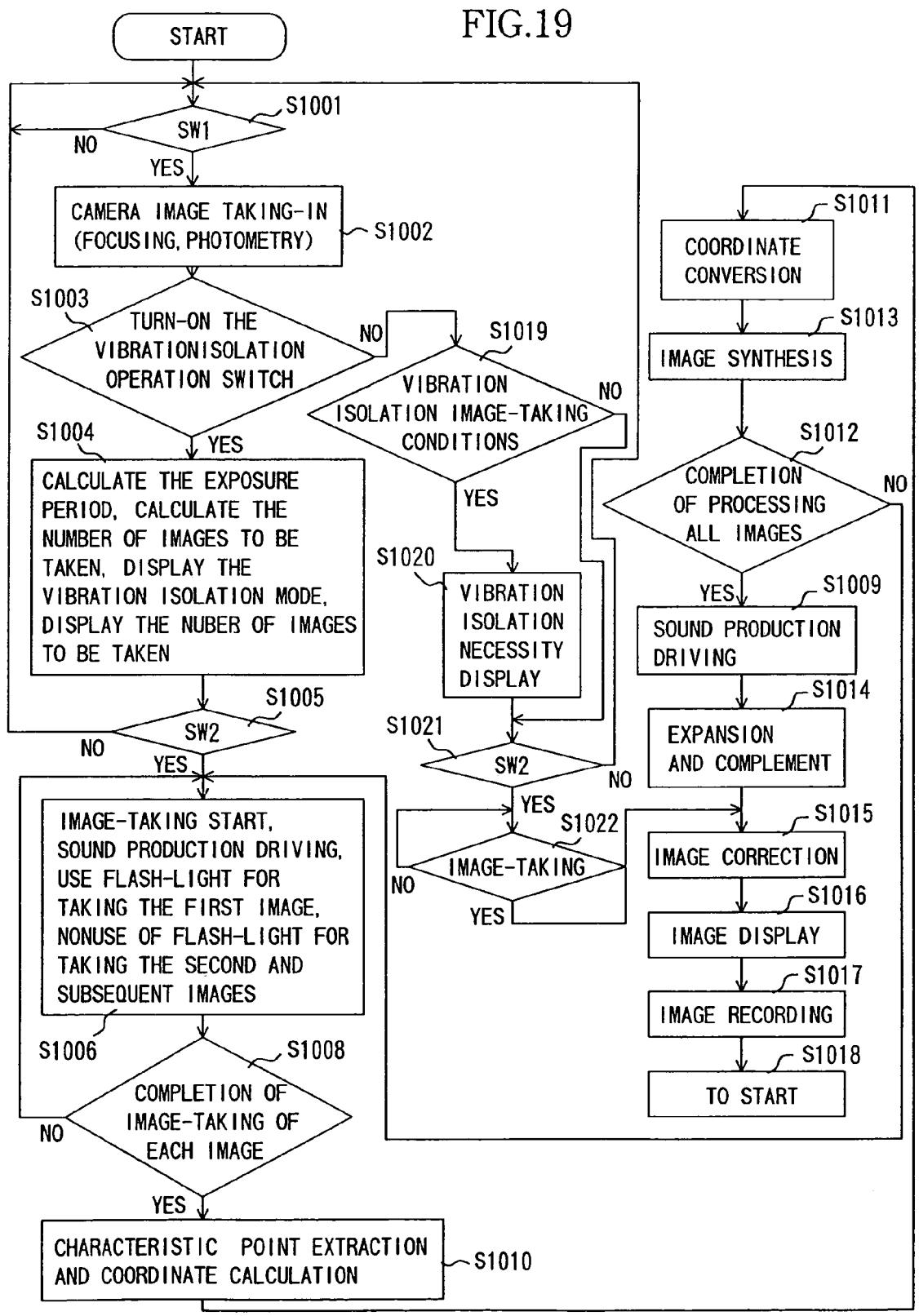
FIG. 19 is a flowchart showing image-taking operation in Embodiment 8 of the present invention.

FIG. 19 is a flowchart describing the abovementioned operation. In comparison with the flowchart of FIG. 18, image storage of Step S1007 is omitted, and the order of Step S1012 and Step S1013 is inverted.

The reason for abandonment of image storage of Step S1007 is that, since each taken image is synthesized with the previously taken image in parallel with image-taking in this embodiment, only one synthesized image is stored in the image synthesis step S1013, and other taken images are unnecessary.

Namely, since the synthesized image is renewed for each image-taking, it is not necessary to store the respective taken images. Therefore, the camera of this embodiment is not provided with the image storage circuit 1113 shown in FIG. 16.

Furthermore, it also appears in the flow of FIG. 19 that the next image-taking is not carried out until processing of all images of Step S1012 is completed, however, in actuality, as shown in the timing chart of FIG. 8, image-taking, image-taking signal output, correlative calculation, and image synthesis are carried out simultaneously.

Embodiment 9

In Embodiment 7, in a case where the image-taking conditions require the vibration isolation system, a photographer is informed of this by displaying it, whereby image-taking failures are prevented.

However, the vibration isolation system in this embodiment lengthens the exposure period since the system obtains proper exposure by synthesizing a plurality of images.

As mentioned above, in the case where the exposure period is ⅛ seconds and the focal length is 30 mm, image-taking with an exposure period of ¹⁄₃₂ seconds is carried out four times, and obtained images are synthesized so as to obtain proper exposure.

However, time for processing (for example, an image data transfer period, a data storage period) is also necessary during intervals in the image-taking, so that time more than ⅛ seconds (for example, ¼ seconds) is taken until four times of image-taking with an exposure period of ¹⁄₃₂ seconds are finished.

The problem of object vibration in such a case of image-taking for many seconds (image-taking when the object is dark) can be solved by using the strobe 1016a as mentioned above, however, when the object is bright to some degree, the object also appears in the frames (secondary image group) taken without a flash of the strobe 1016a, and the effect of suppression of object vibration by the strobe 1016a is reduced in the synthesized image.

Namely, if the synthesizing image-taking mode is used in image-taking conditions with some degree of brightness, object vibration stands out more in the normal image-taking mode.

The optical vibration isolation system using a vibration gyro and a correcting optical device has disadvantages in that these elements must be mounted on the camera (increases the size of the camera) and the shifting component and the rolling component around the optical axis in vibration cannot be corrected. However, in the image-taking conditions that do not require the optical vibration isolation system, an image obtained by the vibration isolation system using image synthesis does not have image blur more conspicuous than that of the image taken by turning the vibration isolation system off.

On the other hand, the vibration isolation system using image synthesis has advantages in that mounting of special elements on the camera is not necessary and the shifting component and the rolling component around the optical axis in vibration can also be corrected.

On the other hand, in the image-taking conditions that do not require a vibration isolation system using image synthesis, there is a possibility that an image obtained by turning the vibration isolation system on has object vibration more conspicuous than in the image obtained by turning the vibration isolation system off.

Therefore, in this embodiment, in the image-taking conditions that do not require the vibration isolation system using image synthesis, image-taking with the vibration isolation system turned on is not permitted (image-taking using this vibration isolation system is permitted in image-taking conditions that require the vibration isolation system using image synthesis).

In recent digital cameras, noise hardly occurs even when the sensitivity of the image pickup device 1019 is increased, and processing of generated noise also becomes better.

Therefore, until the object becomes dark to some degree (or until the focal length becomes long or the stop is stopped down), proper exposure is obtained by increasing the sensitivity of the image pickup device 1019 without lengthening the exposure period, and the vibration isolation system using image synthesis is used only in the case where underexposure occurs unless the exposure period is lengthened.

In detail, even when a photographer attempts to take an image by turning the vibration isolation operation switch 1120 on, in a case of a bright object etc., unnecessary of vibration isolation is displayed and image-taking is carried out in the normal image-taking mode.

Figure 20:
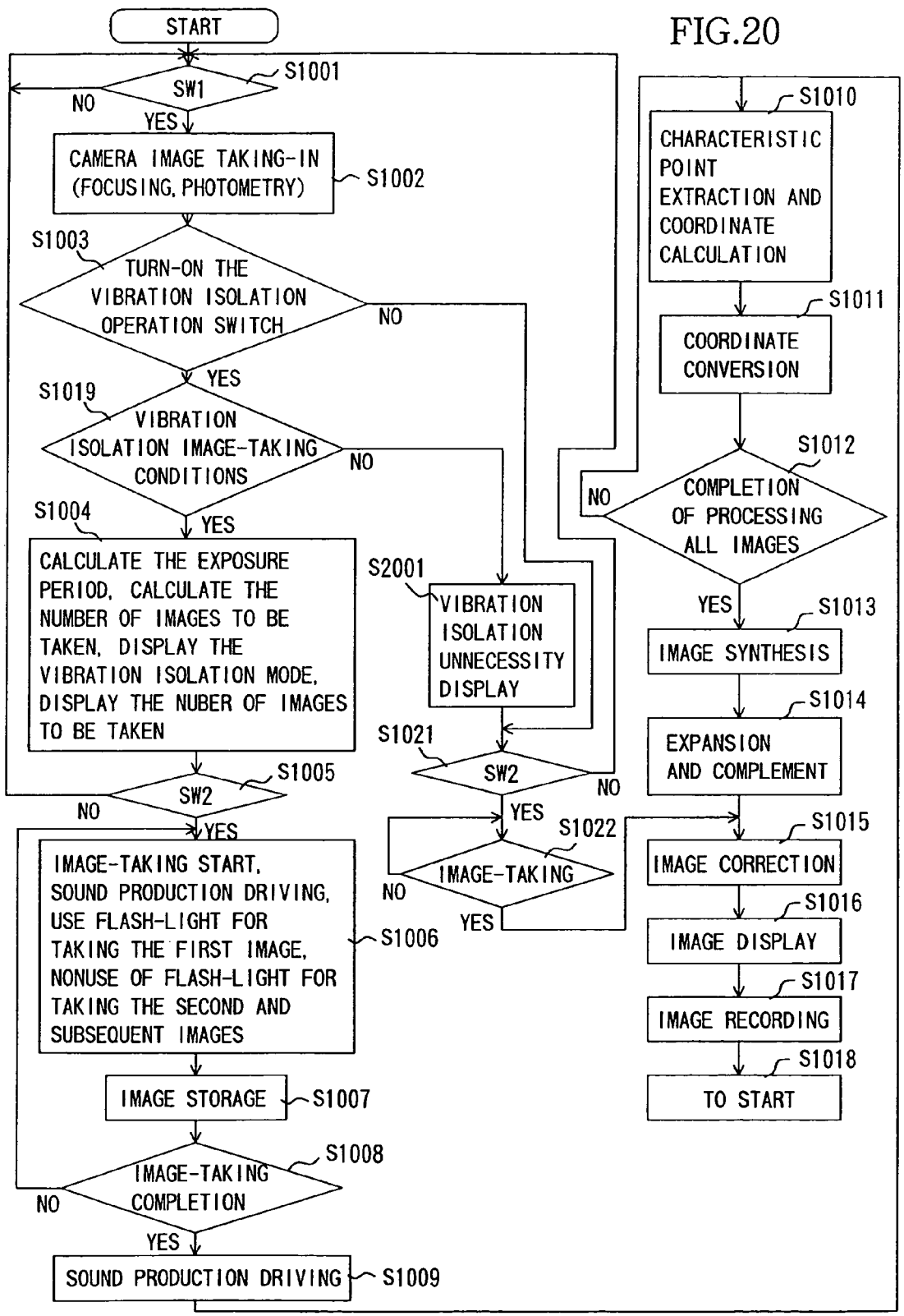
FIG. 20 is a flowchart showing image-taking operation in Embodiment 9 of the present invention.

FIG. 20 is a flowchart of this embodiment, and points of difference from the flowchart of FIG. 18 are in that it is judged whether or not the image-taking conditions are the image-taking conditions that require the vibration isolation system using image synthesis (vibration isolation image-taking conditions) even when the vibration isolation operation switch 1120 is on, and image-taking in the normal image-taking mode is carried out (at this point, unnecessary vibration isolation is displayed) even when the vibration isolation operation switch 1120 is on in a case where the conditions are not the vibration isolation image-taking conditions. The structure of the camera of this embodiment is the same as that of Embodiment 7 (FIG. 16).

FIG. 20 is a flowchart summarizing the image-taking operation of the camera in this embodiment, and this flow starts when the power source of the camera is turned on.

In Step S1001, the process waits until the sw1 is turned on by half-depression of the release button by a photographer, and when the sw1 is turned on, the process advances to Step S1002.

In Step S1002, an object is imaged by the image pickup device 1019. The image-taking control circuit 1018 moves the image-taking lens 1011 in the optical axis direction 1010 by driving the AF drive motor 1014a while detecting the contrast of the image based on an output from the signal processing circuit 1111.

Then, when the contrast is highest, a focused condition of the image-taking optical system is obtained by stopping driving of the image-taking lens 1011.

Furthermore, the image-taking control circuit 1018 determines the brightness of the object based on an output from the image pickup device 1019 simultaneously.

In Step S1003, it is judged whether or not the vibration isolation operation switch 1120 has been turned on by a photographer, and when it is on, the process advances to Step S1019, and when it is off, the process advances to Step 1021.

First, the case where the vibration isolation operation switch 1120 is on is described.

In Step S1019, it is judged whether or not the image-taking conditions cause image deterioration due to vibration unless the vibration isolation system (synthesizing image-taking mode) is used.

The image-taking conditions include the brightness of the object, the brightness of the lens, the imaging sensitivity, and the image-taking focal length as mentioned above, an exposure period is determined based on the brightness of the object, the brightness of the lens, and the imaging sensitivity, and it is judged in Step 1019 whether or not there is a possibility that image deterioration occurs in the determined exposure period due to vibration at the current focal length.

Herein, the imaging sensitivity is the sensitivity status of the image pickup device 1019, and in the case of a digital camera, for the sensitivity of the image pickup device 1019, an auto mode in which the sensitivity is automatically changed depending on the image-taking conditions and a sensitivity fixed mode in which the imaging sensitivity is set and fixed by the photographer's preference are available.

In the case of the auto mode, the exposure period is set according to the brightness of the object and the brightness of the lens, and it is judged whether or not there is a possibility that image blur occurs in the determined exposure period with respect to the currently set image-taking focal length.

Then, when there is a possibility of causing image blur, the exposure period is shortened by increasing the imaging sensitivity, and in the case where the exposure period still has the possibility of causing image blur, vibration isolation (image-taking in the synthesizing image-taking mode) is judged as necessary.

Furthermore, in the case of the sensitivity fixed mode, the exposure period is set according to the brightness of the object, the brightness of the lens, and the set imaging sensitivity, and it is judged whether or not there is a possibility that image blur occurs in the determined exposure period with respect to the currently set focal length of the image-taking optical system. Herein, in the case where there is a possibility of causing image blur, vibration isolation is judged as necessary.

As an intermediate mode between the abovementioned auto mode and the sensitivity fixed mode, a semi-auto mode in which a change in imaging sensitivity is allowed for some degree of change width is considerable in the image-taking scene selection mode (for example, portrait mode).

When there is a possibility that image blur occurs in the exposure period at the allowable imaging sensitivity even in such a case, vibration isolation is judged as necessary.

Then, when vibration isolation is judged as necessary, the process advances to Step S1004, and when it is not necessary, the process advances to Step S2001.

First, the flow in which vibration isolation is judged as necessary and the process advances to Step S1004 is described.

In Step S1004, the number of images to be taken and exposure periods for each image-taking are determined based on the image-taking conditions in normal image-taking determined in Step S1019.

The image-taking conditions referred herein include the following four:

Brightness of the object

Focal length of the image-taking optical system

Brightness of the image-taking optical system (stop number)

Sensitivity of the image pickup device 1019

For example, it is assumed that an exposure period of $1/8$ seconds is required in Step S1019.

In this case, when the focal length of the image-taking optical system is 30 mm as regards 35 mm film, in image-taking with an exposure period of $1/8$ seconds, there is a possibility that image blur occurs due to vibration, so that the exposure period is set to $1/32$ seconds and image-taking is carried out four times so as not to cause image blur in each image.

Furthermore, when the image-taking focal length is 300 mm, the exposure period is set to 1/320 seconds and image-taking is carried out 40 times so as not to cause image blur in each image.

Thus, the exposure period when image-taking of a plurality of images is carried out is determined according to the image-taking conditions, and furthermore, the number of images to be taken is also set according to the image-taking conditions.

Even when the same object is imaged by dividing image-taking into a plurality of times of image-taking, the exposure condition for each image-taking is made close to proper exposure to obtain accurate information in imaging by the image pickup device 1019.

Therefore, in a case where the object is dark, the stop 1013a is stopped down and the lens is dark, or the sensitivity of the image pickup device 1019 is set to be low, the exposure period for each image-taking is set as long as possible even when a plurality of images are taken so as to make the exposure condition effective.

However, if the exposure period is set to be excessively long, an influence on image deterioration due to vibration appears on the image plane, so that when the image-taking focal length is 300 mm in terms of 35 mm film as mentioned above, the exposure period is set to 1/32 seconds that is equal to approximately 1/focal length that has no possibility of causing image blur.

Then, the insufficiency that cannot be covered by the exposure period is complemented by the number of images to be taken.

In the case of a long focal length, image deterioration occurs due to vibration unless the exposure period is made shorter, so that the exposure period is made shorter and the number of images to be taken is increased accordingly, whereby an exposure complement is carried out.

As mentioned above, the each exposure period in image-taking of a plurality of images becomes longer as the image-taking object becomes darker or the image-taking lens becomes darker, and in the sensitivity fixed mode, the each exposure period becomes longer as the sensitivity of the image pickup device 1019 becomes lower, and becomes shorter as the focal length of the lens becomes longer.

Then, the number of images to be taken in the case of image-taking of a plurality of images becomes larger as the image-taking object becomes darker or the image-taking lens becomes darker, and in the sensitivity fixed mode, the number of images to be taken becomes larger as the sensitivity of the image pickup device 1019 becomes lower, and becomes larger as the focal length of the lens becomes longer.

As mentioned above, after calculation of the exposure period and the number of images to be taken according to the image-taking conditions is finished, the display unit provided in the camera finder or the liquid crystal display unit provided on the outer package of the camera displays that the vibration isolation mode (multiple-time image-taking mode) has been set and displays the determined number of images to be taken to inform a photographer of them.

In Step S1005, the process waits while circulating through Steps S1001 and S1005 until the sw2 is turned on by full-depression of the release button.

In Step S1006, image-taking of the first image is started.

Furthermore, sound production expressing the image-taking start is carried out simultaneously by driving the speaker 1017a via the sound production drive circuit 1017b.

This image-taking operation sound may be an electronic bleep sound, or may be a shutter opening sound or a mirror raising sound of a film camera, etc.

Furthermore, from Step S1006 to Step S1014 described later, the operation is in the synthesizing image-taking mode in which image-taking with a short exposure period is repeated a plurality of times, and images obtained through the plurality of times of image-taking are synthesized to make apparent exposure proper.

Herein, as described in this step, the first image is taken by making the strobe 1016a to flash to obtain the above-mentioned primary image 127.

In Step S1007, the taken images are temporarily stored in the image storage circuit 1113.

In Step S1008, the process waits while circulating through Steps S1006 and S1007 until image-taking of all images is completed.

In this case, the second and subsequent images are taken without using the strobe 1016a to obtain the secondary image.

When image-taking is completed, the process advances to Step S1009.

In Step S1009, sound production expressing image-taking completion is carried out by driving the speaker 1017a via the sound production drive circuit 1017b.

This image-taking operation sound may be an electronic sound of, for example, a bleep, or may be a shutter closing sound, a mirror lowering sound, or a film winding sound of a film camera, etc.

Thus, in the case of image-taking of a plurality of images, sound production expressing this operation is one set of sounds (one sound is made for each of exposure start for initial image-taking and exposure completion of the last image-taking), so that the image-taking operation sound does not allow a photographer any sense of discomfort.

In Step S1010, the displacement detection circuit 1114 extracts a characteristic image (characteristic point) from the peripheral region of the image (for example, the building 121a and 121b of FIG. 7), and determines the coordinate of the image.

This is, as mentioned above, to extract a characteristic point and determine the coordinate of the point from a region (that is, a region in which the object is not sufficiently irradiated with flash of the strobe 1016a) other than the region whose brightness differs between the primary image 127 and each image 128 of the obtained plurality of secondary images (that is, a region in which the object is sufficiently irradiated with flash of the strobe 1016a) by comparing these images.

In Step S1011, the coordinate conversion circuit 1115 carries out coordinate conversion for the respective images, however, it does not carry out coordinate conversion for only the first image (the primary image 127 taken by using the strobe 1016a). Namely, the primary image 127 is defined as a standard for coordinate conversion.

In Step S1012, the process waits while circulating through Steps S1010 and S1011 until coordinate conversion of all images is finished, and when coordinate conversion of all images is completed, the process advances to Step S1013.

In Step S1013, image synthesis is carried out.

Herein, image synthesis is carried out by arithmetic mean of coordinate signals corresponding to the respective images, and random noise in the images is reduced by arithmetic mean. Then, the gain of the synthesized image with reduced noise is increased to make exposure proper.

In Step S1014, in the synthesized image, a region in which the images do not overlap each other due to composition displacement (region corresponding to the region 127 of FIG. 4) is cut, and the image is expanded and complemented to the original frame size.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image data obtained in Step S1015 is recorded onto a recording medium (recording medium 1119) that comprises, for example, a semiconductor memory and is attachable to and detachable from the camera.

In Step S1018, the process returns to start.

Furthermore, when the release button is still continuously depressed halfway and the sw1 is on at the point of Step S1018, the process advances in the flow in order again, Steps S1001, S1002, and S1003.

Furthermore, when the release button is fully depressed and the sw2 is on at the point of Step S1018, the process does not return to start but waits at Step S1018.

Next, the case where the vibration isolation operation switch 1120 is off in Step S1003 is described. In this case, the process advances in the flow from Step S1003 to Step S1021.

In Step S1021, the process waits while circulating through Steps S1001 to S1021 until the sw2 is turned on by full-depression of the release button.

In Step S1022, the process waits until the normal image-taking (image-taking in the normal image-taking mode in which an effective exposure condition is formed by one time of exposure) is completed, and when exposure is completed, the process advances to Step S1015.

The speaker 1017a also makes image-taking operation sounds in timing with the operations from image-taking start to completion during image-taking in the normal image-taking mode although this is omitted herein.

Namely, in both the synthesizing image-taking mode (synthesis of a plurality of images) and the normal image-taking mode, image-taking operation sounds are made in the same pattern, and the sounds are on a level enabling a photographer to recognize whether or not the exposure is long according to differences in length between the operation sounds (length from the image-taking start sound to the image-taking completion sound), so that the photographer never knows whether or not image-taking of a plurality of images is being carried out.

Therefore, the photographer is prevented from recognizing that special image-taking is carried out even in the synthesizing image-taking mode, so that the camera is easy to use without allowing the photographer any sense of discomfort.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image data obtained in Step S1015 is recorded onto a recording medium (recording medium 1119) that comprises, for example, a semiconductor memory and is attachable to and detachable from the camera. In Step S1018, the process returns to start.

Next, the flow to Step S2001 upon judgment of unnecessary vibration isolation in Step S1019 is described.

In Step S2001, the display unit provided in the camera finder or the display unit 1118 on the camera back surface displays that vibration isolation (image-taking in the synthesizing image-taking mode) is unnecessary.

Then, the process advances from Step S2001 to Step S1021.

In Step S1021, the process waits while circulating through Steps S1001 to S1021 until the sw2 is turned on by full-depression of the release button.

In Step S1022, the process waits until normal image-taking (image-taking in the normal image-taking mode in which an effective exposure condition is formed by one time of exposure) is completed, and when exposure is completed, the process advances to Step S1015.

During image-taking in the normal image-taking mode, the speaker 1017a also makes image-taking operation sounds in timing with the operations from image-taking start to completion although omitted herein.

Namely, image-taking operation sounds are made in the same pattern in both the synthesizing image-taking mode (synthesis of a plurality of images) and the normal image-taking mode.

In this case, the sounds are on a level enabling a photographer to recognize whether or not the exposure is long according to differences in length between the operation sounds (length from the image-taking start sound to the image-taking completion sound), so that the photographer never knows whether or not image-taking of a plurality of images is being carried out.

Therefore, as mentioned above, the photographer is prevented from recognizing that special image-taking is carried out even in the synthesizing image-taking mode, so that the camera is easy to use.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image obtained in Step S1015 is recorded onto a recording medium 1119 that comprises, for example, a semiconductor memory, etc., and is attachable to and detachable from the camera. In Step S1018, the process returns to start.

As seen in this flow, even when the vibration isolation system is turned on by operating the vibration isolation operation switch 1120, depending on the image-taking conditions, the vibration isolation system is prevented from operating (image-taking in synthesizing image-taking mode is prevented), and by displaying this, image deterioration under a certain image-taking condition is prevented.

Embodiment 10

Figure 21:
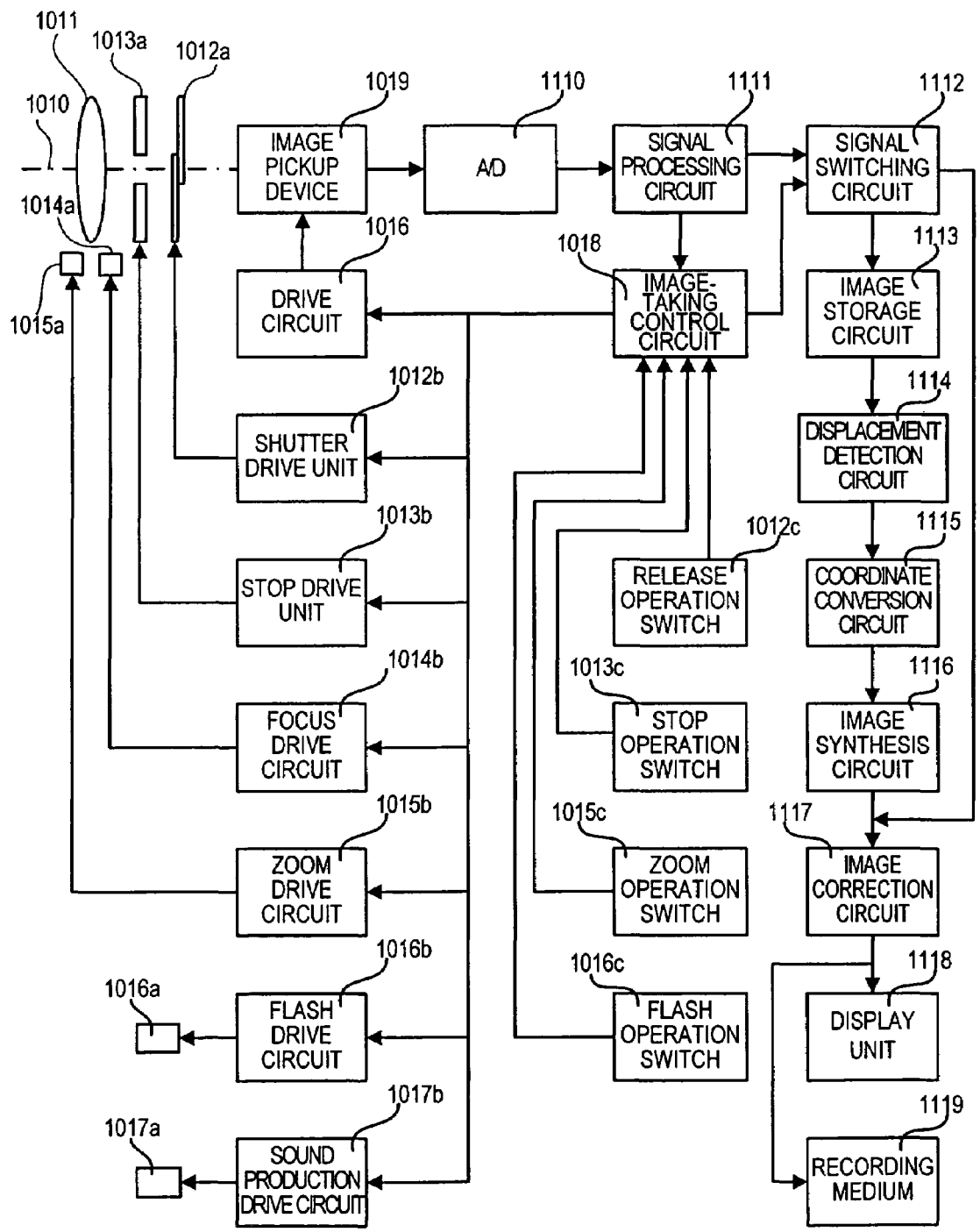
FIG. 21 is a block diagram of a camera in Embodiment 10 of the present invention.

FIG. 21 is a block diagram of a camera of Embodiment 10 of the present invention, wherein a point of difference from FIG. 16 is in that the vibration isolation operation switch 1120 is not provided. The same members as those described in FIG. 16 are attached with the same symbols and description thereof is omitted.

In this embodiment, when the image-taking conditions come to require vibration isolation (vibration isolating image-taking condition), the system is automatically transferred into the synthesizing image-taking mode, and although the conditions are not the vibration isolating image-taking condition, the normal image-taking mode is maintained.

Therefore, it is not necessary for a photographer to consider the necessity of vibration isolation according to the image-taking scene, and a photographer can take an excellent image stably.

Figure 22:
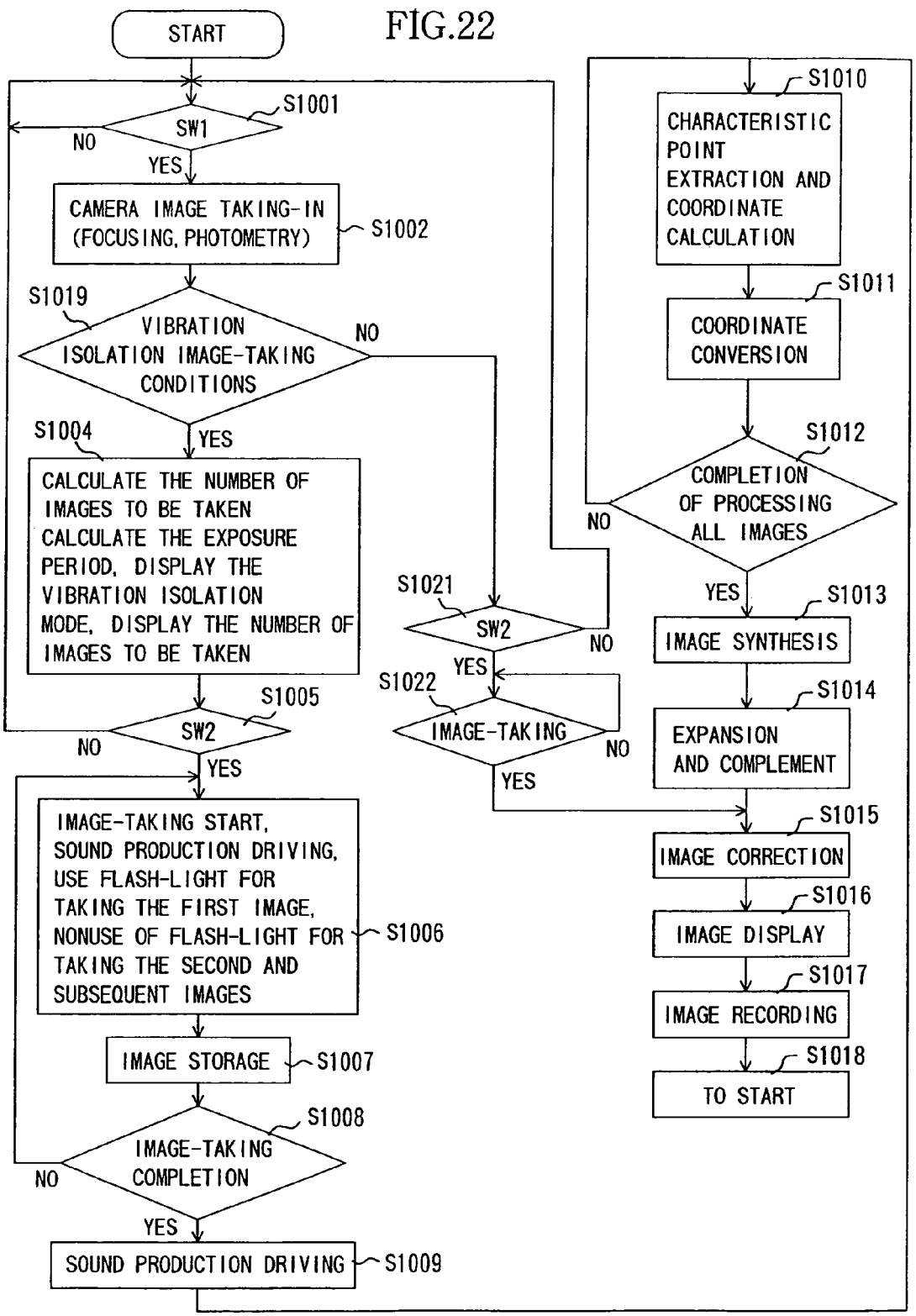
FIG. 22 is a flowchart showing image-taking operation in Embodiment 10.

FIG. 22 is a flowchart summarizing the image-taking operation of the camera of this embodiment, and this flow starts when the power source of the camera is turned on.

In Step S1001, the process waits while circulating this step until the image-taking preparation operation (focusing operation, photometric operation) is started by half-depression of the release button (turning the sw1 on) by a photographer, and when sw1 is turned on, the process advances to Step S1002.

In Step S1002, the object is imaged by the image pickup device 1019. The image-taking control circuit 1018 moves the image-taking lens 1011 in the optical axis direction by driving the AF drive motor 1014a while detecting the contrast of the image based on an output from the signal processing circuit 1111. Then, when the contrast reaches its highest point, driving of the image-taking lens 1011 is stopped. Thereby, the image-taking optical system is turned into a focused condition.

Furthermore, the image-taking control circuit 1018 determines the brightness of the object based on an output of the image pickup device 1019 (the signal processing circuit 1111) simultaneously.

In Step S1019, it is judged whether or not the image-taking conditions cause image deterioration due to vibration unless the vibration isolation system is used (the synthesizing image-taking mode is set).

The image-taking conditions include the brightness of the object, the brightness of the lens, the imaging sensitivity, and the image-taking focal length as mentioned above, an exposure period is determined based on the brightness of the object, the brightness of the lens, and the imaging sensitivity, and it is judged in Step 1019 whether or not there is a possibility that image deterioration occurs in the exposure period due to vibration at the current (when image-taking) focal length.

Herein, the imaging sensitivity is the sensitivity status of the image pickup device 1019, and in the case of a digital camera, for the sensitivity of the image pickup device 1019, an auto mode in which the sensitivity is automatically changed depending on the image-taking conditions and a sensitivity fixed mode in which the imaging sensitivity is set and fixed by the photographer's preference are available.

In the case of the auto mode, the exposure period is set according to the brightness of the object and the brightness of the lens, and it is judged whether or not there is a possibility that image blur occurs in the determined exposure period at the currently set image-taking focal length.

Then, when there is a possibility of causing image blur, the exposure period is shortened by increasing the imaging sensitivity, and in the case where the exposure period still has the possibility of causing image blur, vibration isolation (image-taking in the synthesizing image-taking mode) is judged as necessary.

Furthermore, in the case of the sensitivity fixed mode, the exposure period is set according to the brightness of the object, the brightness of the lens, and the set imaging sensitivity, and it is judged whether or not there is a possibility that image blur occurs in the determined exposure period with respect to the currently set image-taking focal length.

In the case where there is a possibility of causing image blur, vibration isolation is judged as necessary.

As an intermediate mode between the abovementioned auto mode and the sensitivity fixed mode, a semi-auto mode in which a change in imaging sensitivity is allowed to some degree of change width is considered in the image-taking scene selection mode (for example, portrait mode).

When there is a possibility that image blur occurs in the exposure period at the allowable imaging sensitivity even in such a case, vibration isolation is judged as necessary.

Then, when vibration isolation is judged as necessary, the process advances to Step S1004, and when it is not necessary, the process advances to Step S1021.

First, the flow in which vibration isolation is judged as necessary and the process advances to Step S1004 is described.

In Step S1004, the number of images to be taken and exposure periods for each image-taking are determined based on the image-taking conditions in normal image-taking determined in Step S1019.

The image-taking conditions referred herein include the following four:
Brightness of the object
Focal length of the image-taking optical system
Brightness of the image-taking optical system (stop number)
Sensitivity of the image pickup device 1019

For example, it is assumed that an exposure period of ⅛ seconds is required in Step S1019.

In this case, when the image-taking focal length is 30 mm as regards 35 mm film, in image-taking with an exposure period of ⅛ seconds, there is a possibility that image deterioration occurs due to vibration, so that the exposure period is set to 1/32 seconds and image-taking is carried out four times so as not to cause image deterioration in each image.

Furthermore, when the image-taking focal length is 300 mm, the exposure period is set to 1/320 seconds and image-taking is carried out 40 times so as not to cause image deterioration in each image.

Thus, the exposure period when image-taking of a plurality of images is carried out is determined according to the image-taking conditions, and furthermore, the number of images to be taken is also set according to the image-taking conditions.

Even when the same object is imaged by dividing image-taking into a plurality of times of image-taking, the exposure condition for each image-taking is made close to proper exposure to obtain accurate information in imaging by the image pickup device 1019.

Therefore, in a case where the object is dark, the stop 1013a is stopped down and the lens is dark, or the sensitivity of the image pickup device 1019 is set to be low, the exposure period for each image-taking is set as long as possible even when a plurality of images are taken so as to make the exposure condition effective.

However, if the exposure period is set to be excessively long, an influence of image deterioration due to vibration appears on the image plane, so that when the image-taking focal length is 30 mm as regards 35 mm film as mentioned above, the exposure period is set to 1/32 seconds that is equal to approximately 1/focal length that has no possibility of causing image blur.

Then, the insufficiency that cannot be covered by the exposure period is complemented by the number of images to be taken.

In the case of a long focal length, image deterioration occurs due to vibration unless the exposure period is made shorter, so that the exposure period is made shorter and the number of images to be taken is increased accordingly, whereby an exposure complement is carried out.

As mentioned above, the exposure period in image-taking of a plurality of images becomes longer as the image-taking object becomes darker or the image-taking lens becomes darker, and in the sensitivity fixed mode, the exposure period becomes longer as the sensitivity of the image pickup device becomes lower, and becomes shorter as the focal length of the lens becomes longer.

Then, the number of images to be taken in the case of image-taking of a plurality of images becomes larger as the image-taking object becomes darker or the image-taking lens becomes darker, and in the sensitivity fixed mode, the number of images to be taken becomes larger as the sensitivity of the image pickup device 1019 becomes lower, and becomes larger as the focal length of the lens becomes longer.

As mentioned above, after calculation of the exposure period and the number of images to be taken according to the image-taking conditions is finished, the display unit provided in the camera finder or the liquid crystal display unit provided on the outer package of the camera displays that the vibration isolation mode (multiple-time image-taking mode) has been set and displays the determined number of images to be taken to inform a photographer of them.

In Step S1005, the process waits while circulating through Steps S1001 to S1005 until an instruction to start image-taking is given in response to full-depression of the release button.

In Step S1006, image-taking of the first image is started. Furthermore, sound production expressing the image-taking start is carried out simultaneously by driving the speaker 1017a via the sound production drive circuit 1017b.

This image-taking operation sound may be an electronic bleep sound, or may be a shutter opening sound or a mirror rising sound of a film camera, etc.

Furthermore, from Step S1006 to Step S1014 described later, the operation is in the synthesizing image-taking mode in which image-taking with a short exposure period is repeated a plurality of times, and images obtained through the plurality of times of image-taking are synthesized to make apparent exposure proper.

Herein, as described in this step, the first image is taken by making the strobe 1016a to flash to obtain the above-mentioned primary image 127.

In Step S1007, the taken images are temporarily stored in the image storage circuit 1113.

In Step S1008, the process waits while circulating through Steps S1006 and S1007 until image-taking of all images is completed. In this case, the second and subsequent images are taken without using the strobe 1016a to obtain the secondary image.

When image-taking is completed, the process advances to Step S1009.

In Step S1009, sound production expressing image-taking completion is carried out by driving the speaker 1017a via the sound production drive circuit 1017b.

This image-taking operation sound may be an electronic sound of, for example, a bleep, or may be a shutter closing sound, a mirror lowering sound, or a film winding sound of a film camera, etc.

Thus, in the case of image-taking of a plurality of images, sound production expressing this operation is one set of sounds (one sound is made for each of exposure start for initial image-taking and exposure completion of the last image-taking), so that the image-taking operation sound does not allow a photographer any sense of discomfort.

In Step S1010, the displacement detection circuit 1114 extracts a characteristic image (characteristic point) from the peripheral region of the image (for example, the building 121a and 121b of FIG. 17), and determines the coordinate of the image.

This is, as mentioned above, to extract a characteristic point and determine the coordinate of the point from a region (that is, a region in which the object is not sufficiently irradiated with a flash of the strobe 1016a) other than the region whose brightness differs between the primary image 127 and each image 128 of the obtained plurality of secondary images (that is, a region in which the object is sufficiently irradiated with flash of the strobe 1016a) by comparing these images.

In Step S1011, the coordinate conversion circuit 1115 applies coordinate conversion to the respective images, however, it does not carry out coordinate conversion for only the first image (the primary image 127 taken by using the strobe 1016a). Namely, the primary image 127 is defined as a standard for coordinate conversion.

In Step S1012, the process waits while circulating through Steps S1010 and S1011 until coordinate conversion of all images is finished, and when coordinate conversion of all images is completed, the process advances to Step S1013.

In Step S1013, image synthesis is carried out.

Herein, image synthesis is carried out by arithmetic mean of coordinate signals corresponding to the respective images, and random noise in the images is reduced by arithmetic mean. Then, the gain of the synthesized image with reduced noise is increased to make exposure proper.

In Step S1014, in the synthesized image, a region in which the images do not overlap each other due to composition displacement (region corresponding to the region 127 of FIG. 4) is cut, and the image is expanded and complemented to the original frame size.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image data obtained in Step S1015 is recorded onto a recording medium 1119 that comprises, for example, a semiconductor memory and is attachable to and detachable from the camera.

In Step S1018, the process returns to start.

Furthermore, when the release button is still continuously depressed halfway (the sw1 is still on) at the point of Step S1018, the process advances in the flow, Steps S1001 and S1002 in order again.

On the other hand, when the release button is still continuously fully depressed (the sw2 is still on) at the point of Step S1018, the process does not return to start but waits at Step S1018.

Next, the flow in which vibration isolation is judged as unnecessary in Step S1019 and the process flows to Step S1021 is described.

In Step S1021, the process waits while circulating through Steps S1001 to S1021 until an instruction to start image-taking is given in response to full-depression of the release button.

In Step S1022, the process waits until normal image-taking (image-taking in the normal image-taking mode in which an effective exposure condition is formed by one time of exposure) is completed, and simultaneously with exposure completion, the process advances to Step S1015.

The speaker 1017a also makes image-taking operation sounds in timing with the operations from image-taking start to completion during image-taking in the normal image-taking mode although this is omitted herein.

Namely, in both the synthesizing image-taking mode (synthesis of a plurality of images) and the normal image-taking mode, image-taking operation sounds are made in the same pattern.

In this case, the sounds are on a level enabling a photographer to recognize whether or not the exposure is long according to differences in interval between the operation sounds (length from the image-taking start sound to the image-taking completion sound) from the speaker 1017a, so that the photographer never knows whether or not image-taking of a plurality of images is being carried out.

Therefore, the photographer is prevented from recognizing that special image-taking is carried out even in the synthesizing image-taking mode, so that the camera is easy to use without allowing the photographer any sense of discomfort.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image data obtained in Step S1015 is recorded onto a recording medium 1119 that comprises, for example, a semiconductor memory and is attachable to and detachable from the camera. In Step S1018, the process returns to start.

As seen in this flow, without setting the vibration isolation (synthesizing image-taking mode) by a user, the vibration isolation system is automatically operated (synthesizing image-taking mode) or non-operated (normal image-taking mode) depending on image-taking conditions, and when vibration isolation is operated, display that the vibration isolation is being operated is carried out, whereby stable image-taking without image deterioration can be carried out for each time of taking a still image.

Embodiment 11

Figure 23:
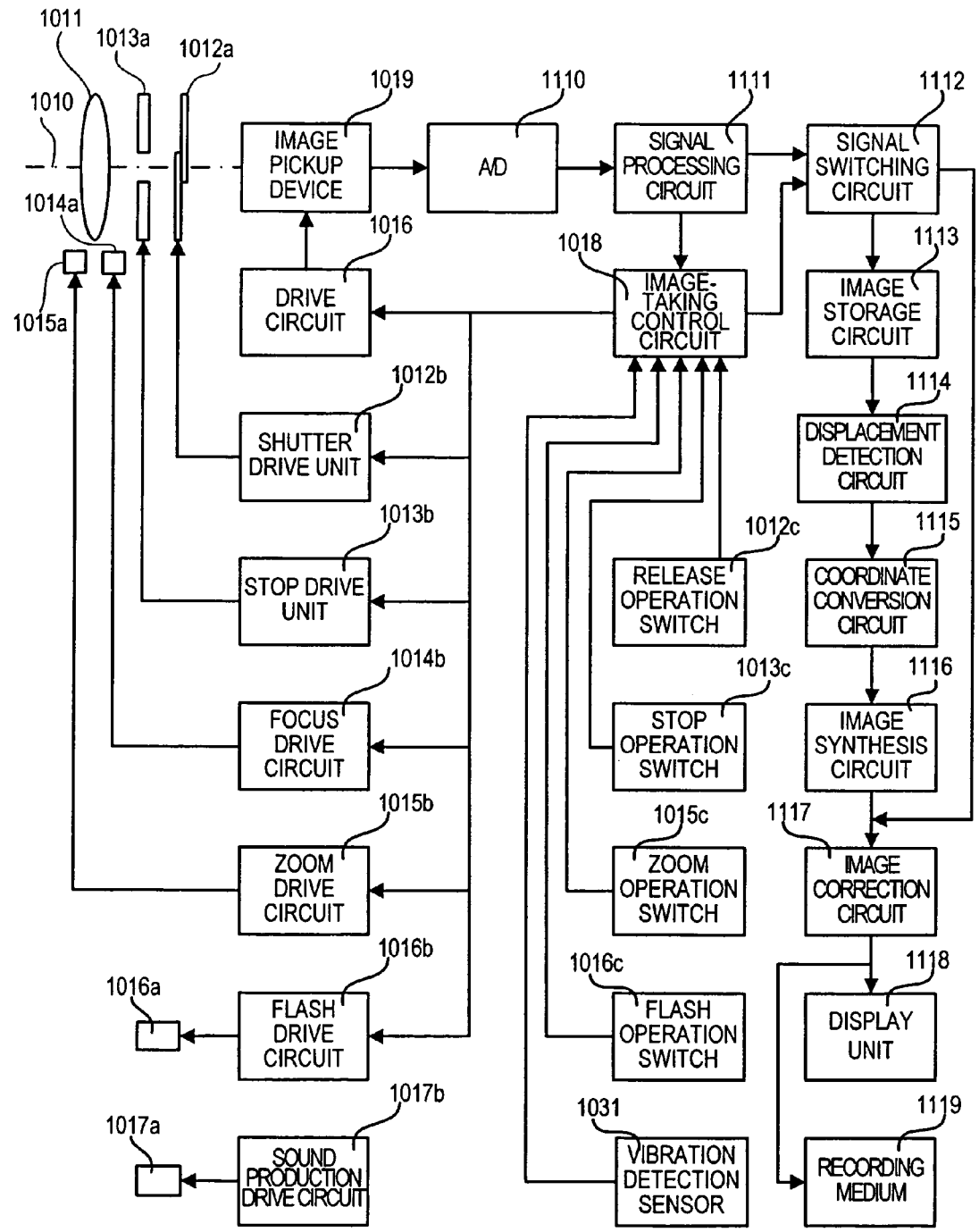
FIG. 23 is a block diagram of a camera of Embodiment 11 of the present invention.

FIG. 23 is a block diagram of a camera of Embodiment 11 of the present invention. The same members as those described in FIG. 16 or FIG. 21 are attached with the same symbols and description thereof is omitted.

A point of difference from FIG. 16 is in that a vibration detection sensor 1031 is provided in place of the vibration isolation operation switch 1120.

It is ideal that the vibration detection sensor 1031 uses a high-accuracy sensor such as a vibration gyro used for an optical vibration isolation system, however, its detection target is not the waveform of vibration but whether or not great vibration occurs, and the detection frequency characteristics are also limited, so that a more inexpensive sensor such as an acceleration sensor or an optical sensor (AF sensor) can also be used.

Furthermore, in this embodiment, selection between the synthesizing image-taking mode and the normal image-taking mode is not automatically made in advance depending on the image-taking conditions before image-taking.

Alternatively, when vibration to be detected by the vibration detection sensor 1031 becomes great during exposure for image-taking in the normal image-taking mode, the mode is transferred into the synthesizing image-taking mode.

Namely, when vibration becomes great during image-taking, the image-taking is interrupted and image-taking is carried out again, and when vibration becomes great during the second time of image-taking, the second image-taking is also interrupted and the process advances to the third time of image-taking, and this operation is repeated until proper exposure is obtained for the synthesized image.

Therefore, as long as vibration is small, image-taking in the normal image-taking mode is pressed forward even in the case of long-second exposure, so that an influence of object vibration that is not preferable in image-taking in the synthesizing image-taking mode can be suppressed to be small.

Figure 24:
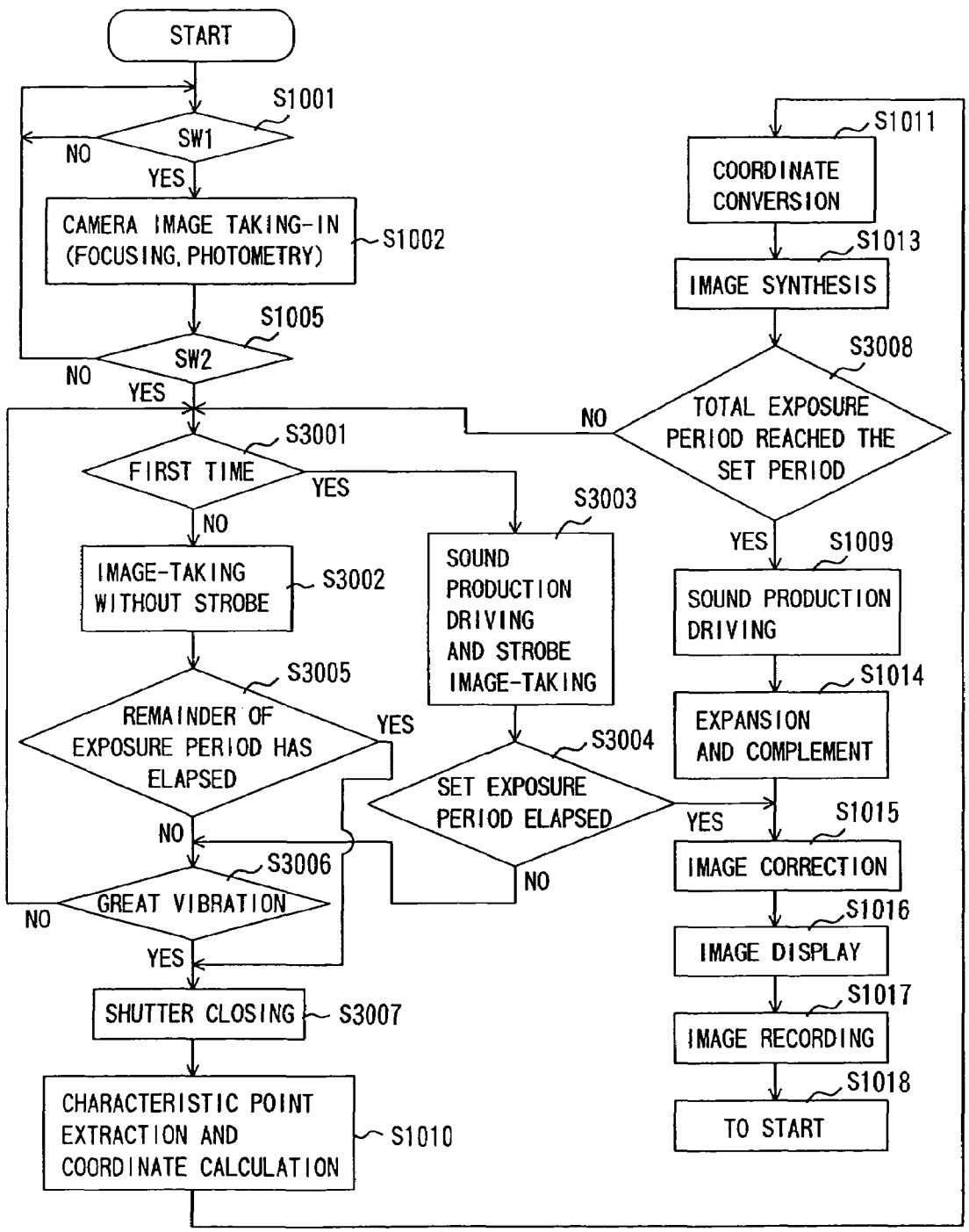
FIG. 24 is a flowchart showing image-taking operation in Embodiment 11.

FIG. 24 is a flowchart summarizing the image-taking operation of the camera in this embodiment, and this flow starts when the power source of the camera is turned on.

In Step S1001, the process waits while circulating through this step until the image-taking preparation operation (focusing operation, photometric operation) is started in response to half-depression of the release button (turning the sw1 on) by a photographer, and when the sw1 is turned on, the process advances to Step S1002.

In Step S1002, imaging of an object is carried out by the image pickup device 1019. The image-taking control circuit 1018 moves the image-taking lens 1011 in the optical axis direction by driving the AF drive motor 1014a while detecting the contrast of the image based on an output from the signal processing circuit 1111. Then, at a point at which the contrast becomes highest, driving of the image-taking lens 11 is stopped. Thereby, a focused condition of the image-taking optical system is obtained.

Furthermore, the image-taking control circuit 1018 determines the brightness of the object based on an output of the image pickup device 1019 (signal processing circuit 1111) and sets image-taking conditions simultaneously.

The image-taking conditions include, as mentioned above, the brightness of the object, the brightness of the lens, the imaging sensitivity, and the image-taking focal length, and an exposure period is determined based on the brightness of the object, the brightness of the lens, and the imaging sensitivity.

Herein, the imaging sensitivity is the sensitivity status of the image pickup device 1019, and in the case of a digital camera, for the sensitivity of the image pickup device 1019, an auto mode in which the sensitivity is automatically changed depending on the image-taking conditions and a sensitivity fixed mode in which the imaging sensitivity is set and fixed by the photographer's preference are available.

In the case of the auto mode, the exposure period is set according to the brightness of the object and the brightness of the lens, and the value of the stop 1013b (stop aperture diameter) and the closing timing (exposure period) are determined.

Then, it is judged whether or not image blur occurs due to vibration in the determined exposure period at the currently set focal length of the image-taking optical system, and when there is a possibility of image blur, the exposure period is shortened by increasing the imaging sensitivity, and the value of the stop 1013b and the closing timing (exposure period) of the shutter 1012a are re-calculated.

Then, in the case of the mode in which the strobe 1016a is automatically made to flash according to the image-taking conditions, when the object is dark, the strobe 1016a is made to flash, and when a user sets forcible flashing or flashing prohibition of the strobe 1016a, flashing of the strobe 1016a is controlled according to the setting.

In the case of the sensitivity fixed mode, the exposure period is determined according to the brightness of the object, the brightness of the lens, and the set imaging sensitivity.

As an intermediate mode between the abovementioned auto mode and the sensitivity fixed mode, a semi-auto mode in which a change in imaging sensitivity is allowed to some degree of change width is considered in the image-taking scene selection mode (for example, portrait mode). Even in such a case, the exposure period is set by increasing the imaging sensitivity so that image blur is reduced within an allowable sensitivity range set in the same manner as mentioned above.

In Step S1005, the process waits while circulating through Steps S1001 to S1005 until the sw2 is turned on by full-depression of the release button.

In Step S3001, it is judged whether or not image-taking is of the first image, and when image-taking is of the first image, the process advances to Step S3003, and when image-taking is of the second or subsequent image, the process advances to Step S3002.

When the first image-taking is carried out, the flow flows from Step S3001 through Step S3003.

In Step S3003, exposure is started. Namely, charge that has been accumulated in each photodiode of the image pickup device 1019 is reset and accumulation is restarted.

Then, when the strobe 1016a is made to flash according to the results obtained in Step S1002, the strobe 1016a is made to flash in this step.

Simultaneously, sound production expressing image-taking start is carried out by driving the speaker 1017a via the sound production drive circuit 1017b. This image-taking operation sound may be an electronic sound of, for example, a bleep, or may be a shutter opening sound or a mirror rising sound of a film camera, etc.

In Step S3004, it is judged whether or not the exposure period of time set in Step S1002 has elapsed, and in a case where it has elapsed, the process advances to Step S1015, and otherwise the process advances to Step S3006.

In Step S3006, vibration applied to the camera during exposure is detected by the vibration detection sensor 1031, and when the vibration influences the image, the process advances to Step S3007, and otherwise, the process continues exposure while circulating through Steps S3001, S3003, S3004, and S3006.

Herein, judgement as to whether or not the vibration influences the image is made based on the amount of vibration and the image-taking focal length at this point, and when the image-taking focal length is longer than a predetermined length although the amount of vibration is smaller than a predetermined amount, judgement that the image will be deteriorated is made, and when the image-taking focal length is shorter than the predetermined length although the amount of vibration is larger than the predetermined amount, judgement that the image will not be deteriorated is made.

Then, in a case where the exposure period set in Step S1002 is accomplished without great vibration while circulating through the Steps S3001 to S3006, the process advances to Step S1015 as mentioned above.

On the other hand, when great vibration occurs while circulating through Steps S3001 to S3006 and it is judged that the image will deteriorate, this circulation is interrupted and the process advances to Step S3007.

Steps S3007 through S1014 are followed in a case where it is judged that the image will deteriorate during exposure as mentioned above, and from then on, the camera enters the synthesizing image-taking mode.

In Step S3007, exposure is interrupted by closing the shutter 1012a. Thereby, image deterioration due to vibration can be suppressed.

At this point, since the set exposure period has not elapsed, the image obtained through image-taking becomes underexposed.

In Step S1010, the displacement detection circuit 1114 extracts a characteristic image (characteristic point) from the peripheral region (for example, the buildings 121a and 121b of FIG. 17) of the image, and determines the coordinate of the image.

This is, as mentioned above, to extract a characteristic point and determine the coordinate of the point from a region (that is, a region in which the object is not sufficiently irradiated with a flash of the strobe 1016a) other than the region whose brightness differs between the primary image 127 and each image 128 of the obtained plurality of secondary images (that is, a region in which the object is sufficiently irradiated with flash of the strobe 1016a) by comparing them.

However, for the first image, there is no image to be compared with it, so that the coordinate converted value is zero. Namely, although the coordinate conversion circuit 1115 applies coordinate conversion to each image in Step S1011, coordinate conversion is not carried out for the first image (the primary image 127 taken by using the strobe 1016a). This primary image 127 is defined as a standard for coordinate conversion.

In Step S1013, image synthesis is carried out.

Herein, image synthesis is carried out by arithmetic mean of coordinate signals corresponding to the respective images, and random noise in the images is reduced by arithmetic mean. Then, the gain of the synthesized image with reduced noise is increased to make exposure proper. Furthermore, in a case where the image is first taken, there is no synthesized image, so that the synthesis is not carried out.

In Step S3008, it is judged whether or not the total exposure period for the synthesized taken image has reached the exposure period (set exposure period) set in Step S1002, and when it is judged that the set exposure period is reached and exposure is proper, the process advances to Step S1009, and in a case of underexposure, the process returns to Step S3001 and an image for the next synthesis is taken.

Hereinafter, the case where exposure is insufficient in Step S3008 and the process returns to Step S3001 for synthesizing image-taking is described first.

When the process returns to Step S3001, image-taking is the second time, so that the flow advances to Step S3002.

In Step S3002, exposure is started. First, charge that has been accumulated in each photodiode of the image pickup device 1019 is reset and accumulation is restarted.

Since the strobe 1016a is made to flash in Step S3003 and an image-taking operation sound (sound for exposure start) has also been made, neither of flashing or sound production is carried out in this step.

In Step S3005, it is judged, with respect to the exposure period set in Step S1002, whether or not the remainder of the exposure period (time for complementing underexposure) for image-taking of Step S3003 has elapsed. In the case where the remainder of the exposure period has elapsed, the process advances to Step S3007, and otherwise, the process advances to Step S3006.

In Step S3006, vibration applied to the camera during exposure is detected by the vibration detection sensor 1031, and when the vibration influences the image the process advances to Step S3007, and otherwise, the process continues exposure while circulating through the Steps S3001, S3002, S3006, and S3006.

Herein, judgement as to whether or not the vibration influences the image is made based on the amount of vibration and the image-taking focal length at this point, and when the image-taking focal length is long although the amount of vibration is small, judgement that the image will be deteriorated is made, and when the image-taking focal length is short although the amount of vibration is large, judgement that the image will not be deteriorated is made.

Then, in a case where the remainder of the exposure period set in Step S1002 is accomplished without great vibration while circulating through the Steps S3001 to S3006, the process advances to Step S3007 as mentioned above.

On the other hand, when great vibration occurs while circulating through the Steps S3001 to S3006 and it is judged that the image will deteriorate, this circulation is interrupted and the process advances to Step S3007.

In Step S3007, exposure is interrupted by closing the shutter 1012a. Thereby, when the flow flows from Step S3006, image deterioration due to vibration can be suppressed.

Furthermore, when the flow flows from Step S3005 to Step S3007, exposure is completed thereby.

At this point (when the process advances from Step S3006 to Step S3007, with respect to the whole taken image, the set proper exposure period has not elapsed yet, so that the images obtained through the image-taking are underexposed.

In Step S1010, the displacement detection circuit 1114 extracts a characteristic image (characteristic point) from the peripheral region (for example, the buildings 121a and 121b of FIG. 17) of the image, and determines the coordinate of the image.

This is, as mentioned above, to extract a characteristic point and determine the coordinate of the point from a region (that is, a region in which the object is not sufficiently irradiated with a flash of the strobe 1016a) other than the region whose brightness differs between the primary image 127 and each image 128 of the obtained plurality of secondary images (that is, a region in which the object is sufficiently irradiated with flash of the strobe 1016a) through comparison of these.

In Step S1011, coordinate conversion of the respective images is carried out by the coordinate conversion circuit 1115.

This is coordinate conversion for the second image (image that has passed through Step S3002) so that the second image overlaps the first image (the primary image 127 taken by using the strobe 1016a).

In Step S1013, image synthesis is carried out.

Herein, image synthesis is carried out by arithmetic mean of coordinate signals corresponding to the respective images, and random noise in the images is reduced through arithmetic mean. Then, the gain of the synthesized image with reduced noise is increased to make exposure proper.

In Step S3008, it is judged whether or not the total exposure period of the synthesized taken image has reached the exposure period set in Step S1002, and when it is judged that the set exposure period has been reached and exposure is proper, the process advances to Step S1009, and when underexposure is judged, the process returns to Step S3001 and an image for the next synthesis is taken.

Namely, in Step S3005, it is judged whether or not the remainder of the exposure period has elapsed in image-taking, and when image-taking is properly completed, the synthesized image has proper exposure, so that the image-taking operation is finished and the process advances to Step S1009. On the other hand, when exposure is still insufficient (image-taking is interrupted due to vibration even during the second time of image-taking), the process returns to Step S3001 and the image-taking operation is repeated again.

Thus, the image-taking operation is repeated and image synthesis is carried out any number of times by circulating Steps S3001 through S3008 until the set exposure period elapses for image-taking.

Therefore, in a case where image deterioration due to vibration is great (vibration is great or the focal length is long), the number of images to be taken increases.

Then, when image-taking is completed, the process advances to Step S1009.

In Step S1009, sound production expressing image-taking completion is carried out by driving the speaker 1017a via the sound production drive circuit 1017b. This image-taking operation sound may be an electronic sound of, for example, a bleep, or may be a shutter closing sound, a mirror lowering sound, or a film winding sound of a film camera, etc.

Thus, in the case of image-taking of a plurality of images, sound production expressing this operation is one set of sounds (one sound is made for each of exposure start for initial image-taking and exposure completion of the last image-taking), so that the image-taking operation sound does not allow a photographer any sense of discomfort.

In Step S1014, a region in which the images do not overlap each other due to composition displacement (corresponding to the region 127 of FIG. 4) in the synthesized image is cut, and the image is expanded and complemented to the original frame size.

In Step S1015, gamma correction and compression are applied to the synthesized image signal.

In Step S1016, the image obtained in Step S1015 is displayed on the liquid crystal display unit (display unit 1118) provided on the camera back surface, etc.

In Step S1017, the image obtained in Step S1015 is recorded onto a recording medium 1119 that comprises, for example, a semiconductor memory, etc., and is attached to and detachable from the camera.

In Step S1018, the process returns to start.

When the release button is still continuously depressed halfway (sw1 is still on) at the point of Step S1018, the process advances in the flow, Step S1001 and S1002.

On the other hand, when the release button is fully depressed (sw2 is on) at the point of Step S1018, the process does not return to start but waits at Step S1018.

The operation in each Embodiment described above (see FIGS. 5. 6, 9, 11, 12, 14, 15, 18, 19, 20, 22 and 24) is carried out by a program, this program can be stored in a recording medium.

While preferred embodiments have been described, it is to be understood that modification and variation of the present invention may be made without departing from scope of the following claims.

What is claimed is:

1. A camera which can carry out image-taking in a first image-taking mode in which a synthesized image whose exposure has been corrected is obtained by synthesizing a plurality of images obtained through successive image-taking, and in a second image-taking mode in which an image corresponding to the synthesized image is obtained through one time of image-taking, comprising:
   an image pickup device which photoelectrically converts an object image into an electric signal;
   a sound production unit which makes sounds; and
   a control unit which controls driving of the sound production unit,
   wherein the control unit drives the sound production unit in timing with the first image-taking and the last image-taking during image-taking in the first image-taking mode, and in timing with image-taking start and image-taking completion during image-taking in the second image-taking mode.

* * * * *